US012760150B2

(12) United States Patent
Wolf et al.

(10) Patent No.: US 12,760,150 B2
(45) Date of Patent: Oct. 13, 2026

(54) CROSS-LINKED POLYMERIC MATERIALS, METHODS OF THEIR PREPARATION AND USES THEREOF

(71) Applicant: THE UNIVERSITY OF BRITISH COLUMBIA, Vancouver (CA)

(72) Inventors: Michael Wolf, Vancouver (CA); Taylor Wright, Vancouver (CA)

(73) Assignee: THE UNIVERSITY OF BRITISH COLUMBIA, Vancouver (CA)

( * ) Notice: Subject to any disclaimer, the term of this patent is extended or adjusted under 35 U.S.C. 154(b) by 688 days.

(21) Appl. No.: 17/759,985

(22) PCT Filed: Feb. 2, 2021

(86) PCT No.: PCT/CA2021/050116

§ 371 (c)(1),
(2) Date: Aug. 2, 2022

(87) PCT Pub. No.: WO2021/155461

PCT Pub. Date: Aug. 12, 2021

(65) Prior Publication Data

US 2023/0096635 A1 Mar. 30, 2023

Related U.S. Application Data

(60) Provisional application No. 62/969,360, filed on Feb. 3, 2020.

(51) Int. Cl.

| | |
|---|---|
| ***C08G 77/32*** | (2006.01) |
| ***C08K 5/1545*** | (2006.01) |

(Continued)

(52) U.S. Cl.

CPC ............ *C08G 77/32* (2013.01); *C08K 5/1545* (2013.01); *C08K 5/3415* (2013.01); *C09B 61/00* (2013.01);

(Continued)

(58) Field of Classification Search

CPC ...... C08G 77/32; C08G 77/388; C08G 77/26; C09B 69/103; C09B 1/00; A01P 1/00;

(Continued)

(56) References Cited

U.S. PATENT DOCUMENTS

| | | | | |
|---|---|---|---|---|
| 10,258,046 B2 | 4/2019 | Grossman et al. | | |
| 2015/0086631 A1* | 3/2015 | Kishen | ............... | A61K 41/0057 514/777 |

FOREIGN PATENT DOCUMENTS

| | | |
|---|---|---|
| CA | 2867733 | 9/2013 |
| CN | 107501560 A | 12/2017 |

OTHER PUBLICATIONS

Adamczyk, M. et al., “Efficient synthesis of rhodamine conjugates through the 2'-position” Bioorganic Med. Chem. Lett. (2000) 10:1539-1541.

(Continued)

*Primary Examiner* — Camie S Thompson

(74) *Attorney, Agent, or Firm* — Knobbe Martens Olson & Bear LLP

(57) ABSTRACT

The present disclosure relates to methods for preparing cross-linked polymeric materials, cross-linked polymeric materials which can be prepared by such methods and uses of such cross-linked polymeric materials, for example, as antibacterial surfaces or coatings. The present disclosure (Continued)

also relates to polymers such as the polymer of the general Formula (III) which can be used, for example, to prepare such cross-linked polymeric materials:

(III)

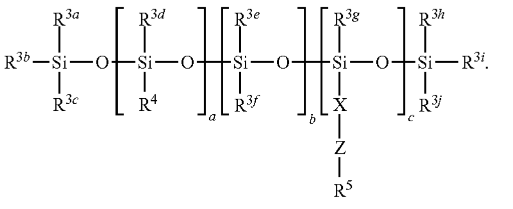

19 Claims, 56 Drawing Sheets

(51) Int. Cl.
*C08K 5/3415* (2006.01)
*C09B 61/00* (2006.01)
*C09B 67/20* (2006.01)
*C09D 183/04* (2006.01)

(52) U.S. Cl.
CPC ........ *C09B 67/0063* (2013.01); *C09D 183/04* (2013.01)

(58) Field of Classification Search
CPC .......... A01N 25/10; A01N 2/23; A01N 55/10; A01N 33/12; C08J 3/24; C08J 3/28; C08J 2383/08; C08K 5/1545; C08K 5/3415; C09D 5/14; C09D 183/04; C09D 183/08; D06M 10/001; D06M 10/10; D06M 11/34; D06M 15/6436; D06M 16/00; D06M 23/16
See application file for complete search history.

(56) References Cited

OTHER PUBLICATIONS

Aguirre-Díaz, L. M., et al., "Efficient Rare-Earth-Based Coordination Polymers as Green Photocatalysts for the Synthesis of Imines at Room Temperature" Inorg. Chem. (2018) 57:6883-6892.
Asri, L. A. T. W., et al., "A Shape-adaptive, antibacterial-coating of immobilized quaternary-ammonium compounds tethered on hyperbranched polyurea and its mechanism of action" Adv. Funct. Mater. (2014) 24:346-355.
Beltrán, A., et al., "A photobleaching resistant polymer supported hexanuclear molybdenum iodide cluster for photocatalytic oxygenations and photodynamic inactivation of: *Staphylococcus aureus*" J. Mater. Chem. B (2016) 4:5975-5979.
Berlicka, A., et al., "Porphycene-mediated photooxidation of benzylamines by visible light" Photochem. Photobiol. Sci. (2010) 9:1359-1366.
Bhattacharjee, N. et al., "Desktop-Stereolithography 3D-Printing of a Poly(dimethylsiloxane)-Based Material with Sylgard-184 Properties" Adv. Mater. (2018) 30(22):E1800001.
Bojinov, V. B. et al., "Novel polymerizable light emitting dyes—combination of a hindered amine with a 9-phenylxanthene fluorophore. Synthesis and photophysical investigations" Dye. Pigment. (2007) 74:187-194.
Carvell, M. et al., "The influence of labelling mechanisms on the fluorescence behaviour of polymers bearing fluorescein labels" Polymer (1998) 39:393-398.
Chakraborty, R. et al., "Synthesis of amine and epoxide telechelic siloxanes" Macromolecular Chemistry and Physics (2008) 209:604-614.
Chen, B.; et al., "Recent Advances in Aerobic Oxidation of Alcohols and Amines to Imines" ACS Catal. (2015) 5:5851-5876.
Chen, J. et al., "Dual antimicrobial actions on modified fabric leads to inactivation of drug-resistant bacteria" Dye. Pigment. (2017) 140:236-243.
Chen, W. et al., "Wool/Acrylic Blended Fabrics as Next-Generation Photodynamic Antimicrobial Materials" ACS Appl. Mater. Interfaces (2019) 11:29557-29568.
Chen, X. et al., "New bio-renewable polyester with rich side amino groups from L-lysine via controlled ring-opening polymerization" Polym. Chem. (2014) 5:6495-6502.
Derosa, M. C. et al., "Photosensitized singlet oxygen and its applications" Coord. Chem. Rev. (2002) 233-234:351-371.
Ding, X. et al., "Metallophthalocyanine-based conjugated microporous polymers as highly efficient photosensitizers for singlet oxygen generation" Angew. Chem. Int. Ed. (2015) 54:6536-6539.
Dong, A. et al., "Chemical Insights into Antibacterial N-Halamines" Chem. Rev. (2017) 117:4806-4862.
Donnelly, R. F. et al., "Antifungal photodynamic therapy" Microbiol. Res. (2008) 163:1-12.
Fijan, S. et al., "Hospital textiles, are they a possible vehicle for healthcare-associated infections?" Int. J. Environ. Res. Public Health (2012) 9:3330-3343.
Froidevaux, V. et al., "Biobased Amines: From Synthesis to Polymers; Present and Future" Chem. Rev. (2016) 116:14181-14224.
Ghilini, F. et al., "How Functionalized Surfaces Can Inhibit Bacterial Adhesion and Viability" ACS Biomater. Sci. Eng. (2019) 5:4920-4936.
Gracanin, M. et al., "Singlet-oxygen-mediated amino acid and protein oxidation: Formation of tryptophan peroxides and decomposition products" Free Radic. Biol. Med. (2009) 47:92-102.
Guyomard, A. et al., "Incorporation of a hydrophobic antibacterial peptide into amphiphilic polyelectrolyte multilayers: A bioinspired approach to prepare biocidal thin coatings" Adv. Funct. Mater. (2008) 18:758-765.
Han, X. et al., "Immobilised photosensitisers for continuous flow reactions of singlet oxygen in supercritical carbon dioxide" Chem. Sci. (2011) 2:1059-1067.
Iarikov, D. D. et al., "Antimicrobial surfaces using covalently bound polyallylamine" Biomacromolecules (2014) 15:169-176.
Jain, A. et al., "Antimicrobial Polymers" Adv. Healthc. Mater. (2014) 3:1969-1985.
Jellali, R. et al., "Photosensitive polydimethylsiloxane networks for adjustable-patterned films" Polym. Chem. (2017) 8:2499-2508.
Jiang, J. X. et al., "Conjugated microporous polymers with rose bengal dye for highly efficient heterogeneous organo-photocatalysis" Macromolecules (2013) 46:8779-8783.
Jin, J. et al., "Selective oxidation of amines using $O_2$ catalyzed by cobalt thioporphyrazine under visible light" J. Catal. (2018) 361:33-39.
Jin, X. et al., "Synthesis and antimicrobial activity of the Schiff base from chitosan and citral" Carbohydr. Res. (2009) 123:825-829.
Jothimuthu, P. et al., "Photodefinable PDMS thin films for microfabrication applications" J. Micromech. Microeng. (2009) 19:045024 (9pp).
Kebir, N. et al., "Preparation of bactericidal cationic PDMS surfaces using a facile and efficient approach" Appl. Surf. Sci. (2016) 360:866-874.
Locock, K. E. S. et al., "Guanylated polymethacrylates: A class of potent antimicrobial polymers with low hemolytic activity" Biomacromolecules (2013) 14:4021-4031.
Lowe, A. B., "Thiol-ene "click" reactions and recent applications in polymer and materials synthesis: A first update" Polym. Chem. (2014) 5:4820-4870.
Lu, J. et al., "Organic polymer supports for synthesis and for reagent and catalyst immobilization" Chem. Rev. (2009) 109:815-838.
Madkour, A. E. et al., "Fast disinfecting antimicrobial surfaces" Langmuir (2009) 25:1060-1067.

(56) References Cited

OTHER PUBLICATIONS

Massif, C. et al., "New insights into the water-solubilisation of fluorophores by post-synthetic "click" and Sonogashira reactions" Org. Biomol. Chem. (2012) 10:4330-4336.
Mcdonnell, G. et al., "Antiseptics and disinfectants: activity, action, and resistance" Clin. Microbiol. Rev. (1999) 12:147-179.
Mokkaphan, J. et al., "Silicone surface with drug nanodepots for medical devices" ACS Appl. Mater. Interfaces (2014) 6:20188-20196.
Morais, D. S. et al., "Antimicrobial approaches for textiles: From research to market" Materials (Basel) (2016) 9:498.
Pandey, P. et al., "Imine-linked microporous polymer organic frameworks" Chem. Mater. (2010) 22:4974-4979.
Peddinti, B. S. T. et al., "Photodynamic Polymers as Comprehensive Anti-Infective Materials: Staying Ahead of a Growing Global Threat" ACS Appl. Mater. Interfaces (2018) 10:25955-25959.
Pellosi, D. S. et al., "Photophysical properties and interactions of xanthene dyes in aqueous micelles" J. Photochem. Photobiol. A (2012) 247:8-15.
Popov, K. et al., "Synthesis and properties of novel fluorescent-tagged polyacrylate-based scale inhibitors" J. Appl. Polym. Sci. (2017) 134:45017 (11pp).
Radzishevsky, I. S. et al., "Improved antimicrobial peptides based on acyl-lysine oligomers" Nat. Biotechnol. (2007) 25:657-659.
Sahariah, P. et al., "Antimicrobial Chitosan and Chitosan Derivatives: A Review of the Structure-Activity Relationship" Biomacromolecules (2017) 18:3846-3868.
Schwartz, J. J. et al., "Multimaterial actinic spatial control 3D and 4D printing" Nat. Commun. (2019) 10:791.
Son, T. II et al., "Visible light-induced crosslinkable gelatin" Acta Biomater. (2010) 6:4005-4010.
Stukenbroeker, T. et al., "Polydimethylsiloxane quenchable vitrimers" Polym. Chem. (2017) 8:6590-6593.
Tamate, R. et al., "Photo-Dimerization Induced Dynamic Viscoelastic Changes in ABA Triblock Copolymer-Based Hydrogels for 3D Cell Culture" Chem. Mater. (2016) 28:6401-6408.
Tan, H. et al., "One-pot selective synthesis of azoxy compounds and imines via the photoredox reaction of nitroaromatic compounds and amines in water" Sci. Rep. (2019) 9:1280.
Taynton, P. et al., "Heat- or water-driven malleability in a highly recyclable covalent network polymer" Adv. Mater. (2014) 26:3938-3942.
Timofeeva, L. et al., "Antimicrobial polymers: Mechanism of action, factors of activity, and applications" Appl. Microbiol. Biotechnol. (2011) 89:475-492.
Van Damme, J. et al., "Anthracene-Based Thiol—Ene Networks with Thermo-Degradable and Photo-Reversible Properties" Macromolecules (2017) 50:1930-1938.
Wang, X. et al., "A metal-free polymeric photocatalyst for hydrogen production from water under visible light" Nat. Mater. (2009) 8:76-80.
Weber, D. J. et al., "Self-disinfecting surfaces: Review of current methodologies and future prospects" Am. J. Infect. Control (2013) 41:S31-S35.
Wright, T. et al., "Photoactivated Healable Vitrimeric Copolymers" Macromolecules (2019) 52:36-42.
Yilgör, E. et al., "Silicone containing copolymers: synthesis, properties and applications" Progress in Polymer Science (2014) 39:1165-1195.
Yue, J. et al., "3D-Printable Antimicrobial Composite Resins" Adv. Funct. Mater. (2015) 25:6756-6767.
Zhu, C. et al., "Tuning the physical properties of malleable and recyclable polyimine thermosets: The effect of solvent and monomer concentration" RSC Adv. (2017) 7:48303-48307.
Extended European Search Report dated Jan. 15, 2024 for EP Application No. 21750573.4, filed Feb. 2, 2021.
Mccarthy et al., "A Macrophage-Targeted Theranostic Nanoparticle for Biomedical Applications", Small (2006) 2(8-9):983-987.
Wright et al., "Visible-Light-Sensitized Photo-Oxidative Cross-Linking of Polysiloxanes Using Singlet Oxygen", ACS Appl. Polym. Mater. (2020) 2:4802-4808.
Zhao et al., "Leveraging a Polycationic Polymer to Direct Tunable Loading of an Anticancer Agent and Photosensitizer with Opposite Charges for Chemo-Photodynamic Therapy" J. Mater. Chem. B (2020) 8:1235-1244.
International Search Report and Written Opinion mailed Apr. 7, 2022 for PCT Application No. PCT/CA2021/050116, filed Feb. 2, 2021.

* cited by examiner

CROSS-LINKED POLYMERIC MATERIALS, METHODS OF THEIR PREPARATION AND USES THEREOF

CROSS-REFERENCE TO RELATED APPLICATIONS

The present disclosure claims the benefit of priority from U.S. provisional application No. 62/969,360 filed on Feb. 3, 2020, the contents of which are incorporated herein by reference in their entirety.

FIELD

The present disclosure relates to cross-linked polymeric materials, methods for preparing such cross-linked polymeric materials and their use, for example, as antimicrobial coatings.

BACKGROUND

Poly(dimethylsiloxane) (PDMS) is a widely used elastomeric polymer for industrial, medical, and consumer applications due, for example, to its durability, flexibility, and/or biocompatibility.[1] Photo-cross-linking of PDMS liquids or precursors allows for the fabrication of devices without the need for a mold.[2] Light-based methods for cross-linking polymers can provide substantially improved spatial and temporal control relative to thermally controlled methods. For example, the precision of optically induced cross-linking allows printing of sub-millimeter features using photomasks or two-photo absorption.[3] Photocurable systems can also be 3D printed using vat stereolithography (SLA) which can achieve print resolutions greater than conventional thermal deposition techniques at greater print speeds.[4] Microfluidic devices or prototypes can be rapidly produced with vat SLA techniques using acrylate-based systems, but require the use of ultraviolet (UV) light.[5] Photo-cross-linking of siloxanes is commonly performed using thiol-ene or vinyl chemistries using UV cleavage of a radical initiator.[5,6] Mechanistically distinct polymerization techniques have been employed in the preparation of multimaterial polymer constructs by wavelength-selective polymerization.[7]

Singlet oxygen ($^1O_2$) is a reactive oxygen species that can be photogenerated through oxygen quenching of the triplet excited state of sensitizing molecules.[8] $^1O_2$ has been explored for use in photodynamic therapy, water treatment, and for the stoichiometric coupling of small organic molecules.[9] A type of photocatalytic cross-linking involves the photogeneration of $^1O_2$ from irradiation of an inorganic or organic sensitizing dye. In this approach, singlet oxygen undergoes a stoichiometric reaction with an organic moiety, such as a diene. This approach has been used, for example, for the site-specific cross-linking of biological macromolecules such as deoxyribonucleic acid (DNA) and proteins,[10] and has also been used to photo-crosslink furan-modified gelatin for use as a bioadhesive.[11] Silicone photo-cross-linked using acrylate or thiol-ene UV chemistry has been studied for use in microfluidic device fabrication and photolithographic 3D printers, owing to its elastomeric properties, biocompatibility, and durability.[12]

Photocatalysts incorporated into polymers have been demonstrated for use in $H_2$ evolution, organic synthesis, and $^1O_2$ production, combining visible light photochemistry with these recyclable green catalyst motifs.[13] Polymer supported catalysts can provide a number of benefits over homogeneous molecular catalysts.[14] For example, stability, ability to be reused and recycled, and separation of products are properties that have been most prominently enhanced by integrating catalysts into polymeric materials.

Singlet oxygen can react with primary amine groups to give an imine coupled product, and has been reported as a source of permanent organic damage in biological systems.[15] A re-examination of this reaction has found it to be a simple and high yielding green reaction for the coupling of small organic molecules using visible light.[16] A variety of organometallic and heterogeneous inorganic sensitizers have been demonstrated for this transformation.[17] Imine cross-linked polymers prepared from amine and aldehyde condensation have been demonstrated by Zhang et. al as a type of thermally exchangeable vitrimeric polymer, allowing for the solvent-assisted recycling of thermoset materials.[18]

By employing either a liquid initiator or initiators soluble in the liquid monomer, solvent-free polymerizations can result in higher molecular weights and lower polydispersity values than comparable systems requiring the use of high solvent volumes.[19] As well, these systems may be easily scaled due to the lower reaction volume and lack of shrinkage upon crosslinking or solvent evaporation. The cost associated with solvent is mitigated, and there is no solvent waste leading to a greener environmental impact.[20]

Photo-initiated systems such as acrylate polymerization require only an initial input of light to begin the polymerization reaction.[21] The low concentration of photoinitiator in comparison with the polymer/monomer concentrations enables high optical penetration depths, overcoming a persistent problem for chemical processes involving light.

On the other hand, dimerization or cycloaddition reactions can be used in initiator/solvent free polymeric systems for photo-cross-linking, but require a constant input of light throughout the curing process.[22] This allows for temporal control of the system, where polymerization can be started or stopped by toggling the light source, but the high concentration of photo-active molecules inhibits light penetration. Photocatalytic polymerizations combine aspects from both photoinitiated and photocyclization systems. A constant input of light is required, but the low catalyst concentration can enable greater optical penetration.[23]

Xanthene dyes have been extensively studied for use in photodynamic therapy due to their high molar absorptivity and singlet oxygen quantum yields[24] and have a series of complex pH dependent tautomers (Scheme 1).[25] The non-cyclized free acid tautomer is primarily responsible for the strong absorbance in the visible region.[26]

Scheme 1

The three major tautomers for neutral xanthene dyes bearing carboxylic acid and amide functionalities. A closed lactone (left), free acid (middle) and zwitterionic (right) are possible, with only free acid isomer having absorbance in the visible region.

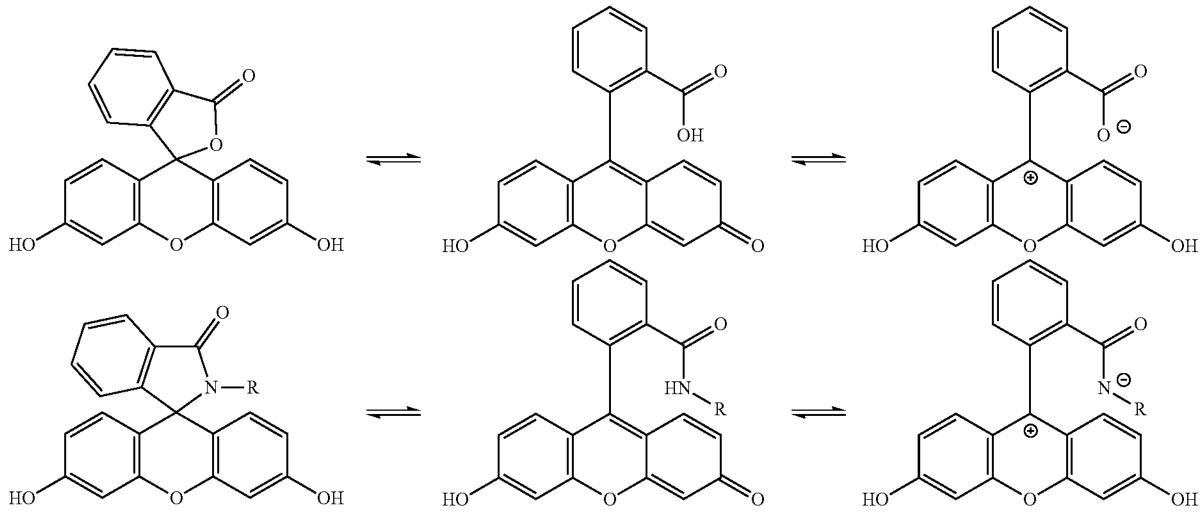

Contamination of solid surfaces by microbial organisms can lead to the formation of biofilms that enhance the transmission of drug-resistant bacterial infections.[27] Fomites (contaminated inanimate objects) are proposed to be a major vector in Hospital Acquired Infections (HAIs) that are estimated to cause almost 100,000 deaths each year in the United States.[28] Active decontamination of surfaces using substances such as but not limited to ethanol, hypochlorite, peroxides is an effective but time intensive method to address disease transmission. The development of surfaces and/or materials that can inhibit/kill microbial species is an approach to help address the global issue of disease transmission. Antimicrobial surfaces include those based on metal nanoparticles, nanoscale patterning, hydrophobic coatings, and amino- or phosphino-polymers or molecular surface functionalization.[29] Water solubility and detachment of the active material will reduce the material lifetime and may be toxic to healthy organisms and the environment.[30] For nanoparticle coatings and patterned surfaces, abrasion can remove the layer of active material rendering the surface inert. While hydrophobic coatings can be robust and low cost, they do not address the overall issue of microbial growth.

Antimicrobial polymers and biomaterials can possess high antibacterial activity and may not be limited to surface coatings. Primary amines are an antimicrobial functionality found in natural materials as well as in synthetic polymers including polyethyleneimine and polyallylamine.[31] These materials have been explored as antibacterial textile and surface coatings, but suffer from water solubility, prohibitive cost and/or poor mechanical properties. Conversion of primary amines to quaternary ammonium compounds (QACs), Schiff-bases, n-halamines, and guanidinium groups also results in enhanced bioactivity.[32] For example, Ren et. al used alkylated amine monomers for the 3D printing of mechanically robust antibacterial cross-linked composites[32](a). However, residual toxic monomers and photoinitiators must be removed through extensive washing for these photopolymerizable systems. Huang et. al previously demonstrated a dual-functional approach using the sequential deposition and reaction of ε-polylysine and zinc phthalocyanine onto cellulose fabric, requiring harsh chemical reaction conditions and lacking crosslinking of the polymer.[33]

Functionalized textiles with self-disinfecting or self-cleaning properties may play a key role in addressing the transmission of deadly pathogens.[34] For example, in health-care settings, HAIs result from pathogen transmission between patients and healthcare workers, primarily through contaminated surfaces.[35] Methods to prepare antimicrobial surfaces include cationic functionalization using amine groups, QACs, or phosphonium groups, microscale surface patterning, or the addition of metal nanoparticles.[36] These materials inactivate pathogens without the need for external stimulation, either through contact lysis or gradual release of metal ions.[36(a),37] Hydrophobic coatings can also be used to reduce microbial adhesion and prevent biofilm formation.[38] Antimicrobial photodynamic inactivation (aPDI) is an alternative strategy for antimicrobial textiles where light stimulates a photosensitizer to generate reactive oxygen species (ROS) from atmospheric $O_2$. The generated species can be either free radicals/radical ions (Type I) or singlet oxygen ($^1O_2$, Type II) and cause non-specific and irreversible damage to microbial membranes and intercellular components.[39] aPDI materials are effective against multiple types of pathogens including bacteria, virus, and fungi, and remain effective against antibiotic resistant bacteria.[40]

SUMMARY

The present disclosure includes a method for preparing a cross-linked polymeric material, the method comprising:

irradiating a polymer comprising a plurality of aliphatic primary amine moieties or precursors thereto in the presence of oxygen and a sensitizer to form imine cross-links via the oxidative coupling of at least a portion of the aliphatic primary amine moieties and obtain the cross-linked polymeric material.

In an embodiment, the polymer comprises a polysiloxane comprising the aliphatic primary amine moieties, a polysaccharide comprising the aliphatic primary amine moieties, a polyamide comprising the aliphatic primary amine moieties, a polyester comprising the aliphatic primary amine moieties or a polymethacrylate comprising the aliphatic primary amine moieties. In another embodiment, the polymer is of the general Formula (I):

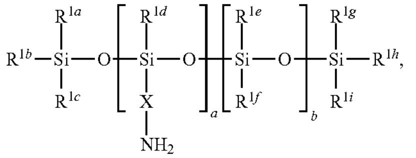

(I)

wherein $R^{1a}$, $R^{1b}$, $R^{1c}$, $R^{1d}$, $R^{1e}$, $R^{1f}$, $R^{1g}$, $R^{1h}$ and $R^{1i}$ are each independently $C_{1-10}$alkyl, $C_{3-10}$ cycloalkyl, $C_{1-6}$alkyleneC$_{3-10}$cycloalkyl, aryl or $C_{1-6}$alkylene-aryl;

each X is independently $C_{1-10}$alkylene or $C_{3-10}$cycloalkylene;

a is an integer of at least 2; and b is an integer of at least 1.

In an embodiment, $R^{1a}$, $R^{1b}$, $R^{1c}$, $R^{1d}$, $R^{1e}$, $R^{1f}$, $R^{1g}$, $R^{1h}$ and $R^{1i}$ are each independently $C_{1-6}$alkyl and each X is independently $C_{2-6}$alkylene. In another embodiment, $R^{1a}$, $R^{1b}$, $R^{1c}$, $R^{1d}$, $R^{1e}$, $R^{1f}$, $R^{1g}$, $R^{1h}$ and $R^{1i}$ are all methyl. In an embodiment, each X is $-(CH_2)_3-$.

In an embodiment, a/(a+b) is about 0.001 to about 0.4. In another embodiment, a/(a+b) is about 0.04 to about 0.08.

In an embodiment, the molecular mass of the polymer is from about 500 g/mol to about 100,000 g/mol. In another embodiment, the polymer is a (6-7% aminopropylmethylsiloxane)-dimethylsiloxane copolymer having a molecular mass of about 50,000 g/mol and/or a kinematic viscosity of about 1,800 cSt to about 2,200 cSt.

In an embodiment, the polymer is a random copolymer.

In an embodiment, the polymer comprises a combination of a polymer comprising the aliphatic primary amine moieties as side-chains and a polymer comprising end-terminated aliphatic primary amine moieties. In another embodiment, the polymer comprising end-terminated aliphatic primary amine moieties is of the general Formula (II):

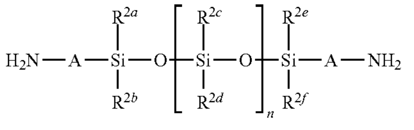

(II)

wherein $R^{2a}$, $R^{2b}$, $R^{2c}$, $R^{2d}$, $R^{2e}$ and $R^{2f}$ are each independently $C_{1-10}$alkyl, $C_{3-10}$cycloalkyl, $C_{1-6}$ alkyleneC$_{3-10}$cycloalkyl, aryl or $C_{1-6}$alkylene-aryl;

each A is independently $C_{1-10}$alkylene or $C_{3-10}$cycloalkylene; and n is an integer of at least 1.

In an embodiment, $R^{2a}$, $R^{2b}$, $R^{2c}$, $R^{2d}$, $R^{2e}$ and $R^{2f}$ are each independently $C_{1-6}$alkyl and each A is independently $C_{2-6}$alkylene. In another embodiment, $R^{2a}$, $R^{2b}$, $R^{2c}$, $R^{2d}$, $R^{2e}$ and $R^{2f}$ are all methyl. In a further embodiment, each A is $-(CH_2)_3-$.

In an embodiment, the molecular mass of the polymer comprising end-terminated aliphatic primary amine moieties is from about 500 g/mol to about 100,000 g/mol. In another embodiment, the polymer comprising end-terminated aliphatic primary amine moieties is an aminopropyl-terminated polydimethylsiloxane having a molecular mass of about 850 g/mol to about 900 g/mol and/or a kinematic viscosity of about 10 to about 15 cSt.

In an embodiment, the sensitizer is selected from an acridine, a porphyrin, a metalloporphyrin, a xanthene, a methylene blue, a metal oxide and combinations thereof.

In an embodiment, prior to irradiation, the method comprises depositing the polymer and the sensitizer on a surface. In another embodiment, the irradiating comprises exposure of the polymer and the sensitizer deposited on the surface through a mask defining a pattern. In a further embodiment, the method further comprises removing the unexposed polymer and sensitizer thereby leaving the cross-linked polymeric material on the surface. In an embodiment, the surface comprises a mold. In an embodiment, the depositing comprises cryo-deposition, direct-write printing or vat stereolithography. In an embodiment, the method further comprises removing the cross-linked polymeric material from the surface. In another embodiment, the surface comprises a textile.

In an embodiment, the irradiation comprises irradiating a solution comprising the polymer and the sensitizer. In an embodiment, the sensitizer is coupled to at least a portion of the polymer chains of the polymer. In another embodiment, prior to irradiation and optionally deposition, the sensitizer is coupled to the polymer chains via a method comprising reacting a sensitizer comprising an amine-reactive group with the polymer comprising the plurality of aliphatic primary amine moieties. In an embodiment, the irradiation comprises solvent-free conditions. In another embodiment, the irradiation comprises irradiation of a solution comprising the sensitizer coupled to the at least a portion of the polymer chains. In an embodiment, the sensitizer is a xanthene. In another embodiment, the sensitizer is rose bengal. In an embodiment, the sensitizer coupled to the at least a portion of the polymer chains absorbs light in a first region, the solution further comprises a second sensitizer that absorbs light in a second region, and the irradiation comprises irradiation of the solution at a wavelength in the second region. In an embodiment, the second sensitizer is a porphyrin. In another embodiment, the porphyrin is tetraphenylporphyrin.

The present disclosure also includes a cross-linked polymeric material prepared by such a method.

The present disclosure also includes a polymer comprising:

a polymer chain comprising a plurality of aliphatic primary amine moieties or precursors thereto as side-chains; and a sensitizer coupled to the polymer chain via a moiety obtained from reaction of an aliphatic primary amine moiety with an amine-reactive group on the sensitizer.

In an embodiment, the polymer chain comprises a polysiloxane, a polysaccharide, a polyamide, a polyester or a polymethacrylate. In another embodiment, the polymer is of the general Formula (III):

(III)

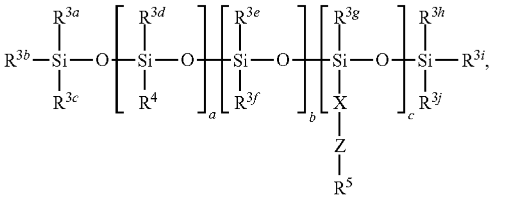

wherein $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are each independently $C_{1-10}$alkyl, $C_{3-10}$cycloalkyl, $C_{1-6}$alkyleneC$_{3-10}$cycloalkyl, aryl or $C_{1-6}$alkylene-aryl;

$R^4$ is —X—$NH_2$ or the precursor thereto;

each X is independently $C_{1-10}$alkylene or $C_{3-10}$cycloalkylene;

each Z is independently the moiety obtained from reaction of the aliphatic primary amine moiety with the amine-reactive group on the sensitizer;

$R^5$ is the remainder of the sensitizer;

a is an integer of at least 2;

b is an integer of at least 1; and c is an integer of at least 1.

In an embodiment, $R^4$ is —X—$NH_2$.

In an embodiment, $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are each independently $C_{1-6}$alkyl and each X is independently $C_{2-6}$alkylene. In another embodiment, $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are all methyl. In an embodiment, each X is —$(CH_2)_3$—.

In an embodiment, each Z is an amide.

In an embodiment, (a+c)/(a+b+c) is about 0.001 to about 0.4. In another embodiment, (a+c)/(a+b+c) is about 0.04 to about 0.08. In an embodiment, c/(a+b+c) is about 0.0001 to about 0.1. In another embodiment, c/(a+b+c) is about 0.001 to about 0.02.

In an embodiment, the sensitizer is an acridine comprising an amine-reactive group, a porphyrin comprising an amine-reactive group, a metalloporphyrin comprising an amine-reactive group, a xanthene comprising an amine-reactive group, a methylene blue comprising an amine-reactive group or combinations thereof. In another embodiment of the present disclosure, the sensitizer is a xanthene comprising an amine-reactive group. In a further embodiment, the sensitizer is rose bengal.

In an embodiment, the molecular mass of a corresponding polymer having primary amine moieties instead of the sensitizer coupled to the polymer chain is from about 500 g/mol to about 100,000 g/mol. In another embodiment, a corresponding polymer having primary amine moieties instead of the sensitizer coupled to the polymer chain is a (6-7% aminopropylmethylsiloxane)-dimethylsiloxane copolymer having a molecular mass of about 50,000 g/mol and/or a kinematic viscosity of about 1,800 cSt to about 2,200 cSt.

In an embodiment, the polymer is a random copolymer.

The present disclosure also includes a composition comprising, consisting essentially of or consisting of such a polymer and a corresponding polymer having primary amine moieties instead of the sensitizer coupled to the polymer chain.

The present disclosure also includes a use of such a polymer or such a composition for preparing a cross-linked polymeric material.

The present disclosure also includes a method for preparing a cross-linked polymeric material, the method comprising:

irradiating such a polymer in the presence of oxygen to form imine cross-links via the oxidative coupling of at least a portion of the aliphatic primary amine moieties and obtain the cross-linked polymeric material.

In an embodiment, the polymer is in the form of a composition comprising, consisting essentially of or consisting of the polymer and a corresponding polymer having primary amine moieties instead of the sensitizer coupled to the polymer chain.

In an embodiment, the polymer further comprises a polymer comprising end-terminated aliphatic primary amine moieties. In another embodiment, the polymer comprising end-terminated aliphatic primary amine moieties is of the general Formula (II):

(II)

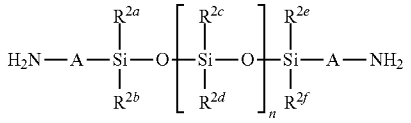

wherein $R^{2a}$, $R^{2b}$, $R^{2c}$, $R^{2d}$, $R^{2e}$ and $R^{2f}$ are each independently $C_{1-10}$alkyl, $C_{3-10}$cycloalkyl, $C_{1-6}$ alkyleneC$_{3-10}$cycloalkyl, aryl or $C_{1-6}$alkylene-aryl;

each A is independently $C_{1-10}$alkylene or $C_{3-10}$cycloalkylene; and n is an integer of at least 1.

In an embodiment, $R^{2a}$, $R^{2b}$, $R^{2c}$, $R^{2d}$, $R^{2e}$ and $R^{2f}$ are each independently $C_{1-6}$alkyl and each A is independently $C_{2-6}$alkylene. In another embodiment, $R^{2a}$, $R^{2b}$, $R^{2c}$, $R^{2d}$, $R^{2e}$ and $R^{2f}$ are all methyl. In a further embodiment, each A is —$(CH_2)_3$—.

In an embodiment, the molecular mass of the polymer comprising end-terminated aliphatic primary amine moieties is from about 500 g/mol to about 100,000 g/mol. In another embodiment, the polymer comprising end-terminated aliphatic primary amine moieties is an aminopropyl-terminated polydimethylsiloxane having a molecular mass of about 850 g/mol to about 900 g/mol and/or a kinematic viscosity of about 10 to about 15 cSt.

In an embodiment, prior to irradiation, the method comprises depositing the polymer on a surface. In another embodiment, the irradiating comprises exposure of the polymer deposited on the surface through a mask defining a pattern. In a further embodiment, the method further comprises removing the unexposed polymer thereby leaving the cross-linked polymeric material on the surface. In an embodiment, the surface comprises a mold. In another embodiment, the depositing comprises cryo-deposition, direct-write printing or vat stereolithography. In an embodiment, the method further comprises removing the cross-linked polymeric material from the surface. In an embodiment, the surface comprises a textile.

In an embodiment, the irradiation comprises solvent-free conditions. In another embodiment, the irradiation comprises irradiating a solution comprising the polymer. In another embodiment, the sensitizer coupled to the polymer chain absorbs light in a first region, the solution further comprises a second sensitizer that absorbs light in a second region, and the irradiation comprises irradiation of the solution at a wavelength in the second region. In another embodiment of the present disclosure, the second sensitizer is a porphyrin. In a further embodiment, the porphyrin is tetraphenylporphyrin.

The present disclosure also includes a cross-linked polymeric material prepared by such a method.

The present disclosure also includes a cross-linked polymeric material comprising:

polymer chains cross-linked by imine moieties obtained via the oxidative coupling of aliphatic primary amine moieties; and a sensitizer coupled to at least a portion of the polymer chains via a moiety obtained from reaction of an aliphatic primary amine moiety with an amine-reactive group on the sensitizer.

In an embodiment, the cross-linked polymeric material further comprises a plurality of aliphatic primary amine moieties.

In an embodiment, the polymer chains comprise a polysiloxane, a polysaccharide, a polyamide, a polyester or a polymethacrylate. In another embodiment, the cross-linked polymeric material is of the general Formula (IV):

(IV)

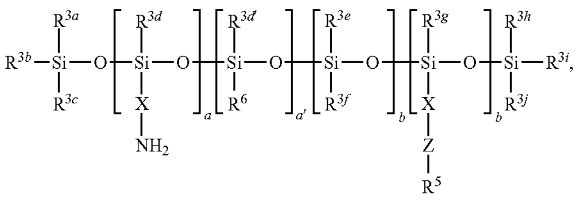

wherein $R^{3a}$, $R^{3c}$, $R^{3d}$, $3^{d'}$ $R^{3e}$, $R^{3f}$, $R^{3g}$, $R^{3h}$ and $R^{3j}$ are each independently $C_{1-10}$alkyl, $C_{3-10}$ cycloalkyl, $C_{1-6}$alkyleneC$_{3-10}$cycloalkyl, aryl or $C_{1-6}$alkylene-aryl;

$R^{3b}$ and $R^{3i}$ are each independently $C_{1-10}$alkyl, $C_{3-10}$cycloalkyl, $C_{1-6}$alkyleneC$_{3-10}$ cycloalkyl, aryl, $C_{1-6}$alkylene-aryl, —X—$NH_2$ or $R^6$;

$R^6$ is a portion of an imine cross-link formed from the oxidative coupling of two —X—$NH_2$ moieties;

each X is independently $C_{1-10}$alkylene or $C_{3-10}$cycloalkylene;

each Z is independently the moiety obtained from reaction of the aliphatic primary amine moiety with the amine-reactive group on the sensitizer;

$R^5$ is the remainder of the sensitizer;

a is an integer of at least 1;

a' is an integer of at least 1;

b is an integer of at least 1; and c is an integer of at least 1.

In an embodiment, $R^{3a}$, $R^{3b}$, $R^{3c}$, $R^{3d}$, $R^{3d'}$, $R^{3e}$, $R^{3f}$, $R^{3g}$, $R^{3h}$, $R^{3i}$ and $R^{3j}$ are each independently $C_{1-6}$alkyl and each X is independently $C_{2-6}$alkylene. In another embodiment, $R^{3a}$, $R^{3b}$, $R^{3c}$, $R^{3d}$, $R^{3d'}$ $R^{3e}$, $R^{3f}$, $R^{3g}$, $R^{3h}$, $R^{3i}$ and $R^{3j}$ are all methyl. In an embodiment, each X is —$(CH_2)_3$—.

In an embodiment, each Z is an amide.

In an embodiment, (a+a'+c)/(a+a'+b+c) is about 0.001 to about 0.4. In another embodiment, (a+a'+c)/(a+a'+b+c) is about 0.04 to about 0.08. In an embodiment, c/(a+a'b+c) is about 0.0001 to about 0.1. In another embodiment, c/(a+a'b+c) is about 0.001 to about 0.02.

In an embodiment, the sensitizer is selected from an acridine comprising the amine-reactive group, a porphyrin comprising the amine-reactive group, a metalloporphyrin comprising the amine-reactive group, a xanthene comprising the amine-reactive group, a methylene blue comprising the amine-reactive group and combinations thereof. In another embodiment of the present disclosure, the sensitizer is a xanthene comprising the amine-reactive group. In a further embodiment, the sensitizer is rose bengal.

In an embodiment, the molecular mass of a corresponding polymer having primary amine moieties instead of the imine moieties and the sensitizer coupled to the polymer chain is from about 500 g/mol to about 100,000 g/mol. In another embodiment, a corresponding polymer having primary amine moieties instead of the imine moieties and the sensitizer coupled to the polymer chain is a (6-7% aminopropylmethylsiloxane)-dimethylsiloxane copolymer having a molecular mass of about 50,000 g/mol and/or a kinematic viscosity of about 1,800 cSt to about 2,200 cSt.

In an embodiment, the corresponding polymer having primary amine moieties instead of the imine moieties and the sensitizer coupled to the polymer chain is a random copolymer.

The present disclosure also includes a use of a cross-linked polymeric material as described herein as an antimicrobial coating or surface.

The present disclosure also includes a use of a cross-linked polymeric material as described herein as an antimicrobial agent.

The present disclosure also includes a use of a cross-linked polymeric material as described herein for reducing microbes on a surface.

The present disclosure also includes a method of preparing an antimicrobial textile material, the method comprising:

treating a textile with a solution comprising (i) a polymer, the polymer comprising: a polymer chain comprising a plurality of aliphatic primary amine moieties or precursors thereto as side-chains; and a sensitizer coupled to the polymer chain via a moiety obtained from reaction of an aliphatic primary amine moiety with an amine-reactive group on the sensitizer, wherein the first sensitizer absorbs light in a first region; and (ii) a second sensitizer that absorbs light in a second region; and irradiating the treated textile at a wavelength in the second region in the presence of oxygen to form imine cross-links via the oxidative coupling of at least a portion of the aliphatic primary amine moieties to obtain a cross-linked polymeric material attached to the textile.

In an embodiment, the polymer is in the form of a composition comprising, consisting essentially of or consisting of the polymer and a corresponding polymer having primary amine moieties instead of the sensitizer coupled to the polymer chain.

In an embodiment, the treating comprises soaking the textile with the solution comprising the polymer and the second sensitizer.

In an embodiment, the second sensitizer is a porphyrin. In another embodiment of the present disclosure, the porphyrin is tetraphenylporphyrin.

In an embodiment, the textile comprises cotton, linen, polyester, denim, silk, paper or combinations thereof.

The present disclosure also includes an antimicrobial textile material prepared from a such a method of preparing an antimicrobial textile material.

The present disclosure also includes an antimicrobial textile material comprising a cross-linked polymeric material as described herein coated on a textile.

In an embodiment, the textile comprises cotton, linen, polyester, denim, silk, paper or combinations thereof.

In an embodiment, the microbes are bacteria.

The present disclosure also includes a microfluidics device comprising a cross-linked polymeric material as described herein.

Other features and advantages of the present disclosure will become apparent from the following detailed description. It should be understood, however, that the detailed description and the specific examples, while indicating embodiments of the disclosure, are given by way of illustration only and the scope of the claims should not be limited by these embodiments, but should rather be given the broadest interpretation consistent with the description as a whole.

DETAILED DESCRIPTION

I. Definitions

Figure 1:
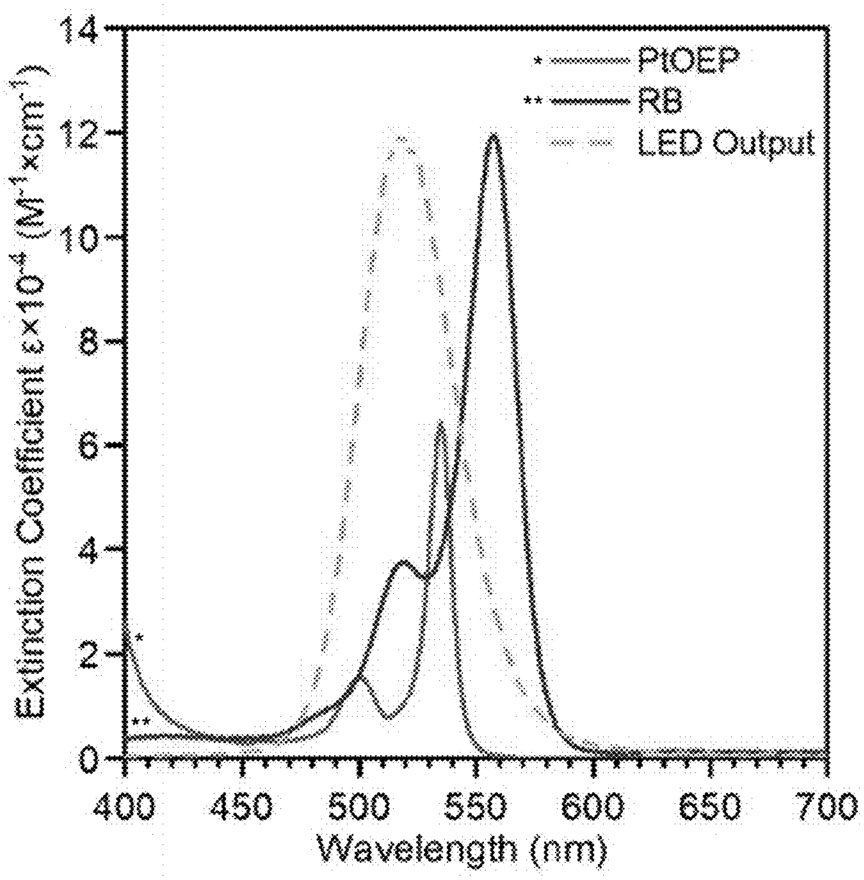
FIG. 1 shows ultraviolet-visible (UV-VIS) absorbance spectra of platinum octaethylporphyrin (PtOEP), Rose Bengal (RB), and the spectral output of green light-emitting diodes (LEDs) used for irradiation. Spectra were collected in dichloromethane (DCM; $2.47\times10^{-6}$ M) and methanol (MeOH; $1.17\times10^{-6}$ M) respectively.

Unless otherwise indicated, the definitions and embodiments described in this and other sections are intended to be applicable to all embodiments and aspects of the disclosure herein described for which they would be understood to be suitable by a person skilled in the art.

Terms of degree such as "about" and "approximately" as used herein mean a reasonable amount of deviation of the modified term such that the end result is not significantly changed. These terms of degree should be construed as including a deviation of at least ±5% of the modified term if this deviation would not negate the meaning of the term it modifies.

The term "and/or" as used herein means that the listed items are present, or used, individually or in combination. In effect, this term means that "at least one of" or "one or more" of the listed items is present or used.

As used in this disclosure, the singular forms "a", "an" and "the" include plural references unless the content clearly dictates otherwise.

As used herein, the words "comprising" (and any form thereof, such as "comprise" and "comprises"), "having" (and any form thereof, such as "have" and "has"), "including" (and any form thereof, such as "include" and "includes") or "containing" (and any form thereof, such as "contain" and "contains"), are inclusive or open-ended and do not exclude additional, unrecited elements or process/method steps. As used herein, the word "consisting" and its derivatives are intended to be close-ended terms that specify the presence of the stated features, elements, components, groups, integers and/or steps, and also exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of these features, elements, components, groups, integers and/or steps.

The term "suitable" as used herein means that the selection of the particular compound, material and/or conditions would depend on the specific synthetic manipulation to be performed, and/or the identity of the compound(s) to be transformed, but the selection would be well within the skill of a person skilled in the art. All method steps described herein are to be conducted under conditions sufficient to provide the product shown. A person skilled in the art would understand that all reaction conditions, including, for example, reaction solvent or lack thereof, reaction time, reaction temperature, reaction pressure, reactant ratio and whether or not the reaction should be performed under an anhydrous or inert atmosphere, can be varied to optimize the yield of the desired product and it is within their skill to do so.

The expression "proceed to a sufficient extent" as used herein with reference to the reactions or method steps disclosed herein means that the reactions or method steps proceed to an extent that conversion of the starting material or substrate to product is maximized. Conversion may be maximized when greater than about 5, 10, 15, 20, 25, 30, 35, 40, 45, 50, 55, 60, 65, 70, 75, 80, 85, 90, 95 or 100% of the starting material or substrate is converted to product.

The term "alkyl" as used herein, whether it is used alone or as part of another group, means straight or branched chain, saturated alkyl groups. The number of carbon atoms that are possible in the referenced alkyl group are indicated by the numerical prefix "$C_{n1-n2}$". For example, the term $C_{1-6}$alkyl means an alkyl group having 1, 2, 3, 4, 5 or 6 carbon atoms.

The term "alkylene" as used herein, whether it is used alone or as part of another group, means a straight or branched chain, bivalent form of an alkane, that is, a saturated carbon chain that links two other groups. The number of carbon atoms that are possible in the referenced alkylene group are indicated by the numerical prefix "$C_{n1-n2}$". For example, the term $C_{1-6}$alkylene means an alkylene group having 1, 2, 3, 4, 5 or 6 carbon atoms.

The term "aryl" as used herein, whether it is used alone or as part of another group, refers to groups that contain at least one aromatic ring. When an aryl group contains more than one aromatic ring the term "aryl" as used herein includes condensed aromatic systems and moieties in which the aromatic rings are linked by a single bond. In an embodiment, the aryl group contains from 6, 9, 10 or 14 atoms, such as phenyl, naphthyl, indanyl or anthracenyl.

The term "cycloalkyl" as used herein, whether it is used alone or as part of another group, means a mono- or bicyclic, saturated cycloalkyl group. The number of carbon atoms that are possible in the referenced cycloalkyl group are indicated by the numerical prefix "$C_{n1-n2}$". For example, the term $C_{3-10}$cycloalkyl means a cycloalkyl group having 3, 4, 5, 6, 7, 8, 9 or 10 carbon atoms. When a cycloalkyl group contains more than one cyclic structure or rings, the cyclic structures may be fused, bridged, spiro connected or linked by a single bond. The term "fused" as used herein in reference to a first cyclic structure being "fused" with a second cyclic structure means the first cyclic structure and the second cyclic structure share at least two adjacent atoms therebetween. The term "bridged" as used herein in reference to a first cyclic structure being "bridged" with a second cyclic structure means the first cyclic structure and the second cyclic structure share at least two non-adjacent atoms therebetween. The term "spiro-connected" in reference to a first cyclic structure being "spiro connected" with a second cyclic structure means the first cyclic structure and the second cyclic structure share one atom therebetween.

The term "cycloalkylene" as used herein, whether it is used alone or as part of another group, means a bivalent form of a cycloalkane, that is, a saturated cycloalkane that links two other groups. The number of carbon atoms that are possible in the referenced cycloalkylene group are indicated by the numerical prefix "$C_{n1-n2}$". For example, the term $C_{3-10}$cycloalkylene means a cycloalkylene group having 3, 4, 5, 6, 7, 8, 9 or 10 carbon atoms.

The term "halide" as used herein refers to a halogen atom substituent.

The term "aliphatic primary amine moieties" and the like as used herein refers to any suitable moiety comprising an —$NH_2$ group bonded to an aliphatic carbon. In some embodiments, the aliphatic carbon is part of a side-chain that links the $NH_2$ group to the polymer chain. In alternative embodiments (e.g, wherein the polymer comprises chitosan), the —$NH_2$ group is directly bonded to an aliphatic carbon that is part of the polymer chain.

The term "precursor thereto" as used herein in reference to aliphatic primary amine moieties refers to a moiety that can be converted to an aliphatic primary amine, for example, via light, heat and/or chemical means. In an embodiment, the conversion to the aliphatic primary amine is in situ. In another embodiment, the precursor to the aliphatic primary amine moieties is an aliphatic primary amine in which one or both hydrogen atoms are protected by a protecting group. The term "protecting" as used herein refers to using a chemical moiety, that is a "protecting group" which protects or masks a reactive portion of a molecule to prevent side reactions in that reactive portion of the molecule, while manipulating or reacting a different portion of the molecule. After the manipulation or reaction is complete, the protecting group is removed under conditions that do not degrade or decompose the remaining portions of the molecule; i.e. the protected reactive portion of the molecule is "deprotected". The selection of a suitable protecting group can be made by a person skilled in the art. Many conventional protecting groups are known in the art, for example as described in "Protective Groups in Organic Chemistry" McOmie, J. Ed., Plenum Press, 1973, in Greene, T. W. and Wuts, P. G. M., "Protective Groups in Organic Synthesis", John Wiley & Sons, 4th Edition, 2006 and in Kocienski, P. "Protecting Groups", 3rd Edition, 2003, Georg Thieme Verlag (The Americas). In a further embodiment, the precursor to the aliphatic primary amine moieties is a corresponding aliphatic halide (e.g. an aliphatic chloride or bromide), aliphatic nitrile, aliphatic aldehyde or aliphatic amide that is converted to the aliphatic primary amine moiety. The selection of suitable conditions and/or reagents for converting the aliphatic halide, aliphatic nitrile, aliphatic aldehyde and/or aliphatic amide to the corresponding aliphatic primary amine moiety can be readily selected by the person skilled in the art.

II. Methods of Preparation

Photo-cross-linking of polymeric materials generally requires an inert atmosphere because of oxygen-based inhibition and quenching of the reactive species. Herein, the photo-oxidative cross-linking of amine-functionalized polymers in the presence of oxygen as the chemical oxidant is described. Irradiation of a sensitizer such as a metalloporphyrin or organic sensitizer generates reactive singlet oxygen that oxidatively couples amines into imine crosslinks. This facile benchtop cross-linking reaction may proceed at room temperature and resulted in solvent-free elastic materials e.g. after one hour. Solid state $^{13}C$ nuclear magnetic resonance (NMR) and Fourier transform infrared (FT-IR) spectroscopy showed that the reaction produced only imine functionalities with no side products observed. Mechanical properties of these polymers were tested using tensile experiments and were found to depend on the initial loading of sensitizer. Photolithography was demonstrated with this cross-linking system using visible light irradiation. A solvent-free system is also described where amines can play a dual role as antimicrobial functionalities and cross-linking sites. The methods can be used to prepare cross-linked polymeric materials through a variety of means of deposition such as low-temperature deposition in the case of the solvent-free system as well as direct-write patterning and stereolithography on glass substrates and treatment of textiles. The development of low cost, non-toxic, scalable antimicrobial textiles are desirable, for example, to address the spread of pathogens in healthcare settings. Here, a novel polymeric coating is described that possesses two modes of antimicrobial inactivation, passive contact killing through amine/imine functionalities and active photodynamic inactivation through the generation of reactive oxygen species (ROS). This material can, for example, be coated and crosslinked onto natural and/or synthetic textiles through a simple soak procedure followed by UV cure to give materials that exhibited no leaching in water and only minimal leaching in strong organic solvents. This coating minimally impacted the fabric's mechanical properties while also imparting hydrophobicity with contact angles of between 131°-147°. Passive inactivation of *E. Coli* was achieved with >98% inactivation after 24 hours, with a 6.5× inactivation rate increase when green light was used to generate ROS.

Accordingly, the present disclosure includes a method for preparing a cross-linked polymeric material, the method comprising:

irradiating a polymer comprising a plurality of aliphatic primary amine moieties or precursors thereto in the presence of oxygen and a sensitizer to form imine cross-links via the oxidative coupling of at least a portion of the aliphatic primary amine moieties and obtain the cross-linked polymeric material.

In an embodiment, the polymer comprises the plurality of aliphatic primary amine moieties. In another embodiment, the polymer comprises the precursors thereto. In such embodiments, wherein the polymer comprises the precursors thereto, the method further comprises converting the precursor thereto to the aliphatic primary amine moiety prior to the oxidative coupling. In an embodiment, the conversion to the primary amine moiety is in situ.

The polymer can be any suitable polymer. In an embodiment, the polymer comprises a polysiloxane comprising the aliphatic primary amine moieties, a polysaccharide comprising the aliphatic primary amine moieties, a polyamide comprising the aliphatic primary amine moieties, a polyester comprising the aliphatic primary amine moieties or a polymethacrylate comprising the aliphatic primary amine moieties.

In an embodiment, the polymer comprises a polysaccharide comprising the aliphatic primary amine moieties. In another embodiment, the polymer comprises a polyamide comprising the aliphatic primary amine moieties. In another embodiment, the polymer comprises a polyester comprising the aliphatic primary amine moieties. In a further embodiment, the polymer comprises a polymethacrylate comprising the aliphatic primary amine moieties.

In an embodiment, the polysaccharide comprising the aliphatic primary amine moieties is chitosan. The term "chitosan" as used herein refers to a polysaccharide having a linear chain of 2-amino-2-deoxy-D-glucopyranose and 2-acetamido-2-deoxy-D-glucopyranose repeating units linked by β(1→4). Chitosan is readily available from commercial sources or alternatively can be prepared from a suitable process, for example, from a process comprising the deacetylation of chitin, a component of cell walls in fungi and of the exoskeletons of arthropods such as but not limited to crustaceans. The selection of a suitable source and/or method of preparation of the polysaccharide comprising the aliphatic primary amine (e.g. chitosan) can be readily made by the person skilled in the art.

The term "polyamide" as used herein refers to a polymer with repeating units linked by amide moieties. In an embodiment, the polyamide comprising the aliphatic primary amine moieties is α-polylysine. α-Polylysine is readily available from commercial sources. The selection of a suitable source and/or method of preparation of the polyamide comprising the aliphatic primary amine moieties (e.g. α-polylysine) can be readily made by the person skilled in the art.

The term "polyester" as used herein refers to a polymer with repeating units linked by ester moieties. Polyesters comprising aliphatic primary amine moieties can be readily prepared by a suitable process, the selection of which can be made by a person skilled in the art. For example, a lysine-like polymer can be prepared via a process comprising ring-opening polymerization of an O-carboxyanhydride monomer comprising a protected aliphatic primary amine moiety (for example, a lysine sidechain protected with a suitable group such as a carboxybenzyl group) followed by deprotection to obtain the polyester comprising the aliphatic primary amine moieties (see, e.g. Chen et al., Polym. Chem. 2014, 5, 6495-6502).[41] The selection of a suitable source and/or method of preparation of the polyester comprising the primary amine moieties can be readily made by the person skilled in the art.

In an embodiment, the polymethacrylate comprising the aliphatic primary amine moieties is a copolymer of an alkyl acrylate and an aminoalkylene-alkyl acrylate. In another embodiment, the polymethacrylate comprising the aliphatic primary amine is a copolymer of methacrylate and an aminoalkylene-methacrylate (for example, 3-aminopropylmethacrylate). Processes for preparing such copolymers are well known in the art and the selection of a suitable method can be readily made by the person skilled in the art. For example, such copolymers may be prepared by a method comprising aqueous reversible addition-fragmentation chain transfer (RAFT) polymerization of the desired monomers and/or by a method comprising atom transfer radical polymerization (ATRP) of the desired monomers. The selection of a suitable source and/or method of preparation of the polymethacrylate comprising the primary amine moieties (e.g. the copolymer of methacrylate and 3-aminopropylmethacrylate) can be readily made by the person skilled in the art.

In an embodiment, the polymer comprises a polysiloxane comprising the primary amine moieties. Polysiloxanes comprising aliphatic primary amine moieties are readily available from commercial sources or alternatively can be prepared from a suitable process. For example, a variety of routes for preparing polysiloxanes such as poly(dimethylsiloxane) s are known such as those comprising condensation or ring-opening of suitable monomers.[42] The selection of a suitable source and/or method of preparation of the polysiloxane comprising the primary amine moieties can be readily made by the person skilled in the art.

In an embodiment, the polysiloxane comprising the aliphatic primary amine moieties is of the general Formula (I):

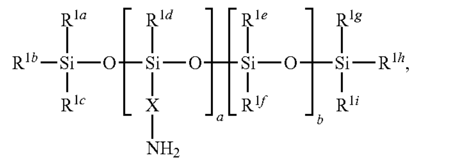

(I)

wherein $R^{1a}$, $R^{1b}$, $R^{1c}$, $R^{1d}$, $R^{1e}$, $R^{1f}$, $R^{1g}$, $R^{1h}$ and $R^{1i}$ are each independently $C_{1-10}$alkyl, $C_{3-10}$cycloalkyl, $C_{1-6}$alkylene$C_{3-10}$cycloalkyl, aryl or $C_{1-6}$alkylene-aryl;

each X is independently $C_{1-10}$alkylene or $C_{3-10}$cycloalkylene;

a is an integer of at least 1, optionally at least 2; and b is an integer of at least 1.

In an embodiment, $R^{1a}$, $R^{1b}$, $R^{1c}$, $R^{1d}$, $R^{1e}$, $R^{1f}$, $R^{1g}$, $R^{1h}$ and $R^{1i}$ are each independently $C_{1-10}$alkyl or aryl. In another embodiment, $R^{1a}$, $R^{1b}$, $R^{1c}$, $R^{1d}$, $R^{1e}$, $R^{1f}$, $R^{1g}$, $R^{1h}$ and $R^{1i}$ are each independently $C_{1-6}$alkyl. In a further embodiment, $R^{1a}$, $R^{1b}$, $R^{1c}$, $R^{1d}$, $R^{1e}$, $R^{1f}$, $R^{1g}$, $R^{1h}$ and $R^{1i}$ are each independently $C_{1-4}$alkyl. In another embodiment of the present disclosure, $R^{1a}$, $R^{1b}$, $R^{1c}$, $R^{1d}$, $R^{1e}$, $R^{1f}$, $R^{1g}$, $R^{1h}$ and $R^{1i}$ are all methyl.

In an embodiment, each X is independently $C_{1-10}$alkylene. In another embodiment, each X is independently $C_{2-6}$alkylene. In a further embodiment, each X is $-(CH_2)_3-$.

a and b represent the numbers of monomeric units. In an embodiment, a/(a+b) is about 0.001 to about 0.4. In another embodiment, a/(a+b) is about 0.01 to about 0.2. In a further embodiment, a/(a+b) is about 0.04 to about 0.08. In another embodiment, a/(a+b) is about 0.06.

In an embodiment, the molecular mass of the polymer is from about 500 g/mol to about 1,000,000 g/mol. In another embodiment, the molecular mass of the polymer is from about 500 g/mol to about 100,000 g/mol. In another embodiment, the molecular mass of the polymer is from about 40,000 g/mol to about 60,000 g/mol or about 50,000 g/mol.

In an embodiment, the polysiloxane comprising the aliphatic primary amine moieties is an (aminopropylmethylsiloxane)-dimethylsiloxane copolymer. In another embodiment, the polysiloxane comprising the aliphatic primary amine moieties is an (aminopropylmethylsiloxane)-dimethylsiloxane copolymer with about 1-40% aminopropylmethylsiloxane, about 2-25% aminopropylmethylsiloxane, about 2-3% aminopropylmethylsiloxane, about 4-5% aminopropylmethylsiloxane, about 6-7% aminopropylmethylsiloxane, about 9-11% aminopropylmethylsiloxane, about 20-25% aminopropylmethylsiloxane or combinations thereof. In a further embodiment, the polysiloxane comprising the aliphatic primary amine moieties is a (2-3% aminopropylmethylsiloxane)-dimethylsiloxane copolymer having a molecular mass of about 4,500 g/mol to about 6,000 g/mol and/or a kinematic viscosity of about 80 cSt to about 120 cSt (e.g. the polymer having Gelest product code AMS-132), a (4-5% aminopropylmethylsiloxane)-dimethylsiloxane copolymer having a molecular mass of about 7,000 g/mol to about 9,000 g/mol and/or a kinematic viscosity of about 100 cSt to about 300 cSt (e.g. the polymer having Gelest product code AMS-152), a (6-7% aminopropylmethylsiloxane)-dimethylsiloxane copolymer having a molecular mass of about 4,000 g/mol to about 5,000 g/mol and/or a kinematic viscosity of about 80 cSt to about 120 cSt (e.g. the polymer having Gelest product code AMS-162) or having a molecular mass of about 50,000 g/mol and/or a kinematic viscosity of about 1,800 cSt to about 2,200 cSt (e.g. the polymer having Gelest product code AMS-163), a (9-11% aminopropylmethylsiloxane)-dimethylsiloxane copolymer having a molecular mass of about 2,000 g/mol to about 3,000 g/mol and/or a kinematic viscosity of about 40 cSt to about 60 cSt (e.g. the polymer having Gelest product code AMS-191), a (20-25% aminopropylmethylsiloxane)-dimethylsiloxane copolymer having a molecular mass of about 20,000 g/mol and/or a kinematic viscosity of about 900 cSt to about 1,100 cSt (e.g. the polymer having Gelest product code AMS-1203) or combinations thereof. In an embodiment, the polysiloxane comprising the aliphatic primary amine moieties is a (6-7% aminopropylmethylsiloxane)-dimethylsiloxane copolymer having a molecular mass of about 50,000 g/mol and/or a kinematic viscosity of about 1,800 cSt to about 2,200 cSt (e.g. the polymer having Gelest product code AMS-163).

In an embodiment, the polymer is a random copolymer. The term "random copolymer" as used herein refers to a polymer having a random distribution of its monomeric units along the polymer backbone. A person skilled in the art will appreciate that the distribution of the monomeric units in the polymer backbone may depend, for example, on the reaction kinetics of the monomeric units and therefore the term "random copolymer" as used herein includes statistical or near-statistical distributions of the monomeric units along the polymer backbone as well as other distributions, including gradient distributions.

In an embodiment, the polymer comprises a combination of a polymer comprising the aliphatic primary amine moieties as side-chains and a polymer comprising end-terminated aliphatic primary amine moieties. The term "side-chains" as used herein includes polymers wherein the —$NH_2$ group is directly bonded to an aliphatic carbon that is part of the polymer chain so long as the —$NH_2$ group is not on a terminal carbon of the polymer chain. In an embodiment, the ratio by weight between the polymer comprising the aliphatic primary amine moieties as side-chains and the polymer comprising end-terminated aliphatic primary amine moieties is from about 10:90 to about 99:1, about 50:50 to about 90:10 or about 70:30.

In an embodiment, the polymer comprising end-terminated aliphatic primary amine moieties is a polysiloxane comprising end-terminated aliphatic primary amine moieties. Polysiloxanes comprising end-terminated aliphatic primary amine moieties are readily available from commercial sources or alternatively can be prepared from a suitable process. For example, polysiloxanes comprising end-terminated aliphatic amine moieties can be prepared from a process comprising base-catalyzed ring-opening polymerization of cyclic siloxane oligomers to obtain a hydride-terminated polysiloxane followed by functionalization of the hydride-terminated polysiloxane with the aliphatic amine via hydrosilation.[43] The selection of a suitable source and/or method of preparation of the polysiloxane comprising end-terminated aliphatic primary amine moieties can be readily made by the person skilled in the art.

In an embodiment, the polymer comprising end-terminated aliphatic primary amine moieties is of the general Formula (II):

(II)

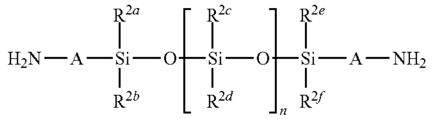

wherein $R^{2a}$, $R^{2b}$, $R^{2c}$, $R^{2d}$, $R^{2e}$ and $R^{2f}$ are each independently $C_{1-10}$alkyl, $C_{3-10}$ cycloalkyl, $C_{1-6}$alkylene$C_{3-10}$cycloalkyl, aryl or $C_{1-6}$alkylene-aryl;

each A is independently $C_{1-10}$alkylene or $C_{3-10}$cycloalkylene; and n is an integer of at least 1.

In an embodiment, $R^{2a}$, $R^{2b}$, $R^{2c}$, $R^{2d}$, $R^{2e}$ and $R^{2f}$ are each independently $C_{1-10}$alkyl or aryl. In another embodiment, $R^{2a}$, $R^{2b}$, $R^{2c}$, $R^{2d}$, $R^{2e}$ and $R^{2f}$ are each independently $C_{1-6}$ alkyl. In a further embodiment, $R^{2a}$, $R^{2b}$, $R^{2c}$, $R^{2d}$, $R^{2e}$ and $R^{2f}$ are each independently $C_{1-4}$ alkyl. In another embodiment, $R^{2a}$, $R^{2b}$, $R^{2c}$, $R^{2d}$, $R^{2e}$ and $R^{2f}$ are all methyl.

In an embodiment, each A is independently $C_{1-10}$alkylene. In another embodiment, each A is independently $C_{2-6}$alkylene. In a further embodiment, each A is —$(CH_2)_3$—.

n represents the number of monomeric units. In an embodiment, n is an integer of from 2 to 500, from 2 to 100, from 2 to 50, from 2 to 10 or from 6 to 9.

In an embodiment, the molecular mass of the polymer comprising end-terminated aliphatic primary amine moieties is from about 500 g/mol to about 1,000,000 g/mol. In another embodiment, the molecular mass of the polymer is from about 500 g/mol to about 50,000 g/mol. In another embodiment, the molecular mass of the polymer is from about 500 g/mol to about 5,000 g/mol. In another embodiment, the molecular mass of the polymer is from about 500 g/mol to about 1,000 g/mol or about 850 g/mol to about 900 g/mol.

In an embodiment, the polymer comprising the end-terminated aliphatic primary amine moieties is an aminopropyl-terminated polydimethylsiloxane. In another embodiment, the aminopropyl-terminated polydimethylsiloxane is an aminopropyl-terminated polydimethylsiloxane having a molecular mass of about 850 g/mol to about 900 g/mol and/or a kinematic viscosity of about 10 to about 15 cSt (e.g. the polymer having Gelest product code DMS-A11), an aminopropyl-terminated polydimethylsiloxane having a molecular mass of about 900 g/mol to about 1,000 g/mol and/or a kinematic viscosity of about 20 cSt to about 30 cSt (e.g. the polymer having Gelest product code DMS-A12) an aminopropyl-terminated polydimethylsiloxane having a molecular mass of about 3,000 g/mol and/or a kinematic viscosity of about 50 cSt to about 60 cSt (e.g. the polymer having Gelest product code DMS-A15), an aminopropyl-terminated polydimethylsiloxane having a molecular mass of about 5,000 g/mol and/or a kinematic viscosity of about 100 cSt to about 120 cSt (e.g. the polymer having Gelest product code DMS-A21), an aminopropyl-terminated polydimethylsiloxane having a molecular mass of about 25,000 g/mol and/or a kinematic viscosity of about 900 cSt to about 1,100 cSt (e.g. the polymer having Gelest product code DMS-A31), an aminopropyl-terminated polydimethylsiloxane having a molecular mass of about 30,000 g/mol and/or a kinematic viscosity of about 1,800 cSt to about 2,200 cSt (e.g. the polymer having Gelest product code DMS-A32) or combinations thereof. In another embodiment, the polymer comprising the end-terminated aliphatic primary amine moieties is an aminopropyl-terminated polydimethylsiloxane having a molecular mass of about 850 g/mol to about 900 g/mol and/or a kinematic viscosity of about 10 to about 15 cSt (e.g. the polymer having Gelest product code DMS-A11).

The oxygen can be from any suitable source, the selection of which can be made by a person skilled in the art. The oxygen source can advantageously be atmospheric oxygen which may, for example, be from a source of compressed air (such as a tank or cylinder) and/or from the ambient atmosphere. However, other suitable oxygen sources such as substantially pure oxygen e.g. from a source of compressed oxygen (such as an oxygen tank or cylinder) or oxygen generated via chemical means (for example, from the decomposition of a chlorate such an alkali metal chlorate (e.g. Na or K) thereby producing the corresponding metal chloride and oxygen) may be used. Accordingly, in an embodiment, the oxygen is atmospheric oxygen, from a source of compressed oxygen, generated via chemical means or combinations thereof. In another embodiment, the oxygen is atmospheric oxygen.

The sensitizer is any suitable sensitizer. The term "sensitizer" as used herein refers to a compound that photogenerates singlet oxygen ($^1O_2$) during the irradiation. The term "derivative" as used herein in reference to a particular sensitizer or class thereof refers to a structurally similar compound that retains the attribute of photogenerating singlet oxygen during the irradiation. For example, the derivative may be substituted with one or more substituents. Derivatives may be prepared by a variety of synthetic methods known to a person skilled in the art and/or alternatively suitable derivatives may be commercially available. In an embodiment, the sensitizer is selected from an acridine, a porphyrin, a metalloporphyrin, a xanthene, a methylene blue, a metal oxide and combinations thereof.

In an embodiment, the sensitizer is an acridine. In another embodiment, the sensitizer is a porphyrin. In a further embodiment, the sensitizer is a metalloporphyrin. In another embodiment, the sensitizer is a xanthene. In another embodiment, the sensitizer is a methylene blue. In another embodiment of the present disclosure, the sensitizer is a metal oxide. In a further embodiment, the sensitizer is a combination of two or more of an acridine, a porphyrin, a metalloporphyrin, a xanthene, a methylene blue and a metal oxide.

The acridine is any suitable acridine or combination thereof. The term "acridine" as used herein refers to a compound having the following general structure:

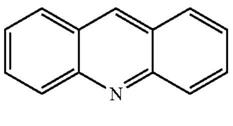

, or a suitable derivative thereof. Acridines are well known in the art and a suitable acridine can be readily selected by the person skilled in the art. In an embodiment, the acridine is acridine carboxaldehyde.

The porphyrin is any suitable porphyrin or combination thereof. The term "porphyrin" as used herein refers to a heterocyclic macrocycle composed of four modified pyrrole subunits interconnected at their alpha carbon atoms via methine bridges; i.e. a substituted derivative of a compound having the following general structure:

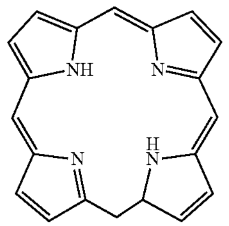

.

Porphyrins are well known in the art and a suitable porphyrin can be readily selected by the person skilled in the art. In an embodiment, the substituents on the porphyrin are on the methyne centers. In another embodiment, the substituents on the methyne centers are aryl groups. In another embodiment, the porphyrin is tetraphenylporphyrin. In another embodiment, the substituents on the porphyrin are on the pyrrole subunits. In another embodiment, the substituents on the pyrrole subunits are independently selected from $C_{1-6}$alkyl. In another embodiment, the substituents on the pyrrole subunits are all ethyl. In an embodiment, the porphyrin is octaethylporphyrin.

The metalloporphyrin is any suitable metalloporphyrin or combination thereof. The term "metalloporphyrin" as used herein refers to a compound comprising a porphyrin as defined herein and a metal ion. Metalloporphyrins are well known in the art and a suitable porphyrin can be readily selected by the person skilled in the art. In an embodiment, the metal is zinc or platinum. In another embodiment, the metal is zinc. In another embodiment, the metal is platinum. In a further embodiment, the metalloporphyrin is zinc tetraphenylporphyrin. In another embodiment, the metalloporphyrin is platinum octaethylporphyrin.

The xanthene is any suitable xanthene or combination thereof. The term "xanthene" as used herein refers to a compound composed of two benzene rings joined by a methylene group and an oxygen atom or a suitable derivative thereof. In an embodiment, the xanthene is a compound having the following general structure:

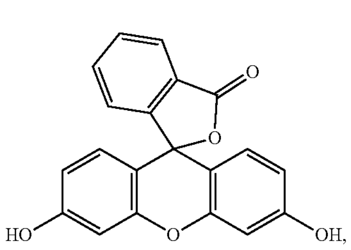 [SMILES: O=C1OC2(c3ccc(O)cc3Oc3cc(O)ccc32)c2ccccc21]

or a suitable derivative thereof. Xanthenes are well known in the art and a suitable xanthene can be readily selected by the person skilled in the art. In an embodiment, the xanthene is rose bengal or fluorescein. In another embodiment, the xanthene is fluorescein. In a further embodiment, the xanthene is rose bengal.

The methylene blue is any suitable methylene blue or combination thereof. The term "methylene blue" as used herein refers to a compound of the general structure:

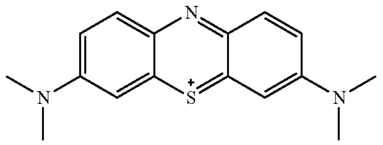

or a suitable derivative thereof. Methylene blues are well known in the art and a suitable methylene blue can be readily selected by the person skilled in the art.

The metal oxide is any suitable metal oxide or combination thereof, the selection of which can be readily made by a person skilled in the art. In an embodiment, the metal oxide is zinc oxide or titanium oxide.

The irradiation is carried out at a wavelength, at an intensity and for a time for the oxidative coupling of the aliphatic primary amine moieties to proceed to a sufficient extent. For example, the person skilled in the art would appreciate that the wavelength of irradiation will depend on the particular sensitizer and would be able to readily select a suitable wavelength for irradiation for a particular sensitizer. The person skilled in the art would also appreciate that the time for the irradiation may depend, for example, on the dimensions (for example, the thickness) of the sample being irradiated and/or the deposition technique used and would be able to select a suitable time accordingly having reference, for example, to the teachings of the present disclosure. In an embodiment, the irradiation is for a time of from about 1 hour to about 2 days, about 12 hours to about 24 hours or about 18 hours. In another embodiment, the light intensity is about 100,000 lux to about 500,000 lux. In an embodiment, the irradiation is carried out at ambient temperature. The term "ambient temperature" as used herein refers to a temperature of about 5° C. to about 40° C. or about 25° C.

In an embodiment, prior to irradiation, the method comprises depositing the polymer and the sensitizer on a surface. In an embodiment, the polymer and sensitizer are deposited at a thickness of about 5 mm or less or about 1 mm or less. The deposition can be via any suitable method and/or means, the selection of which can be made by a person skilled in the art. For example, the person skilled in the art would readily understand that the selection may depend, for example on the nature of the surface, the nature of the polymer and the sensitizer to be deposited, the desired form of the cross-linked polymeric material and/or the process of irradiation.

In an embodiment, the irradiating comprises exposure of the polymer and the sensitizer deposited on the surface through a mask defining a pattern. In another embodiment, the method further comprises removing the unexposed polymer and sensitizer thereby leaving the cross-linked polymeric material on the surface. In an embodiment, the removing comprises irrigation with a suitable solvent or mixture thereof e.g. ethyl acetate.

In an embodiment, the surface comprises a mold. The mold can be made of any suitable material, the selection of which can be made by a person skilled in the art. For example, the skilled person would readily appreciate that in embodiments comprising removing the cross-linked polymer material from the surface, the mold is comprised of a material that allows such removal. In an embodiment, the mold is comprised of silicone.

In an embodiment, the depositing comprises cryo-deposition. The term "cryo-deposition" as used herein refers to a method comprising depositing a desired shape of a polymer and sensitizer under solvent-free conditions as described herein at a temperature below ambient temperature (e.g. a temperature of about −78° C.) and irradiating the deposited shape while allowing the system to return to ambient temperature.

In an embodiment, the depositing comprises direct-write printing.

In an embodiment, the depositing comprises vat stereolithography.

In an embodiment, the method further comprises removing the cross-linked polymeric material from the surface.

In an embodiment, the surface comprises a textile. For example, in an embodiment, the depositing on the textile comprises a method as described herein for the methods of preparing an antimicrobial textile material.

The amount of the sensitizer is any suitable amount. For example, it will be appreciated by a person skilled in the art that higher absorption and/or higher $^1O_2$ quantum yield would allow for lower amounts of sensitizer. In an embodiment, the sensitizer is rose bengal and the molar ratio between the rose bengal and the polymer is about 0.01:1 to about 0.1:1, about 0.016:1 to about 0.048:1, about 0.016:1, about 0.032:1 or about 0.048:1. Such exemplary molar ratios between the rose bengal and the polymer may, for example, be used by the skilled person for the selection of suitable amounts of other sensitizers by a method comprising comparing a value for absorption and/or $^1O_2$ quantum yield of a desired sensitizer to a value for absorption and/or $^1O_2$ quantum yield of rose bengal. For example, rose bengal has approximately doubled absorption at 530 nm compared to platinum octaethylporphyrin (PtOEP) therefore in some embodiments, the molar ratio between PtOEP and the polymer may, for example, be twice the exemplary molar ratios between the rose bengal and the polymer.

In some embodiments, the irradiation comprises irradiating a solution comprising the polymer and the sensitizer. The solution can comprise any suitable solvent or mixture thereof. In some embodiments, the solvent comprises m-xylene. In another embodiment, the solvent comprises a combination of ethanol and 1,2-propanediol. In a further embodiment, the ethanol and 1,2-propanediol are in a ratio by weight of about 1:1. In another embodiment, the solvent comprises a combination of toluene and tetrahydrofuran (THF). In an embodiment, the polymer is present in the solution in an amount of from about 1 wt % to about 85 wt %, about 1 wt % to about 50 wt %, about 1 wt % to about 13 wt %, about 5 wt % to about 13 wt %, about 4 wt % to about 6 wt %, about 12 wt % to about 14 wt %, about 5 wt %, about 13 wt %, or about 40 wt % to about 85 wt %. In an embodiment, the sensitizer is present in the solution at a concentration of greater than about $5\times10^{-5}$M. In another embodiment, the sensitizer is present in the solution at a concentration of less than about 0.2 M.

In some embodiments, the sensitizer is coupled to at least a portion of the polymer chains of the polymer. In an embodiment, prior to the irradiation and optional deposition, the sensitizer is coupled to the polymer chains via a method comprising reacting a sensitizer comprising an amine-reactive group with the polymer comprising the plurality of aliphatic primary amine moieties. In an embodiment, the amine-reactive group is a carboxylic acid. For example, condensation reactions between primary amines and the 2' position on xanthene-based dyes resulting in an amide functionality are a simple method for fluorescent labelling of alcohol and amine substrates and have been extensively studied as a fluorescent labelling technique.[44] In an embodiment, the reaction comprises reacting a solution of the sensitizer comprising the amine-reactive group with the polymer comprising the plurality of aliphatic primary amine moieties in a suitable solvent (e.g. ethanol) for a time and at temperature for the coupling of the sensitizer to the polymer to proceed to a sufficient extent, for example, a time of about 1 hour to about 12 hours, about 2 hours to about 6 hours or about 4 hours at a temperature of from about 60° C. to about 80° C. or about 80° C. followed by cooling e.g. to ambient temperature and removal of the solvent (e.g. by rotary evaporation and/or drying under vacuum).

In some embodiments, the irradiation comprises solvent-free conditions. The term "solvent-free conditions" as used herein refers to conditions in the methods of the present disclosure in which a sensitizer coupled to the polymer is irradiated without the presence of substantial amounts of solvent but may include small (e.g. trace) amounts of solvent.

In some embodiments, the irradiation comprises irradiation of a solution comprising the sensitizer coupled to the at least a portion of the polymer chains. The solution can comprise any suitable solvent or mixture thereof. In an embodiment, the solvent comprises a combination of toluene and tetrahydrofuran (THF). In an embodiment, the polymer is present in the solution in an amount of from about 1 wt % to about 85 wt %, about 1 wt % to about 50 wt %, about 1 wt % to about 13 wt %, about 5 wt % to about 13 wt %, about 4 wt % to about 6 wt %, about 12 wt % to about 14 wt %, about 5 wt % or about 13 wt %. In an embodiment, the sensitizer coupled to the at least a portion of the polymer chains absorbs light in a first region, the solution further comprises a second sensitizer that absorbs light in a second region, and the irradiation comprises irradiation of the solution at a wavelength in the second region. In an embodiment, the first region is in the visible region. In another embodiment, the first region is in the green light region. The amount of the sensitizer coupled to the at least a portion of the polymer chains is any suitable amount, the selection of which can be made by the skilled person. In an embodiment, the sensitizer coupled to the at least a portion of the polymer chains is a xanthene. In another embodiment, the sensitizer coupled to the polymer is rose bengal. In an embodiment, the molar ratio between the rose bengal and the polymer is about 0.01:1 to about 0.1:1. In an embodiment, the molar ratio of the rose bengal to the polymer is about 0.048:1. Such exemplary molar ratios between the rose bengal and the polymer may, for example, be used by the skilled person for the selection of suitable amounts of other sensitizers by a method comprising comparing a value for absorption and/or $^1O_2$ quantum yield of a desired sensitizer to a value for absorption and/or $^1O_2$ quantum yield of rose bengal. In another embodiment, the wavelength of the first region is at about 530 nm. In an embodiment, the second region is in the ultraviolet region. In another embodiment, the wavelength of the second region is about 405 nm. The amount of the second sensitizer is any suitable amount, the selection of which can be made by the skilled person. In an embodiment, the second sensitizer is a porphyrin. In another embodiment, the porphyrin is tetraphenylporphyrin. In an embodiment, the molar ratio between the tetraphenylporphyrin and the polymer is about 0.003:1 to about 0.1:1, about 0.01:1 to about 0.03:1 or about 0.016:1. In another embodiment, the molar ratio of the tetraphenylporphyrin to the polymer is about 0.016:1. Such exemplary molar ratios between the tetraphenylporphyrin and the polymer may, for example, be used by the skilled person for the selection of suitable amounts of other sensitizers by a method comprising comparing a value for absorption and/or $^1O_2$ quantum yield of a desired sensitizer to a value for absorption and/or $^1O_2$ quantum yield of tetraphenylporphyrin.

In some embodiments wherein the irradiation comprises a solvent, the method further comprises drying the cross-linked polymeric material. The drying can be carried out using any suitable method, the selection of which can be made by a person skilled in the art.

The present disclosure also includes a cross-linked polymeric material prepared by such a method of preparing a cross-linked polymeric material.

The present disclosure also includes a use of such a cross-linked polymeric material as an antimicrobial coating or surface. The present disclosure also includes a use of such a cross-linked polymeric material as an antimicrobial agent. The present disclosure further includes a use of such a cross-linked polymeric material for reducing microbes on a surface. In an embodiment, the cross-linked polymeric material comprises the sensitizer coupled to the at least a portion of the polymer chains and the use comprises irradiating the cross-linked polymeric material at a wavelength absorbed by the sensitizer coupled to the at least a portion of the polymer chains to generate reactive oxygen species (ROS).

In an embodiment, the microbes are bacteria, a virus, a fungi or combinations thereof. In an embodiment, the microbes are bacteria. In an embodiment, the bacteria are gram-negative, gram-positive or a mixture of gram-negative and gram-positive. In another embodiment, the bacteria are gram-negative. In a further embodiment, the bacteria are gram-positive. In another embodiment, the bacteria are a mixture of gram-negative and gram-positive. In an embodiment, the gram-negative bacteria are *Escherichia coli*. In another embodiment, the gram-positive bacteria are *Staphylococcus aureus*. In a further embodiment, the *Staphylococcus aureus* are methicillin-resistant *Staphylococcus aureus* (MRSA).

In some embodiments, methods comprising the use of a mold, direct-write printing, irradiating through a mask defining a pattern and/or vat stereolithography may be used, for example, to prepare cross-linked polymeric material having a geometry suitable for use in a microfluidics device. Accordingly, the present disclosure also includes a microfluidics device comprising such a cross-linked polymeric material.

The present disclosure also includes a method for preparing a cross-linked polymeric material, the method comprising:

irradiating a polymer, the polymer comprising: a polymer chain comprising a plurality of aliphatic primary amine moieties or precursors thereto as side-chains; and a sensitizer coupled to the polymer chain via a moiety obtained from reaction of an aliphatic primary amine moiety with an amine-reactive group on the sensitizer, in the presence of oxygen to form imine cross-links via the oxidative coupling of at least a portion of the aliphatic primary amine moieties and obtain the cross-linked polymeric material.

In an embodiment, the polymer is in the form of a composition comprising, consisting essentially of or consisting of the polymer and a corresponding polymer having primary amine moieties instead of the sensitizer coupled to the polymer chain.

In an embodiment, the polymer further comprises a polymer comprising end-terminated aliphatic primary amine moieties.

In an embodiment, the ratio by weight between the total amount of the polymer plus the corresponding polymer having primary amine moieties instead of the sensitizer coupled to the polymer chain: the polymer comprising end-terminated aliphatic primary amine moieties is from about 10:90 to about 99:1, about 50:50 to about 90:10 or about 70:30.

In an embodiment, the polymer comprising end-terminated aliphatic primary amine moieties is a polysiloxane comprising end-terminated aliphatic primary amine moieties.

In an embodiment, the polymer comprising end-terminated aliphatic primary amine moieties is of the general Formula (II):

(II)

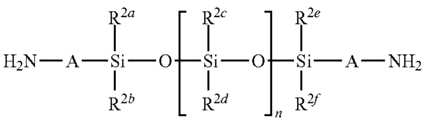

wherein $R^{2a}$, $R^{2b}$, $R^{2c}$, $R^{2d}$, $R^{2e}$ and $R^{2f}$ are each independently $C_{1-10}$alkyl, $C_{3-10}$ cycloalkyl, $C_{1-6}$alkylene$C_{3-10}$cycloalkyl, aryl or $C_{1-6}$alkylene-aryl;

each A is independently $C_{1-10}$alkylene or $C_{3-10}$cycloalkylene; and n is an integer of at least 1.

In an embodiment, $R^{2a}$, $R^{2b}$, $R^{2c}$, $R^{2d}$, $R^{2e}$ and $R^{2f}$ are each independently $C_{1-10}$alkyl or aryl. In another embodiment, $R^{2a}$, $R^{2b}$, $R^{2c}$, $R^{2d}$, $R^{2e}$ and $R^{2f}$ are each independently $C_{1-6}$ alkyl. In a further embodiment, $R^{2a}$, $R^{2b}$, $R^{2c}$, $R^{2d}$, $R^{2e}$ and $R^{2f}$ are each independently $C_{1-4}$ alkyl. In another embodiment, $R^{2a}$, $R^{2b}$, $R^{2c}$, $R^{2d}$, $R^{2e}$ and $R^{2f}$ are all methyl.

In an embodiment, each A is independently $C_{1-10}$alkylene. In another embodiment, each A is independently $C_{2-6}$alkylene. In a further embodiment, each A is $—(CH_2)_3—$.

n represents the number of monomeric units. In an embodiment, n is an integer of from 2 to 500, from 2 to 100, from 2 to 50, from 2 to 10 or from 6 to 9.

In an embodiment, the molecular mass of the polymer comprising end-terminated aliphatic primary amine moieties is from about 500 g/mol to about 1,000,000 g/mol. In another embodiment, the molecular mass of the polymer is from about 500 g/mol to about 50,000 g/mol. In another embodiment, the molecular mass of the polymer is from about 500 g/mol to about 5,000 g/mol. In another embodiment, the molecular mass of the polymer is from about 500 g/mol to about 1,000 g/mol or about 850 g/mol to about 900 g/mol.

In an embodiment, the polymer comprising the end-terminated aliphatic primary amine moieties is an aminopropyl-terminated polydimethylsiloxane. In another embodiment, the aminopropyl-terminated polydimethylsiloxane is an aminopropyl-terminated polydimethylsiloxane having a molecular mass of about 850 g/mol to about 900 g/mol and/or a kinematic viscosity of about 10 to about 15 cSt (e.g. the polymer having Gelest product code DMS-A11), an aminopropyl-terminated polydimethylsiloxane having a molecular mass of about 900 g/mol to about 1,000 g/mol and/or a kinematic viscosity of about 20 cSt to about 30 cSt (e.g. the polymer having Gelest product code DMS-A12) an aminopropyl-terminated polydimethylsiloxane having a molecular mass of about 3,000 g/mol and/or a kinematic viscosity of about 50 cSt to about 60 cSt (e.g. the polymer having Gelest product code DMS-A15), an aminopropyl-terminated polydimethylsiloxane having a molecular mass of about 5,000 g/mol and/or a kinematic viscosity of about 100 cSt to about 120 cSt (e.g. the polymer having Gelest product code DMS-A21), an aminopropyl-terminated polydimethylsiloxane having a molecular mass of about 25,000 g/mol and/or a kinematic viscosity of about 900 cSt to about 1,100 cSt (e.g. the polymer having Gelest product code DMS-A31), an aminopropyl-terminated polydimethylsiloxane having a molecular mass of about 30,000 g/mol and/or a kinematic viscosity of about 1,800 cSt to about 2,200 cSt (e.g. the polymer having Gelest product code DMS-A32) or combinations thereof. In another embodiment, the polymer comprising the end-terminated aliphatic primary amine moieties is an aminopropyl-terminated polydimethylsiloxane having a molecular mass of about 850 g/mol to about 900 g/mol and/or a kinematic viscosity of about 10 to about 15 cSt (e.g. the polymer having Gelest product code DMS-A11).

In an embodiment, the polymer comprises the plurality of aliphatic primary amine moieties. In another embodiment, the polymer comprises the precursors thereto. In such embodiments, wherein the polymer comprises the precursors thereto, the method further comprises converting the precursor thereto to the aliphatic primary amine moiety prior to the oxidative coupling. In an embodiment, the conversion to the primary amine moiety is in situ.

In an embodiment, the polymer chain comprises a polysiloxane, a polysaccharide, a polyamide, a polyester or a polymethacrylate. In another embodiment, the polymer chain comprises a polysaccharide. In another embodiment, the polymer chain comprises a polyamide. In another embodiment, the polymer chain comprises a polyester. In a further embodiment, the polymer chain comprises a polymethacrylate. In another embodiment, the polymer chain comprises a polysiloxane.

In an embodiment, the polysaccharide is chitosan. In another embodiment, the polyamide is α-polylysine. In a further embodiment, the polymethacrylate is an alkyl acrylate. In another embodiment, the polymethacrylate is a methacrylate.

In an embodiment, the polymer is of the general Formula (III):

(III)

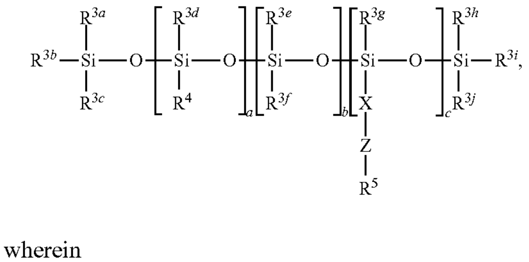

wherein $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are each independently $C_{1-10}$alkyl, $C_{3-10}$cycloalkyl, $C_{1-6}$alkylene$C_{3-10}$cycloalkyl, aryl or $C_{1-6}$alkylene-aryl;

$R^4$ is $—X—NH_2$ or the precursor thereto;

each X is independently $C_{1-10}$alkylene or $C_{3-10}$cycloalkylene;

each Z is independently the moiety obtained from reaction of the aliphatic primary amine moiety with the amine-reactive group on the sensitizer;

$R^5$ is the remainder of the sensitizer;

a is an integer of at least 1, optionally at least 2;

b is an integer of at least 1; and c is an integer of at least 1.

In an embodiment, $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are each independently $C_{1-10}$alkyl or aryl. In another embodiment, $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are each independently $C_{1-6}$alkyl. In a further embodiment, $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are each independently $C_{1-6}$alkyl. In another embodiment of the present disclosure, $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are all methyl.

In an embodiment, each X is independently $C_{1-10}$alkylene. In another embodiment, each X is independently $C_{2-6}$alkylene. In a further embodiment, each X is $—(CH_2)_3—$.

In an embodiment, each Z is an amide.

In an embodiment, $R^4$ is $—X—NH_2$.

In an alternative embodiment, $R^4$ is the precursor to $—X—NH_2$.

a, b and c represent the numbers of monomeric units. In an embodiment, (a+c)/(a+b+c) is about 0.001 to about 0.4. In another embodiment, (a+c)/(a+b+c) is about 0.01 to about 0.2. In a further embodiment, (a+c)/(a+b+c) is about 0.04 to about 0.08. In another embodiment, (a+c)/(a+b+c) is about 0.06. In an embodiment, c/(a+b+c) is about 0.0001 to about 0.1. In another embodiment, c/(a+b+c) is about 0.001 to about 0.02.

The oxygen can be from any suitable source, the selection of which can be made by a person skilled in the art. The oxygen source can advantageously be atmospheric oxygen which may, for example, be from a source of compressed air (such as a tank or cylinder) and/or from the ambient atmosphere. However, other suitable oxygen sources such as substantially pure oxygen e.g. from a source of compressed oxygen (such as an oxygen tank or cylinder) or oxygen generated via chemical means (for example, from the decomposition of a chlorate such an alkali metal chlorate (e.g. Na or K) thereby producing the corresponding metal chloride and oxygen) may be used. Accordingly, in an embodiment, the oxygen is atmospheric oxygen, from a source of compressed oxygen, generated via chemical means or combinations thereof. In another embodiment, the oxygen is atmospheric oxygen.

The sensitizer with the amine-reactive group is any suitable sensitizer comprising an amine-reactive group. In an embodiment, the sensitizer is an acridine comprising the amine-reactive group, a porphyrin comprising the amine-reactive group, a metalloporphyrin comprising the amine-reactive group, a xanthene comprising the amine-reactive group, a methylene blue comprising the amine-reactive group or combinations thereof. In another embodiment, the sensitizer is an acridine comprising the amine-reactive group. In another embodiment, the sensitizer is a porphyrin comprising the amine-reactive group. In a further embodiment, the sensitizer is a metalloporphyrin comprising the amine-reactive group. In another embodiment, the sensitizer is a xanthene comprising the amine-reactive group. In another embodiment, the sensitizer is rose bengal. In another embodiment, the sensitizer is a methylene blue comprising the amine-reactive group. In a further embodiment, the sensitizer is a combination of two or more of an acridine comprising the amine-reactive group, a porphyrin comprising the amine-reactive group, a metalloporphyrin comprising the amine-reactive group, a xanthene comprising the amine-reactive group and a methylene blue comprising the amine-reactive group. In some embodiments, such sensitizers with an amine-reactive group are commercially available. Alternatively, a person skilled in the art would readily be able to select a suitable synthetic route to prepare a sensitizer with an amine-reactive group.

In an embodiment, the sensitizer is coupled to the polymer chain via a method comprising reacting the sensitizer comprising the amine-reactive group with a polymer comprising a plurality of aliphatic primary amine moieties. In an embodiment, the amine-reactive group is a carboxylic acid. In an embodiment, the reaction comprises reacting a solution of the sensitizer comprising the amine-reactive group with the polymer comprising the plurality of aliphatic primary amine moieties in a suitable solvent (e.g. ethanol) for a time and at temperature for the coupling of the sensitizer to the polymer to proceed to a sufficient extent, for example, a time of about 1 hour to about 12 hours, about 2 hours to about 6 hours or about 4 hours at a temperature of from about 60° C. to about 80° C. or about 80° C. followed by cooling e.g. to ambient temperature and removal of the solvent (e.g. by rotary evaporation and/or drying under vacuum).

In an embodiment, the molecular mass of a corresponding polymer having primary amine moieties instead of the sensitizer coupled to the polymer chain is from about 500 g/mol to about 1,000,000 g/mol. In another embodiment, the molecular mass of a corresponding polymer having primary amine moieties instead of the sensitizer coupled to the polymer chain is from about 500 g/mol to about 100,000 g/mol. In another embodiment, the molecular mass of a corresponding polymer having primary amine moieties instead of the sensitizer coupled to the polymer chain is from about 40,000 g/mol to about 60,000 g/mol or about 50,000 g/mol.

In an embodiment, the polymer is obtained from reaction of an (aminopropylmethylsiloxane)-dimethylsiloxane copolymer with the sensitizer comprising the amine-reactive group. In another embodiment, the polymer is obtained from reaction of an (aminopropylmethylsiloxane)-dimethylsiloxane copolymer with about 1-40% aminopropylmethylsiloxane, about 2-25% aminopropylmethylsiloxane, about 2-3% aminopropylmethylsiloxane, about 4-5% aminopropylmethylsiloxane, about 6-7% aminopropylmethylsiloxane, about 9-11% aminopropylmethylsiloxane, about 20-25% aminopropylmethylsiloxane or combinations thereof with the sensitizer comprising the amine-reactive group. In a further embodiment, the polymer is obtained from reaction of a (2-3% aminopropylmethylsiloxane)-dimethylsiloxane copolymer having a molecular mass of about 4,500 g/mol to about 6,000 g/mol and/or a kinematic viscosity of about 80 cSt to about 120 cSt (e.g. the polymer having Gelest product code AMS-132), a (4-5% aminopropylmethylsiloxane)-dimethylsiloxane copolymer having a molecular mass of about 7,000 g/mol to about 9,000 g/mol and/or a kinematic viscosity of about 100 cSt to about 300 cSt (e.g. the polymer having Gelest product code AMS-152), a (6-7% aminopropylmethylsiloxane)-dimethylsiloxane copolymer having a molecular mass of about 4,000 g/mol to about 5,000 g/mol and/or a kinematic viscosity of about 80 cSt to about 120 cSt (e.g. the polymer having Gelest product code AMS-162) or having a molecular mass of about 50,000 g/mol and/or a kinematic viscosity of about 1,800 cSt to about 2,200 cSt (e.g. the polymer having Gelest product code AMS-163), a (9-11% aminopropylmethylsiloxane)-dimethylsiloxane copolymer having a molecular mass of about 2,000 g/mol to about 3,000 g/mol and/or a kinematic viscosity of about 40 cSt to about 60 cSt (e.g. the polymer having Gelest product code AMS-191), a (20-25% aminopropylmethylsiloxane)-dimethylsiloxane copolymer having a molecular mass of about 20,000 g/mol and/or a kinematic viscosity of about 900 cSt to about 1,100 cSt (e.g. the polymer having Gelest product code AMS-1203) or combinations thereof with the sensitizer comprising the amine-reactive group. In an embodiment, the polymer is obtained from reaction of a (6-7% aminopropylmethylsiloxane)-dimethylsiloxane copolymer having a molecular mass of about 50,000 g/mol and/or a kinematic viscosity of about 1,800 cSt to about 2,200 cSt (e.g. the polymer having Gelest product code AMS-163) with the sensitizer comprising the amine-reactive group.

In an embodiment, the polymer is a random copolymer.

The irradiation is carried out at a wavelength, at an intensity and for a time for the oxidative coupling of the aliphatic primary amine moieties to proceed to a sufficient extent. For example, the person skilled in the art would appreciate that the wavelength of irradiation will depend on the particular sensitizer and would be able to readily select a suitable wavelength for irradiation for a particular sensitizer. The person skilled in the art would also appreciate that the time for the irradiation may depend, for example, on the dimensions (for example, the thickness) of the sample being irradiated and/or the deposition technique used and would be able to select a suitable time accordingly having reference, for example, to the teachings of the present disclosure. In an embodiment, the irradiation is for a time of from about 1 hour to about 2 days, about 12 hours to about 24 hours or about 18 hours. In another embodiment, the light intensity is about 100,000 lux to about 500,000 lux. In an embodiment, the irradiation is carried out at ambient temperature.

In an embodiment, prior to irradiation, the method comprises depositing the polymer on a surface. In an embodiment, the polymer is deposited at a thickness of about 5 mm or less or about 1 mm or less. The deposition can be via any suitable method and/or means, the selection of which can be made by a person skilled in the art. For example, the person skilled in the art would readily understand that the selection may depend, for example on the nature of the surface, the nature of the polymer to be deposited (e.g. whether it is in solution or not), the desired form of the cross-linked polymeric material and/or the process of irradiation In an embodiment, the irradiating comprises exposure of the polymer deposited on the surface through a mask defining a pattern. In another embodiment, the method further comprises removing the unexposed polymer thereby leaving the cross-linked polymeric material on the surface. In an embodiment, the removing comprises irrigation with a suitable solvent or mixture thereof e.g. ethyl acetate.

In an embodiment, the surface comprises a mold. The mold can be made of any suitable material, the selection of which can be made by a person skilled in the art. For example, the skilled person would readily appreciate that in embodiments comprising removing the cross-linked polymer material from the surface, the mold is comprised of a material that allows such removal. In an embodiment, the mold is comprised of silicone.

In an embodiment, the depositing comprises cryo-deposition.

In an embodiment, the depositing comprises direct-write printing.

In an embodiment, the depositing comprises vat stereolithography.

In an embodiment, the method further comprises removing the cross-linked polymeric material from the surface.

In an embodiment, the surface comprises a textile. For example, in an embodiment, the depositing on the textile comprises a method as described herein for the methods of preparing an antimicrobial textile material.

In an embodiment, the irradiation comprises solvent-free conditions.

The amount of the sensitizer is any suitable amount. For example, it will be appreciated by a person skilled in the art that higher absorption and/or higher $^1O_2$ quantum yield would allow for lower amounts of sensitizer. In an embodiment, the sensitizer is rose bengal and the molar ratio between the rose bengal and the polymer is about 0.01:1 to about 0.1:1, about 0.016:1 to about 0.048:1, about 0.016:1, about 0.032:1 or about 0.048:1. Such exemplary molar ratios between the rose bengal and the polymer may, for example, be used by the skilled person for the selection of suitable amounts of other sensitizers by a method comprising comparing a value for absorption and/or $^1O_2$ quantum yield of a desired sensitizer to a value for absorption and/or $^1O_2$ quantum yield of rose bengal. For example, rose bengal has approximately doubled absorption at 530 nm compared to platinum octaethylporphyrin (PtOEP) therefore in some embodiments, the molar ratio between PtOEP and the polymer may, for example, be twice the exemplary molar ratios between the rose bengal and the polymer.

In an alternative embodiment, the irradiation comprises irradiating a solution comprising the polymer. The solution can comprise any suitable solvent or mixture thereof. In some embodiments, the solvent comprises m-xylene. In another embodiment, the solvent comprises a combination of ethanol and 1,2-propanediol. In a further embodiment, the ethanol and 1,2-propanediol are in a ratio by weight of about 1:1. In another embodiment, the solvent comprises a combination of toluene and tetrahydrofuran (THF). In an embodiment, the polymer is present in the solution in an amount of from about 1 wt % to about 85 wt %, about 1 wt % to about 50 wt %, about 1 wt % to about 13 wt %, about 5 wt % to about 13 wt %, about 4 wt % to about 6 wt %, about 12 wt % to about 14 wt %, about 5 wt %, about 13 wt %, or about 40 wt % to about 85 wt %.

In an embodiment, the sensitizer coupled to the polymer chain absorbs light in a first region, the solution further comprises a second sensitizer that absorbs light in a second region, and the irradiation comprises irradiation of the solution at a wavelength in the second region. In an embodiment, the first region is in the visible region. In another embodiment, the first region is in the green light region. The amount of the sensitizer coupled to the polymer chain is any suitable amount, the selection of which can be made by the skilled person. In an embodiment, the sensitizer coupled to the polymer chain is a xanthene. In another embodiment, the sensitizer coupled to the polymer chain is rose bengal. In an embodiment, the molar ratio between the rose bengal and the polymer is about 0.01:1 to about 0.1:1. In an embodiment, the molar ratio of the rose bengal to the polymer is about 0.048:1. Such exemplary molar ratios between the rose bengal and the polymer may, for example, be used by the skilled person for the selection of suitable amounts of other sensitizers by a method comprising comparing a value for absorption and/or $^1O_2$ quantum yield of a desired sensitizer to a value for absorption and/or $^1O_2$ quantum yield of rose bengal. In another embodiment, the wavelength of the first region is at about 530 nm. In an embodiment, the second region is in the ultraviolet region. In another embodiment, the wavelength of the second region is about 405 nm. The amount of the second sensitizer is any suitable amount, the selection of which can be made by the skilled person. In an embodiment, the second sensitizer is a porphyrin. In another embodiment, the porphyrin is tetraphenylporphyrin. In an embodiment, the molar ratio between the tetraphenylporphyrin and the polymer is about 0.003:1 to about 0.1:1, about 0.01:1 to about 0.03:1 or about 0.016:1. In another embodiment, the molar ratio of the tetraphenylporphyrin to the polymer is about 0.016:1. Such exemplary molar ratios between the tetraphenylporphyrin and the polymer may, for example, be used by the skilled person for the selection of suitable amounts of other sensitizers by a method comprising comparing a value for absorption and/or $^1O_2$ quantum yield of a desired sensitizer to a value for absorption and/or $^1O_2$ quantum yield of tetraphenylporphyrin.

In some embodiments wherein the irradiation comprises a solvent, the method further comprises drying the cross-linked polymeric material. The drying can be carried out using any suitable method, the selection of which can be made by a person skilled in the art.

The present disclosure also includes a cross-linked polymeric material prepared by such a method of preparing a cross-linked polymeric material.

The present disclosure also includes a use of such a cross-linked polymeric material as an antimicrobial coating or surface. The present disclosure also includes a use of such a cross-linked polymeric material as an antimicrobial agent. The present disclosure further includes a use of such a cross-linked polymeric material for reducing microbes on a surface. In an embodiment, the use comprises irradiating the cross-linked polymeric material at a wavelength absorbed by the sensitizer coupled to the polymer chain to generate reactive oxygen species (ROS).

In an embodiment, the microbes are bacteria, a virus, a fungi or combinations thereof. In an embodiment, the microbes are bacteria. In an embodiment, the bacteria are gram-negative, gram-positive or a mixture of gram-negative and gram-positive. In another embodiment, the bacteria are gram-negative. In a further embodiment, the bacteria are gram-positive. In another embodiment, the bacteria are a mixture of gram-negative and gram-positive. In an embodiment, the gram-negative bacteria are *Escherichia coli*. In another embodiment, the gram-positive bacteria are *Staphylococcus aureus*. In a further embodiment, the *Staphylococcus aureus* are methicillin-resistant *Staphylococcus aureus* (MRSA).

In some embodiments, methods comprising the use of a mold, direct-write printing, irradiating through a mask defining a pattern and/or vat stereolithography may be used, for example, to prepare cross-linked polymeric material having a geometry suitable for use in a microfluidics device. Accordingly, the present disclosure also includes a microfluidics device comprising such a cross-linked polymeric material.

The present disclosure also includes a method of preparing an antimicrobial textile material, the method comprising:

treating a textile with a solution comprising (i) a polymer, the polymer comprising: a polymer chain comprising a plurality of aliphatic primary amine moieties or precursors thereto as side-chains; and a sensitizer coupled to the polymer chain via a moiety obtained from reaction of an aliphatic primary amine moiety with an amine-reactive group on the sensitizer, wherein the first sensitizer absorbs light in a first region; and (ii) a second sensitizer that absorbs light in a second region; and irradiating the treated textile at a wavelength in the second region in the presence of oxygen to form imine cross-links via the oxidative coupling of at least a portion of the aliphatic primary amine moieties to obtain a cross-linked polymeric material attached to the textile.

In an embodiment, the polymer is in the form of a composition comprising, consisting essentially of or consisting of the polymer and a corresponding polymer having primary amine moieties instead of the sensitizer coupled to the polymer chain.

In an embodiment, the polymer comprises the plurality of aliphatic primary amine moieties. In another embodiment, the polymer comprises the precursors thereto. In such embodiments, wherein the polymer comprises the precursors thereto, the method further comprises converting the precursor thereto to the aliphatic primary amine moiety prior to the oxidative coupling. In an embodiment, the conversion to the primary amine moiety is in situ.

In an embodiment, the polymer chain comprises a polysiloxane, a polysaccharide, a polyamide, a polyester or a polymethacrylate. In another embodiment, the polymer chain comprises a polysaccharide. In another embodiment, the polymer chain comprises a polyamide. In another embodiment, the polymer chain comprises a polyester. In a further embodiment, the polymer chain comprises a polymethacrylate. In another embodiment, the polymer chain comprises a polysiloxane.

In an embodiment, the polysaccharide is chitosan. In another embodiment, the polyamide is α-polylysine. In a further embodiment, the polymethacrylate is an alkyl acrylate. In another embodiment, the polymethacrylate is a methacrylate.

In an embodiment, the polymer is of the general Formula (III):

(III)

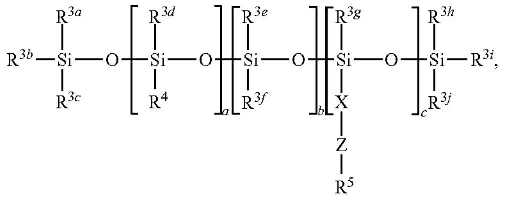

wherein $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are each independently $C_{1-10}$alkyl, $C_{3-10}$cycloalkyl, $C_{1-6}$alkyleneC$_{3-10}$cycloalkyl, aryl or $C_{1-6}$alkylene-aryl;

$R^4$ is —X—$NH_2$ or the precursor thereto;

each X is independently $C_{1-10}$alkylene or $C_{3-10}$cycloalkylene;

each Z is independently the moiety obtained from reaction of the aliphatic primary amine moiety with the amine-reactive group on the sensitizer;

$R^5$ is the remainder of the sensitizer;

a is an integer of at least 1, optionally at least 2;

b is an integer of at least 1; and c is an integer of at least 1.

In an embodiment, $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are each independently $C_{1-10}$alkyl or aryl. In another embodiment, $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are each independently $C_{1-6}$alkyl. In a further embodiment, $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are each independently $C_{1-6}$alkyl. In another embodiment of the present disclosure, $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are all methyl.

In an embodiment, each X is independently $C_{1-10}$alkylene. In another embodiment, each X is independently $C_{2-6}$alkylene. In a further embodiment, each X is $—(CH_2)_3—$.

In an embodiment, each Z is an amide.

In an embodiment, $R^4$ is $—X—NH_2$.

In an alternative embodiment, $R^4$ is the precursor to $—X—NH_2$.

a, b and c represent the numbers of monomeric units. In an embodiment, (a+c)/(a+b+c) is about 0.001 to about 0.4. In another embodiment, (a+c)/(a+b+c) is about 0.01 to about 0.2. In a further embodiment, (a+c)/(a+b+c) is about 0.04 to about 0.08. In another embodiment, (a+c)/(a+b+c) is about 0.06. In an embodiment, c/(a+b+c) is about 0.0001 to about 0.1. In another embodiment, c/(a+b+c) is about 0.001 to about 0.02.

The oxygen can be from any suitable source, the selection of which can be made by a person skilled in the art. The oxygen source can advantageously be atmospheric oxygen which may, for example, be from a source of compressed air (such as a tank or cylinder) and/or from the ambient atmosphere. However, other suitable oxygen sources such as substantially pure oxygen e.g. from a source of compressed oxygen (such as an oxygen tank or cylinder) or oxygen generated via chemical means (for example, from the decomposition of a chlorate such an alkali metal chlorate (e.g. Na or K) thereby producing the corresponding metal chloride and oxygen) may be used. Accordingly, in an embodiment, the oxygen is atmospheric oxygen, from a source of compressed oxygen, generated via chemical means or combinations thereof. In another embodiment, the oxygen is atmospheric oxygen.

The sensitizers are any suitable sensitizers, the selection of which can be made by the person skilled in the art. For example, the sensitizer with the amine-reactive group is any suitable sensitizer comprising an amine-reactive group. In an embodiment, the first region is in the visible region. In another embodiment, the first region is in the green light region. In an embodiment, the sensitizer comprising the amine-reactive group is a xanthene comprising the amine-reactive group. In another embodiment, the sensitizer coupled to the polymer chain is rose bengal. In another embodiment, the wavelength of the first region is at about 530 nm. In an embodiment, the second region is in the ultraviolet region. In another embodiment, the wavelength of the second region is about 405 nm. In an embodiment, the second sensitizer is a porphyrin. In another embodiment, the porphyrin is tetraphenylporphyrin.

The amounts of the sensitizers are any suitable amount. For example, it will be appreciated by a person skilled in the art that higher absorption and/or higher $^1O_2$ quantum yield would allow for lower amounts of sensitizer. In an embodiment, the sensitizer coupled to the polymer chain is rose bengal and the molar ratio between the rose bengal and the polymer is about 0.01:1 to about 0.1:1 or about 0.048:1. In another embodiment of the present disclosure, the second sensitizer is tetraphenylporphyrin and the molar ratio of the tetraphenylporphyrin to the polymer is about 0.003:1 to about 0.1:1, about 0.01:1 to about 0.03:1 or about 0.016:1. Such exemplary molar ratios may, for example, be used by the skilled person for the selection of suitable amounts of other sensitizers by a method comprising comparing a value for absorption and/or $^1O_2$ quantum yield of a desired sensitizer to a value for absorption and/or $^1O_2$ quantum yield of rose bengal and/or tetraphenylporphyrin.

In an embodiment, the molecular mass of a corresponding polymer having primary amine moieties instead of the sensitizer coupled to the polymer chain is from about 500 g/mol to about 1,000,000 g/mol. In another embodiment, the molecular mass of a corresponding polymer having primary amine moieties instead of the sensitizer coupled to the polymer chain is from about 500 g/mol to about 100,000 g/mol. In another embodiment, the molecular mass of a corresponding polymer having primary amine moieties instead of the sensitizer coupled to the polymer chain is from about 40,000 g/mol to about 60,000 g/mol or about 50,000 g/mol.

In an embodiment, the polymer is obtained from reaction of an (aminopropylmethylsiloxane)-dimethylsiloxane copolymer with the sensitizer comprising the amine-reactive group. In another embodiment, the polymer is obtained from reaction of an (aminopropylmethylsiloxane)-dimethylsiloxane copolymer with about 1-40% aminopropylmethylsiloxane, about 2-25% aminopropylmethylsiloxane, about 2-3% aminopropylmethylsiloxane, about 4-5% aminopropylmethylsiloxane, about 6-7% aminopropylmethylsiloxane, about 9-11% aminopropylmethylsiloxane, about 20-25% aminopropylmethylsiloxane or combinations thereof with the sensitizer comprising the amine-reactive group. In a further embodiment, the polymer is obtained from reaction of a (2-3% aminopropylmethylsiloxane)-dimethylsiloxane copolymer having a molecular mass of about 4,500 g/mol to about 6,000 g/mol and/or a kinematic viscosity of about 80 cSt to about 120 cSt (e.g. the polymer having Gelest product code AMS-132), a (4-5% aminopropylmethylsiloxane)-dimethylsiloxane copolymer having a molecular mass of about 7,000 g/mol to about 9,000 g/mol and/or a kinematic viscosity of about 100 cSt to about 300 cSt (e.g. the polymer having Gelest product code AMS-152), a (6-7% aminopropylmethylsiloxane)-dimethylsiloxane copolymer having a molecular mass of about 4,000 g/mol to about 5,000 g/mol and/or a kinematic viscosity of about 80 cSt to about 120 cSt (e.g. the polymer having Gelest product code AMS-162) or having a molecular mass of about 50,000 g/mol and/or a kinematic viscosity of about 1,800 cSt to about 2,200 cSt (e.g. the polymer having Gelest product code AMS-163), a (9-11% aminopropylmethylsiloxane)-dimethylsiloxane copolymer having a molecular mass of about 2,000 g/mol to about 3,000 g/mol and/or a kinematic viscosity of about 40 cSt to about 60 cSt (e.g. the polymer having Gelest product code AMS-191), a (20-25% aminopropylmethylsiloxane)-dimethylsiloxane copolymer having a molecular mass of about 20,000 g/mol and/or a kinematic viscosity of about 900 cSt to about 1,100 cSt (e.g. the polymer having Gelest product code AMS-1203) or combinations thereof with the sensitizer comprising the amine-reactive group. In an embodiment, the polymer is obtained from reaction of a (6-7% aminopropylmethylsiloxane)-dimethylsiloxane copolymer having a molecular mass of about 50,000 g/mol and/or a kinematic viscosity of about 1,800 cSt to about 2,200 cSt (e.g. the polymer having Gelest product code AMS-163) with the sensitizer comprising the amine-reactive group.

In an embodiment, the polymer is a random copolymer.

In an embodiment, the treating comprises soaking the textile with the solution comprising the polymer and the second sensitizer. In an embodiment, the soaking comprises immersing the textile in the solution comprising the polymer and the second sensitizer for a time of about 1 minute to about 1 hour, about 5 minutes to about 15 minutes or about 10 minutes.

The solution can comprise any suitable solvent or mixture thereof. In an embodiment, the solvent comprises a combination of toluene and tetrahydrofuran (THF). In an embodiment, the polymer is present in the solution in a amount of from about 1 wt % to about 85 wt %, about 1 wt % to about 50 wt %, about 1 wt % to about 13 wt %, about 5 wt % to about 13 wt %, about 4 wt % to about 6 wt %, about 12 wt % to about 14 wt %, about 5 wt % or about 13 wt %.

The irradiation is carried out at a wavelength, at an intensity and for a time for the oxidative coupling of the aliphatic primary amine moieties to proceed to a sufficient extent. For example, the person skilled in the art would appreciate that the wavelength of irradiation will depend on the particular sensitizer and would be able to readily select a suitable wavelength for irradiation for a particular sensitizer. In an embodiment, the irradiation comprises irradiation of a first side of the treated textile for a time of about 15 minutes to about 2 hours or about 30 minutes then irradiation of the opposite side of the treated textile for a time of about 15 minutes to about 2 hours or about 30 minutes. In another embodiment, the light intensity is about 100,000 lux to about 500,000 lux. In an embodiment, the irradiation is carried out at ambient temperature.

The textile is any suitable natural textile, synthetic textile or combination thereof. In an embodiment, the textile is a natural textile. In another embodiment, the textile is a synthetic textile. In a further embodiment, the textile is a combination of a natural and a synthetic textile. In an embodiment, the textile comprises, consists essentially of or consists of cotton, linen, polyester, denim, silk, paper or combinations thereof. In an embodiment, the textile comprises, consists essentially of or consists of cotton. In another embodiment, the textile comprises, consists essentially of or consists of linen. In a further embodiment, the textile comprises, consists essentially of or consists of polyester. In another embodiment, the textile comprises, consists essentially of or consists of denim. In an embodiment, the textile comprises, consists essentially of or consists of silk. In another embodiment, the textile comprises, consists essentially of or consists of paper. In a further embodiment, the textile comprises, consists essentially of or consists of a combination of two or more of cotton, linen, polyester, denim, silk and paper.

The present disclosure also includes an antimicrobial textile material prepared from a such a method.

The present disclosure also includes an antimicrobial textile material comprising a cross-linked polymeric material as described herein coated on a textile.

The textile is any suitable natural textile, synthetic textile or combination thereof. In an embodiment, the textile is a natural textile. In another embodiment, the textile is a synthetic textile. In a further embodiment, the textile is a combination of a natural and a synthetic textile. In an embodiment, the textile comprises, consists essentially of or consists of cotton, linen, polyester, denim, silk, paper or combinations thereof. In an embodiment, the textile comprises, consists essentially of or consists of cotton. In another embodiment, the textile comprises, consists essentially of or consists of linen. In a further embodiment, the textile comprises, consists essentially of or consists of polyester. In another embodiment, the textile comprises, consists essentially of or consists of denim. In an embodiment, the textile comprises, consists essentially of or consists of silk. In another embodiment, the textile comprises, consists essentially of or consists of paper. In a further embodiment, the textile comprises, consists essentially of or consists of a combination of two or more of cotton, linen, polyester, denim, silk and paper.

The present disclosure also includes a use of such antimicrobial textiles for reducing microbes. In an embodiment, the use comprises irradiating the antimicrobial textile at a wavelength absorbed by the sensitizer coupled to the polymer chain to generate reactive oxygen species (ROS). In an embodiment, the microbes are bacteria, a virus, a fungi or combinations thereof. In an embodiment, the microbes are bacteria. In an embodiment, the bacteria are gram-negative, gram-positive or a mixture of gram-negative and gram-positive. In another embodiment, the bacteria are gram-negative. In a further embodiment, the bacteria are gram-positive. In another embodiment, the bacteria are a mixture of gram-negative and gram-positive. In an embodiment, the gram-negative bacteria are *Escherichia coli*. In another embodiment, the gram-positive bacteria are *Staphylococcus aureus*. In a further embodiment, the *Staphylococcus aureus* are methicillin-resistant *Staphylococcus aureus* (MRSA).

III. Polymers, Cross-linked Polymeric Materials and Uses Thereof

Herein the photooxidative cross-linking of amine-containing polymers using an optionally solvent-free system is described where amines can play a dual role as antimicrobial functionalities and cross-linking sites. For example, in the Examples described in greater detail hereinbelow, rose bengal, a xanthene dye, was thermally reacted with the polymer to give a solvent-free liquid siloxane that can generate reactive singlet oxygen upon aerobic green light irradiation, coupling the amine functionalities into imine cross-links. Room-temperature irradiation under ambient atmosphere resulted in free standing elastic materials with mechanical properties that depended on the amount of rose bengal. The solvent-free nature of the material can be exploited, for example, to generate non-equilibrium 3D structures using a low-temperature deposition as well as direct-write patterning and stereolithography on glass substrates. The antimicrobial activity was investigated, with the cross-linked material demonstrating efficacy against *E. coli* (Gram negative) and MRSA (Gram positive) bacterial strains and inducing complete cell lysis of incubated CHO-K1 mammalian cells, demonstrating applicability as a mechanically robust single-component antimicrobial elastomer.

Accordingly, the present disclosure includes a polymer comprising:

- a polymer chain comprising a plurality of aliphatic primary amine moieties or precursors thereto as side-chains; and
- a sensitizer coupled to the polymer chain via a moiety obtained from reaction of an aliphatic primary amine moiety with an amine-reactive group on the sensitizer.

In an embodiment, the polymer comprises the plurality of aliphatic primary amine moieties. In another embodiment, the polymer comprises the precursors thereto.

In an embodiment, the polymer chain comprises a polysiloxane, a polysaccharide, a polyamide, a polyester or a polymethacrylate. In another embodiment, the polymer chain comprises a polysaccharide. In another embodiment, the polymer chain comprises a polyamide. In another embodiment, the polymer chain comprises a polyester. In a further embodiment, the polymer chain comprises a polymethacrylate. In another embodiment, the polymer chain comprises a polysiloxane.

In an embodiment, the polysaccharide is chitosan. In another embodiment, the polyamide is α-polylysine. In a further embodiment, the polymethacrylate is an alkyl acrylate. In another embodiment, the polymethacrylate is a methacrylate.

In an embodiment, the polymer is of the general Formula (III):

(III)

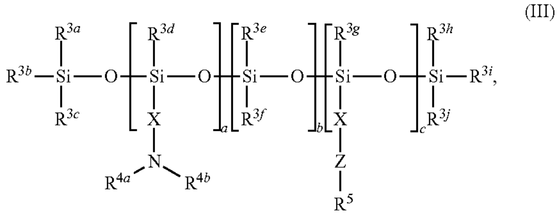

wherein $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are each independently $C_{1-10}$alkyl, $C_{3-10}$cycloalkyl, $C_{1-6}$alkyleneC$_{3-10}$cycloalkyl, aryl or $C_{1-6}$alkylene-aryl;

$R^4$ is —X—$NH_2$ or the precursor thereto;

each X is independently $C_{1-10}$alkylene or $C_{3-10}$cycloalkylene;

each Z is independently the moiety obtained from reaction of the aliphatic primary amine moiety with the amine-reactive group on the sensitizer;

$R^5$ is the remainder of the sensitizer;

a is an integer of at least 1, optionally at least 2;

b is an integer of at least 1; and c is an integer of at least 1.

In an embodiment, $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are each independently $C_{1-10}$alkyl or aryl. In another embodiment, $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are each independently $C_{1-6}$alkyl. In a further embodiment, $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are each independently $C_{1-6}$alkyl. In another embodiment of the present disclosure, $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are all methyl.

In an embodiment, each X is independently $C_{1-10}$alkylene. In another embodiment, each X is independently $C_{2-6}$alkylene. In a further embodiment, each X is —$(CH_2)_3$—.

In an embodiment, each Z is an amide.

In an embodiment, $R^4$ is —X—$NH_2$.

In an alternative embodiment, $R^4$ is the precursor to —X—$NH_2$.

a, b and c represent the numbers of monomeric units. In an embodiment, (a+c)/(a+b+c) is about 0.001 to about 0.4. In another embodiment, (a+c)/(a+b+c) is about 0.01 to about 0.2. In a further embodiment, (a+c)/(a+b+c) is about 0.04 to about 0.08. In another embodiment, (a+c)/(a+b+c) is about 0.06. In an embodiment, c/(a+b+c) is about 0.0001 to about 0.1. In another embodiment, c/(a+b+c) is about 0.001 to about 0.02.

The sensitizer with the amine-reactive group is any suitable sensitizer comprising an amine-reactive group. In an embodiment, the sensitizer is an acridine comprising the amine-reactive group, a porphyrin comprising the amine-reactive group, a metalloporphyrin comprising the amine-reactive group, a xanthene comprising the amine-reactive group, a methylene blue comprising the amine-reactive group or combinations thereof. In another embodiment, the sensitizer is an acridine comprising the amine-reactive group. In another embodiment, the sensitizer is a porphyrin comprising the amine-reactive group. In a further embodiment, the sensitizer is a metalloporphyrin comprising the amine-reactive group. In another embodiment, the sensitizer is a xanthene comprising the amine-reactive group. In another embodiment, the sensitizer is rose bengal. In another embodiment, the sensitizer is a methylene blue comprising the amine-reactive group. In a further embodiment, the sensitizer is a combination of two or more of an acridine comprising the amine-reactive group, a porphyrin comprising the amine-reactive group, a metalloporphyrin comprising the amine-reactive group, a xanthene comprising the amine-reactive group and a methylene blue comprising the amine-reactive group. In some embodiments, such sensitizers with an amine-reactive group are commercially available. Alternatively, a person skilled in the art would readily be able to select a suitable synthetic route to prepare a sensitizer with an amine-reactive group. In an embodiment, the amine-reactive group is a carboxylic acid.

In an embodiment, the molecular mass of a corresponding polymer having primary amine moieties instead of the sensitizer coupled to the polymer chain is from about 500 g/mol to about 1,000,000 g/mol. In another embodiment, the molecular mass of a corresponding polymer having primary amine moieties instead of the sensitizer coupled to the polymer chain is from about 500 g/mol to about 100,000 g/mol. In another embodiment, the molecular mass of a corresponding polymer having primary amine moieties instead of the sensitizer coupled to the polymer chain is from about 40,000 g/mol to about 60,000 g/mol or about 50,000 g/mol.

In an embodiment, the polymer is obtained from reaction of an (aminopropylmethylsiloxane)-dimethylsiloxane copolymer with the sensitizer comprising the amine-reactive group. In another embodiment, the polymer is obtained from reaction of an (aminopropylmethylsiloxane)-dimethylsiloxane copolymer with about 1-40% aminopropylmethylsiloxane, about 2-25% aminopropylmethylsiloxane, about 2-3% aminopropylmethylsiloxane, about 6-7% aminopropylmethylsiloxane, about 4-5% aminopropylmethylsiloxane, about 9-11% aminopropylmethylsiloxane, about 20-25% aminopropylmethylsiloxane or combinations thereof with the sensitizer comprising the amine-reactive group. In a further embodiment, the polymer is obtained from reaction of a (2-3% aminopropylmethylsiloxane)-dimethylsiloxane copolymer having a molecular mass of about 4,500 g/mol to about 6,000 g/mol and/or a kinematic viscosity of about 80 cSt to about 120 cSt (e.g. the polymer having Gelest product code AMS-132), a (4-5% aminopropylmethylsiloxane)-dimethylsiloxane copolymer having a molecular mass of about 7,000 g/mol to about 9,000 g/mol and/or a kinematic viscosity of about 100 cSt to about 300 cSt (e.g. the polymer having Gelest product code AMS-152), a (6-7% aminopropylmethylsiloxane)-dimethylsiloxane copolymer having a molecular mass of about 4,000 g/mol to about 5,000 g/mol and/or a kinematic viscosity of about 80 cSt to about 120 cSt (e.g. the polymer having Gelest product code AMS-162) or having a molecular mass of about 50,000 g/mol and/or a kinematic viscosity of about 1,800 cSt to about 2,200 cSt (e.g. the polymer having Gelest product code AMS-163), a (9-11% aminopropylmethylsiloxane)-dimethylsiloxane copolymer having a molecular mass of about 2,000 g/mol to about 3,000 g/mol and/or a kinematic viscosity of about 40 cSt to about 60 cSt (e.g. the polymer having Gelest product code AMS-191), a (20-25% aminopropylmethylsiloxane)-dimethylsiloxane copolymer having a molecular mass of about 20,000 g/mol and/or a kinematic viscosity of about 900 cSt to about 1,100 cSt (e.g. the polymer having Gelest product code AMS-1203) or combinations thereof with the sensitizer comprising the amine-reactive group. In an embodiment, the polymer is obtained from reaction of a (6-7% aminopropylmethylsiloxane)-dimethylsiloxane copolymer having a molecular mass of about 50,000 g/mol and/or a kinematic viscosity of about 1,800 cSt to about 2,200 cSt (e.g. the polymer having Gelest product code AMS-163) with the sensitizer comprising the amine-reactive group. In an embodiment, a corresponding polymer having primary amine moieties instead of the sensitizer coupled to the polymer chain is a (6-7% aminopropylmethylsiloxane)-dimethylsiloxane copolymer having a molecular mass of about 50,000 g/mol and/or a kinematic viscosity of about 1,800 cSt to about 2,200 cSt.

In an embodiment, the polymer is a random copolymer.

The present disclosure also includes a composition comprising, consisting essentially of or consisting of:

(i) such a polymer comprising:
  - a polymer chain comprising a plurality of aliphatic primary amine moieties or precursors thereto as side-chains; and
  - a sensitizer coupled to the polymer chain via a moiety obtained from reaction of an aliphatic primary amine moiety with an amine-reactive group on the sensitizer; and (ii) a corresponding polymer having primary amine moieties instead of the sensitizer coupled to the polymer chain.

The present disclosure also includes a use of such a polymer or such a composition for preparing a cross-linked polymeric material. For example, in some embodiments, the use is in a method for preparing a cross-linked polymeric material as described herein and/or a method for preparing an antimicrobial textile material as described herein.

The present disclosure also includes a use of such a polymer or such a composition in a method for preparing a microfluidics device.

The present disclosure also includes a use of such a polymer or such a composition as an antimicrobial coating or surface. The present disclosure also includes a use of such a polymer or such a composition as an antimicrobial agent. The present disclosure further includes a use of such a polymer or such a composition for reducing microbes on a surface.

In an embodiment, the microbes are bacteria, a virus, a fungi or combinations thereof. In an embodiment, the microbes are bacteria. In an embodiment, the bacteria are gram-negative, gram-positive or a mixture of gram-negative and gram-positive. In another embodiment, the bacteria are gram-negative. In a further embodiment, the bacteria are gram-positive. In another embodiment, the bacteria are a mixture of gram-negative and gram-positive. In an embodiment, the gram-negative bacteria are *Escherichia coli*. In another embodiment, the gram-positive bacteria are *Staphylococcus aureus*. In a further embodiment, the *Staphylococcus aureus* are methicillin-resistant *Staphylococcus aureus* (MRSA).

The present disclosure also includes a cross-linked polymeric material comprising:

- polymer chains cross-linked by imine moieties obtained via the oxidative coupling of aliphatic primary amine moieties; and
- a sensitizer coupled to at least a portion of the polymer chains via a moiety obtained from reaction of an aliphatic primary amine moiety with an amine-reactive group on the sensitizer.

In an embodiment, the cross-linked polymeric material further comprises a plurality of aliphatic primary amine moieties.

In an embodiment, the polymer chains comprise a polysiloxane, a polysaccharide, a polyamide, a polyester or a polymethacrylate. In another embodiment, the polymer chains comprise a polysaccharide. In another embodiment, the polymer chains comprise a polyamide. In another embodiment, the polymer chains comprise a polyester. In a further embodiment, the polymer chains comprise a polymethacrylate. In another embodiment, the polymer chains comprise a polysiloxane.

In an embodiment, the polysaccharide is chitosan. In another embodiment, the polyamide is α-polylysine. In a further embodiment, the polymethacrylate is an alkyl acrylate. In another embodiment, the polymethacrylate is a methacrylate.

In an embodiment, the cross-linked polymeric material is of the general Formula (IV):

(IV)

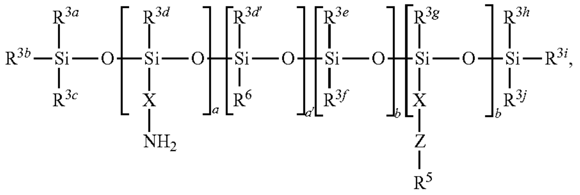

wherein $R^{3a}$, $R^{3c}$, $R^{3d}$, $3^{d'}$ $R^{3e}$, $R^{3f}$, $R^{3g}$, $R^{3h}$ and $R^{3j}$ are each independently $C_{1-10}$alkyl, $C_{3-10}$cycloalkyl, $C_{1-6}$alkylene$C_{3-10}$cycloalkyl, aryl or $C_{1-6}$alkylene-aryl;

$R^{3b}$ and $R^{3i}$ are each independently $C_{1-10}$alkyl, $C_{3-10}$cycloalkyl, $C_{1-6}$alkylene$C_{3-10}$cycloalkyl, aryl, $C_{1-6}$alkylene-aryl, —X—$NH_2$ or $R^6$;

$R^6$ is a portion of an imine cross-link formed from the oxidative coupling of two —X—$NH_2$ moieties;

each X is independently $C_{1-10}$alkylene or $C_{3-10}$cycloalkylene;

each Z is independently the moiety obtained from reaction of the aliphatic primary amine moiety with the amine-reactive group on the sensitizer;

$R^5$ is the remainder of the sensitizer;

a is an integer of at least 1;

a' is an integer of at least 1;

b is an integer of at least 1; and c is an integer of at least 1.

In an embodiment, $R^{3a}$, $R^{3b}$, $R^{3c}$, $R^{3d}$, $R^{3d'}$, $R^{3e}$, $R^{3f}$, $R^{3g}$, $R^{3h}$, $R^{3i}$ and $R^{3j}$ are each independently $C_{1-10}$alkyl or aryl. In another embodiment, $R^{3a}$, $R^{3b}$, $R^{3c}$, $R^{3d}$, $R^{3d'}$, $R^{3e}$, $R^{3f}$, $R^{3g}$, $R^{3h}$, $R^{3i}$ and $R^{3j}$ are each independently $C_{1-6}$alkyl. In a further embodiment, $R^{3a}$, $R^{3b}$, $R^{3c}$, $R^{3d}$, $R^{3d'}$, $R^{3e}$, $R^{3f}$, $R^{3g}$, $R^{3h}$, $R^{3i}$ and $R^{3j}$ are each independently $C_{1-4}$alkyl. In another embodiment, $R^{3a}$, $R^{3b}$, $R^{3c}$, $R^{3d}$, $R^{3d'}$, $R^{3e}$, $R^{3f}$, $R^{3g}$, $R^{3h}$, $R^{3i}$ and $R^{3j}$ are all methyl.

In an embodiment, $R^{3a}$, $R^{3c}$, $R^{3d}$, $R^{3d'}$, $R^{3e}$, $R^{3f}$, $R^{3g}$, $R^{3h}$ and $R^{3j}$ are each independently $C_{1-10}$alkyl or aryl and $R^{3b}$ and $R^{3i}$ are each independently —X—$NH_2$ or $R^6$. In another embodiment, $R^{3a}$, $R^{3c}$, $R^{3d}$, $R^{3d'}$, $R^{3e}$, $R^{3f}$, $R^{3g}$, $R^{3h}$ and $R^{3j}$ are each independently $C_{1-6}$ alkyl and $R^{3b}$ and $R^{3i}$ are each independently —X—$NH_2$ or $R^6$. In a further embodiment, $R^{3a}$, $R^{3c}$, $R^{3d}$, $R^{3d'}$, $R^{3e}$, $R^{3f}$, $R^{3g}$, $R^{3h}$ and $R^{3j}$ are each independently $C_{1-4}$alkyl and $R^{3b}$ and $R^{3i}$ are each independently —X—$NH_2$ or $R^6$. In another embodiment, $R^{3a}$, $R^{3c}$, $R^{3d}$, $R^{3d'}$, $R^{3e}$, $R^{3f}$, $R^{3g}$, $R^{3h}$, and $R^{3j}$ are all methyl and $R^{3b}$ and $R^{3i}$ are each independently —X—$NH_2$ or $R^6$.

In an embodiment, each X is independently $C_{1-10}$alkylene. In another embodiment, each X is independently $C_{2-6}$alkylene. In a further embodiment, each X is $-(CH_2)_3-$.

In an embodiment, each Z is an amide.

a, a', b and c represent the numbers of monomeric units. It will be appreciated by a person skilled in the art that these numbers may vary between the polymer chains comprising the cross-linked polymeric material. In an embodiment, (a+a'+c)/(a+a'+b+c) is about 0.001 to about 0.4. In another embodiment, (a+a'+c)/(a+a'+b+c) is about 0.01 to about 0.2. In a further embodiment, (a+a'+c)/(a+a'+b+c) is about 0.04 to about 0.08. In another embodiment, (a+a'+c)/(a+a'+b+c) is about 0.06. In an embodiment, c/(a+a'+b+c) is about 0.0001 to about 0.1. In another embodiment, c/(a+a'+b+c) is about 0.001 to about 0.02.

The sensitizer with the amine-reactive group is any suitable sensitizer comprising an amine-reactive group. In an embodiment, the sensitizer is an acridine comprising the amine-reactive group, a porphyrin comprising the amine-reactive group, a metalloporphyrin comprising the amine-reactive group, a xanthene comprising the amine-reactive group, a methylene blue comprising the amine-reactive group or combinations thereof. In another embodiment, the sensitizer is an acridine comprising the amine-reactive group. In another embodiment, the sensitizer is a porphyrin comprising the amine-reactive group. In a further embodiment, the sensitizer is a metalloporphyrin comprising the amine-reactive group. In another embodiment, the sensitizer is a xanthene comprising the amine-reactive group. In another embodiment, the sensitizer is rose bengal. In another embodiment, the sensitizer is a methylene blue comprising the amine-reactive group. In a further embodiment, the sensitizer is a combination of two or more of an acridine comprising the amine-reactive group, a porphyrin comprising the amine-reactive group, a metalloporphyrin comprising the amine-reactive group, a xanthene comprising the amine-reactive group and a methylene blue comprising the amine-reactive group. In some embodiments, such sensitizers with an amine-reactive group are commercially available. Alternatively, a person skilled in the art would readily be able to select a suitable synthetic route to prepare a sensitizer with an amine-reactive group. In an embodiment, the amine-reactive group is a carboxylic acid.

In an embodiment, the molecular mass of a corresponding polymer chain having primary amine moieties instead of the imine moieties and the sensitizer coupled to the polymer chain is from about 500 g/mol to about 1,000,000 g/mol. In another embodiment, the molecular mass of a corresponding polymer having primary amine moieties instead of the imine moieties and the sensitizer coupled to the polymer chain is from about 500 g/mol to about 100,000 g/mol. In another embodiment, the molecular mass of a corresponding polymer having primary amine moieties instead of the imine moieties and the sensitizer coupled to the polymer chain is from about 40,000 g/mol to about 60,000 g/mol or about 50,000 g/mol.

In an embodiment, the sensitizer is coupled to the polymer chains via reaction of an (aminopropylmethylsiloxane)-dimethylsiloxane copolymer with the sensitizer comprising the amine-reactive group. In another embodiment, the sensitizer is coupled to the polymer chains via reaction of an (aminopropylmethylsiloxane)-dimethylsiloxane copolymer with about 1-40% aminopropylmethylsiloxane, about 2-25% aminopropylmethylsiloxane, about 2-3% aminopropylmethylsiloxane, about 4-5% aminopropylmethylsiloxane, about 6-7% aminopropylmethylsiloxane, about 9-11% aminopropylmethylsiloxane, about 20-25% aminopropylmethylsiloxane or combinations thereof with the sensitizer comprising the amine-reactive group. In a further embodiment, the sensitizer is coupled to the polymer chains via reaction of a (2-3% aminopropylmethylsiloxane)-dimethylsiloxane copolymer having a molecular mass of about 4,500 g/mol to about 6,000 g/mol and/or a kinematic viscosity of about 80 cSt to about 120 cSt (e.g. the polymer having Gelest product code AMS-132), a (4-5% aminopropylmethylsiloxane)-dimethylsiloxane copolymer having a molecular mass of about 7,000 g/mol to about 9,000 g/mol and/or a kinematic viscosity of about 100 cSt to about 300 cSt (e.g. the polymer having Gelest product code AMS-152), a (6-7% aminopropylmethylsiloxane)-dimethylsiloxane copolymer having a molecular mass of about 4,000 g/mol to about 5,000 g/mol and/or a kinematic viscosity of about 80 cSt to about 120 cSt (e.g. the polymer having Gelest product code AMS-162) or having a molecular mass of about 50,000 g/mol and/or a kinematic viscosity of about 1,800 cSt to about 2,200 cSt (e.g. the polymer having Gelest product code AMS-163), a (9-11% aminopropylmethylsiloxane)-dimethylsiloxane copolymer having a molecular mass of about 2,000 g/mol to about 3,000 g/mol and/or a kinematic viscosity of about 40 cSt to about 60 cSt (e.g. the polymer having Gelest product code AMS-191), a (20-25% aminopropylmethylsiloxane)-dimethylsiloxane copolymer having a molecular mass of about 20,000 g/mol and/or a kinematic viscosity of about 900 cSt to about 1,100 cSt (e.g. the polymer having Gelest product code AMS-1203) or combinations thereof with the sensitizer comprising the amine-reactive group. In an embodiment, the sensitizer is coupled to the polymer chains via reaction of a (6-7% aminopropylmethylsiloxane)-dimethylsiloxane copolymer having a molecular mass of about 50,000 g/mol and/or a kinematic viscosity of about 1,800 cSt to about 2,200 cSt (e.g. the polymer having Gelest product code AMS-163) with the sensitizer comprising the amine-reactive group. In an embodiment, a corresponding polymer having primary amine moieties instead of the imine moieties and the sensitizer coupled to the polymer chain is a (6-7% aminopropylmethylsiloxane)-dimethylsiloxane copolymer having a molecular mass of about 50,000 g/mol and/or a kinematic viscosity of about 1,800 cSt to about 2,200 cSt.

The present disclosure also includes a use of such a cross-linked polymeric material as an antimicrobial coating or surface. The present disclosure also includes a use of such a cross-linked polymeric material as an antimicrobial agent. The present disclosure further includes a use of such a cross-linked polymeric material for reducing microbes on a surface. In an embodiment, the use comprises irradiating the cross-linked polymeric material at a wavelength absorbed by the sensitizer coupled to the polymer chains to generate reactive oxygen species (ROS).

In an embodiment, the microbes are bacteria, a virus, a fungi or combinations thereof. In an embodiment, the microbes are bacteria. In an embodiment, the bacteria are gram-negative, gram-positive or a mixture of gram-negative and gram-positive. In another embodiment, the bacteria are gram-negative. In a further embodiment, the bacteria are gram-positive. In another embodiment, the bacteria are a mixture of gram-negative and gram-positive. In an embodiment, the gram-negative bacteria are *Escherichia coli*. In another embodiment, the gram-positive bacteria are *Staphylococcus aureus*. In a further embodiment, the *Staphylococcus aureus* are methicillin-resistant *Staphylococcus aureus* (MRSA).

The present disclosure also includes a microfluidics device comprising such a cross-linked polymeric material.

The following are non-limiting examples of the present disclosure:

EXAMPLES

Example 1: Photo-Oxidative Imine Crosslinking of Amine-PDMS Using Singlet Oxygen

I: Experimental

A. Materials

The (6-7% aminopropylmethylsiloxane)-dimethylsiloxane copolymer (AMS-163), aminopropyl-terminated polydimethylsiloxane (DMS-A11), and (18-24% aminoethylaminopropylmethylsiloxane)-dimethylsiloxane copolymer (AMS-2202) were purchased from Gelest. Platinum (II) octaethylporphyrin was purchased from Frontier Scientific. All other reagents were purchased from Sigma Aldrich and used without further purification.

B. Instrumentation

Absorption spectra were collected on a Varian Cary 5000 UV-Vis-NIR spectrophotometer. PtOEP was dissolved in DCM and the spectrum measured at a concentration of $2.47\times10^{-6}$ M. Rose Bengal was dissolved in MeOH and the spectrum measured at a concentration of $1.17\times10^{-6}$ M.

$^1H$ NMR spectroscopic data were collected on a 400 MHz Bruker Avance 400dir spectrometer at 25° C. Residual proto-solvent peaks were used to reference the $^1H$ NMR spectra.

$^{13}C$ CP-MAS NMR spectra with high power proton decoupling were collected on a 9.4 Tesla Bruker solid state DRX spectrometer using a sample of P100 dried under vacuum for 1 week. Samples were spun at 4 kHz at the magic angle. Ramped pulses at 50% on the $^{13}C$ frequency were used for cross polarization with a contact time of 5 ms for all experiments. The relaxation delay was set to be 5 s, and acquisition time 50 ms. Data were processed with a 20 Hz line broadening exponential decay function. Chemical shift values (ppm) were referenced with adamantane $^{13}CH_2$ signal at 29.5 ppm. All experiments were conducted at room temperature.

Infrared spectra were collected on a PerkinElmer Frontier FT-IR with a diamond attenuated total reflection (ATR) plate.

Thermogravimetric analysis (TGA) was performed on Netzch TG209 Libra using an $Al_2O_3$ crucible at a temperature ramp of 10° C./min under a $N_2$ purge flow of 30 mL/min.

Differential scanning calorimetry (DSC) measurements were performed using a TA Instruments DSC Q2000 instrument with a TA Instruments Refrigerated Cooling System 90 at a ramp rate of 10° C./min and a Netzsch DSC Polyma at a ramp rate of 10° C./min.

Mechanical testing was carried out in triplicate on a dynamic mechanical analyzer (DMA, RSA G2 TA Instruments) in axial mode equipped with tension fixture. Samples were cut into strips with dimensions 4 mm×3 mm×1 mm. Sample strips were extended until breakage at room temperature by applying constant linear rate of 0.1 mm/min. Strain was calculated by:

$$\epsilon = \frac{L - L_0}{L_0} \times 100$$

Where $L_0$ is the initial length of the sample. The Young's modulus was determined from the equation $\sigma=E_\varepsilon$ ($\sigma$ is the tensile stress), which is valid only for the initial elastic response of the material. The tensile strength represents the maximum stress in the stress-strain curve and ultimate elongation, $\varepsilon_u$, shows how much the material can elongate before fracture/failure. The latter was calculated by using the following equation:

$$\varepsilon_u = \frac{L_f - L_0}{L_0} \times 100$$

C. Sample Preparation (a) P100, P50, P25, P10 and PA: A fresh PtOEP stock solution was prepared by dissolving the porphyrin in m-xylene to give a concentration of $4.12\times10^{-4}$ M. For 1.0 g of $PDMS-NH_2$, 1.58 mL of PtOEP solution was added to the polymer in a vial and mixed using a vortex mixer. The resulting solution was transferred to a commercially available 3 cm diameter circular silicone mold. The mold was irradiated using a Westinghouse 15 W green LED flood lamp (100 W equivalent) at a distance of 10 cm on the benchtop open to the air. Samples prepared for mechanical testing were irradiated continuously for 18 hours. During irradiation, samples were not noticeably warm to the touch at any point. Other samples were prepared in the same fashion. P50, P25, and P10 were prepared by combining 50%, 25%, and 10% respectively of the PtOEP stock solution used for P100. PA was prepared by substituting 30% of the $PDMS-NH_2$ mass with the amine terminated PDMS.

(b) PB: Rose Bengal was dissolved in an equal mass solution of ethanol and 1,2-propanediol to give a concentration of $2.08\times10^{-3}$ M. For 1.0 g of $PDMS-NH_2$, 157 μL of RB solution was added to the polymer in a vial and irradiation carried out using the same procedure as for P100. These volumes were chosen to deliver half the molar amount of RB as PtOEP owing to the approximately doubled absorption at 530 nm of RB compared with PtOEP.

D. Mass Balance

For mass balance experiments, $PDMS-NH_2$ and the PtOEP solution were mixed in the desired ratios and a set amount pipetted into a silicone mold. The mold was weighed before and after four hours of irradiation. The masses after irradiation indicated that insignificant amounts of m-xylene remained in the system after cross-linking. The soluble fraction was determined by adding a contiguous piece of polymer (from the larger samples 30 mm diameter, 1 mm thick described below), approximately 0.2 g, to 10 mL of DCM in a sealed vial and allowing to stand overnight. The DCM was decanted off, the system rinsed with additional DCM, and then the sample removed and patted dry with tissue. After being weighed, the sample was then dried for three days under vacuum and reweighed. The initial and final masses were used to determine the soluble fraction, and the swollen mass and final mass was used to determine the mass percent of DCM uptaken in the swollen gels.

E. Photolithography

For photolithography, 100-200 μL of P25 solution was pipetted onto a glass slide and allowed to spread into a thin layer. Two glass slides on either side were used to support a transparency sheet that was patterned with the desired mask using a common office printer. Irradiation was carried out using the same setup as for thick samples. After one hour of irradiation the sample was rinsed by gentle irrigation with ethyl acetate using a pipette and then allowed to air dry.

II. Results and Discussion

Herein is reported the first use of photo-generated $^1O_2$ for the oxidative crosslinking of an amine-containing PDMS, converting the material from a liquid to elastic, solvent-free solid. This technique may allow for the simple, low cost, and/or efficient photo-crosslinking of such polymers using metal and metal-free photocatalysts without the need for additional synthetic steps, purification of catalyst or polymer, and/or the use of inert environments. Safe and affordable green light-emitting diodes (LEDs) were the light source for this transformation, which may mitigate the dangers of high-intensity UV irradiation. This technique was demonstrated using side chain and end-terminated amine copolymers, as well as metalloporphyrin and organic $^1O_2$ sensitizers. As described in greater detail hereinbelow, it was also shown that this system can be utilized for photolithography The photo-cross-linkable system included three components: a polymer containing alkyl-amine functional groups, a $^1O_2$ sensitizing dye, and a solvent for the sensitizer. Platinum octaethylporphyrin (PtOEP; Scheme 2) is a metalloporphyrin species that can generate $^1O_2$ from the photoaccessible triplet state.[45] The absorbance spectrum overlaps well with the spectral output of commercially available 530 nm green LEDs (FIG. 1).

Scheme 2

Chemical structures of platinum octaethylporphyrin (PtOEP) and (6-7 wt % aminopropylmethylsiloxane)-dimethylsiloxane copolymer (PDMS-$NH_2$) (top row) and schematic representation of the photo-oxidative cross-linking of pendant amine groups using oxygen and PtOEP as a photosensitizer (bottom row). PDMS-$NH_2$ is a random copolymer with a molecular mass of 50,000 g/mol according to the Safety Data Sheet for AMS-163. 620 is an estimation calculated from the determined average of 39 amine functionalities[46].

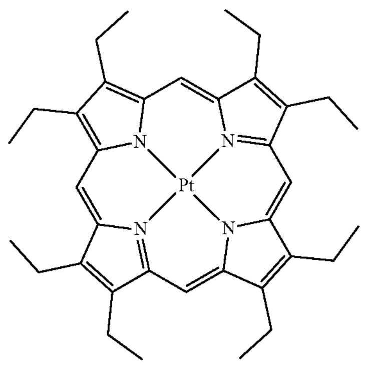

PtOEP

-continued

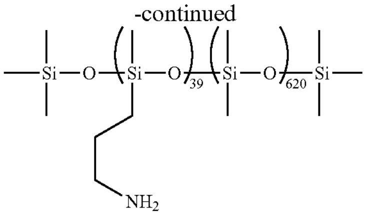

PDMS-$NH_2$

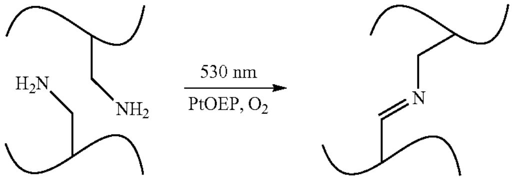

Figure 2:
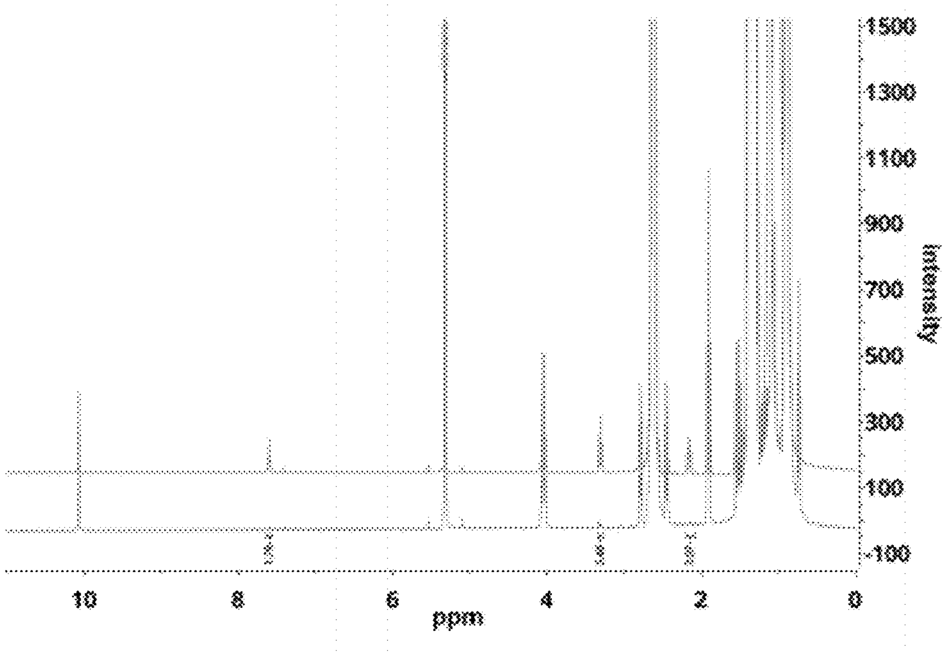
FIG. 2 shows $^1$H nuclear magnetic resonance (NMR) spectra of a sample containing n-butylamine and PtOEP before irradiation (bottom spectrum) and after one hour of 530 nm irradiation (top spectrum). Integrated peaks are assigned to the formed imine product. $CD_2Cl_2$, room temperature (RT), 400 MHz.

An experiment was performed that demonstrated the use of PtOEP for the photooxidative coupling of amines. n-Butylamine was dissolved in $CD_2Cl_2$ in an NMR tube and PtOEP was added. After one hour of 530 nm irradiation open to the atmosphere, a new set of downfield peaks was observed in the $^1$H NMR spectrum that match literature values for aliphatic alkyl imines (FIG. 2).[47]

Figure 3:
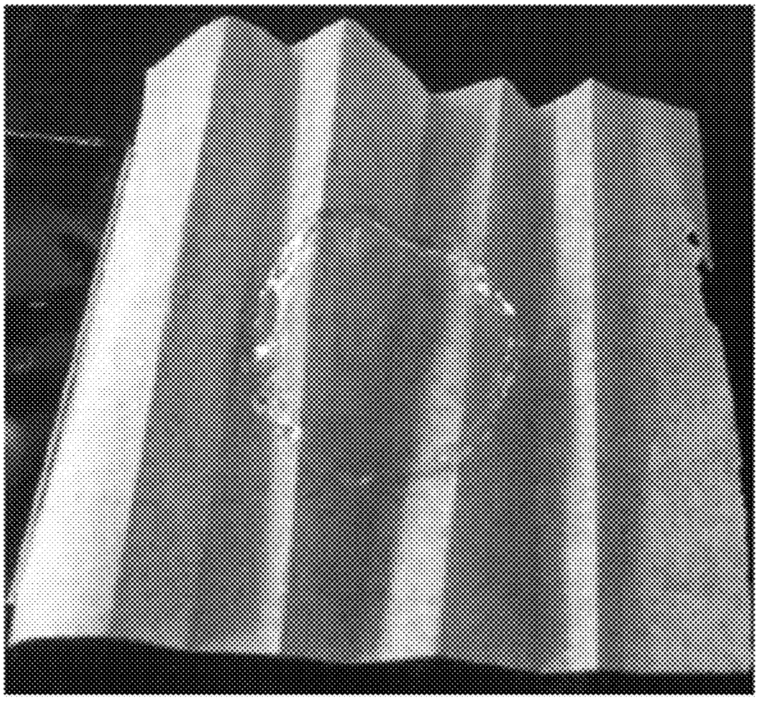
FIG. 3 shows a photograph of a freestanding piece produced from irradiating 6-7 wt % (aminopropylmethylsiloxane)-dimethylsiloxane copolymer ($PDMS-NH_2$) combined with PtOEP in m-xylene to give an approximate amine:porphyrin molar ratio of 1200:1 (P100) for one hour with 530 nm light. Sample is 20 mm in diameter, 0.5 mm thick.
Figure 4:
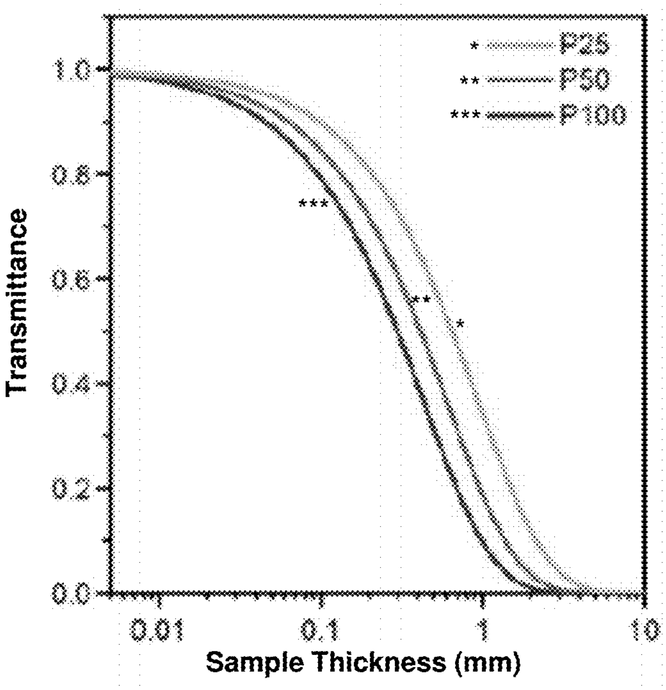
FIG. 4 shows the calculated optical transmittance of 530 nm light as a function of initial sample thickness through different initial polymer mixtures.

Commercially available (6-7 wt % aminopropylmethylsiloxane)-dimethylsiloxane copolymer (PDMS-$NH_2$) was used as the amine containing polymer. This polymer is a colorless viscous oil at room temperature. m-Xylene was chosen as the solvent for PtOEP due to its high boiling point that reduces evaporation when handling and transferring the mixture. A near-saturated PtOEP solution was used for all experiments ($4.12\times10^{-4}$ M). PDMS-$NH_2$ was combined with the PtOEP solution to give an approximate amine: porphyrin molar ratio of 1200:1 with a PtOEP content of 200 ppm, 0.02% weight percent (designated P100). Irradiation of this mixture with 530 nm LED light resulted in solidification of the liquid after one hour to give a pale pink free-standing film (FIG. 3). The optical transmittance of the P100 mixture before solvent evaporation, as well as samples with 50% and 25% of the volume of PtOEP solution (named P50 and P25 respectively, Table 1), were calculated as a function of initial solution thickness (FIG. 4). Optical transmittance was calculated using the rearranged Beer-Lambert equation: $T=10^{-\varepsilon bc}$. The molar extinction coefficient was determined from the data in FIG. 1, and the concentration was calculated using the masses of PtOEP, m-xylene, and PDMS-$NH_2$ for each mixture. 5% transmittance at 530 nm for P100 was calculated at an initial thickness of 1.3 mm allowing for the preparation of samples for mechanical testing, with optical penetration expected to increase during irradiation as the dye undergoes photobleaching. Substantially thicker samples were not prepared because of the possibility of inhomogeneous cross-linking as a result of poor light penetration throughout the sample. For example, samples 5 mm and above would be thick enough to prevent light from penetrating the initial solution.

TABLE 1

Mass ratios and PtOEP wt % for samples with different amounts of PtOEP.

| ID | Polymer | m-Xylene | PtOEP | PtOEP (wt %) |
|---|---|---|---|---|
| P100 | 2100 | 2900 | 1 | 0.020 |
| P50 | 4200 | 2900 | 1 | 0.014 |

TABLE 1-continued

Mass ratios and PtOEP wt % for samples with different amounts of PtOEP.

| ID | Polymer | m-Xylene | PtOEP | PtOEP (wt %) |
|---|---|---|---|---|
| P25 | 8400 | 2900 | 1 | 0.009 |
| P10 | 21000 | 2900 | 1 | 0.004 |

Figure 5:
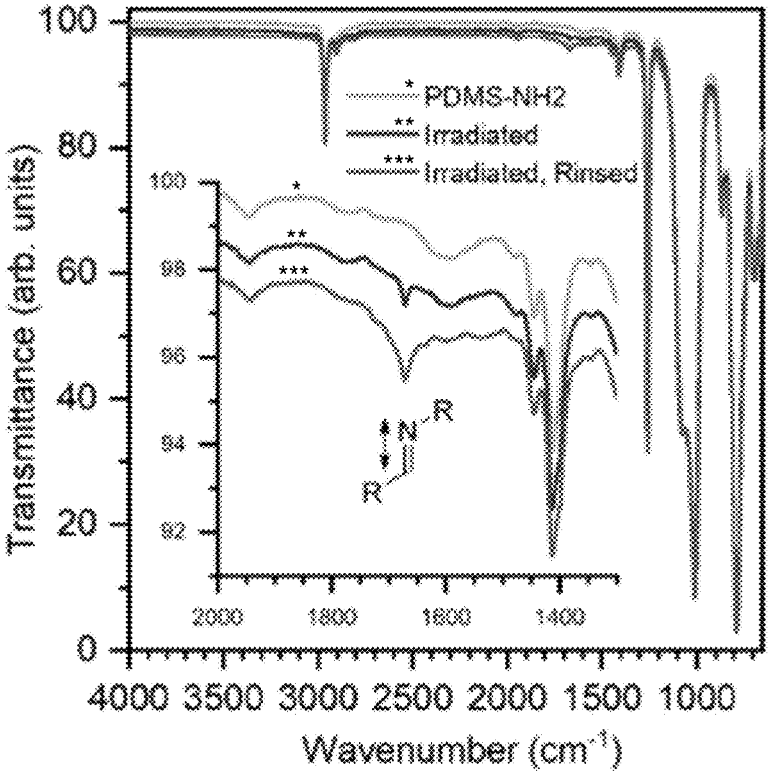
FIG. 5 shows Fourier transform infrared (FT-IR) spectra of $PDMS-NH_2$, the P100 mixture irradiated for 4 h using 530 nm light, and the irradiated P100 after soaking in DCM to remove the soluble components wherein the inset shows the imine peak region and spectra are offset vertically by one transmittance unit for display purposes.
Figure 6:
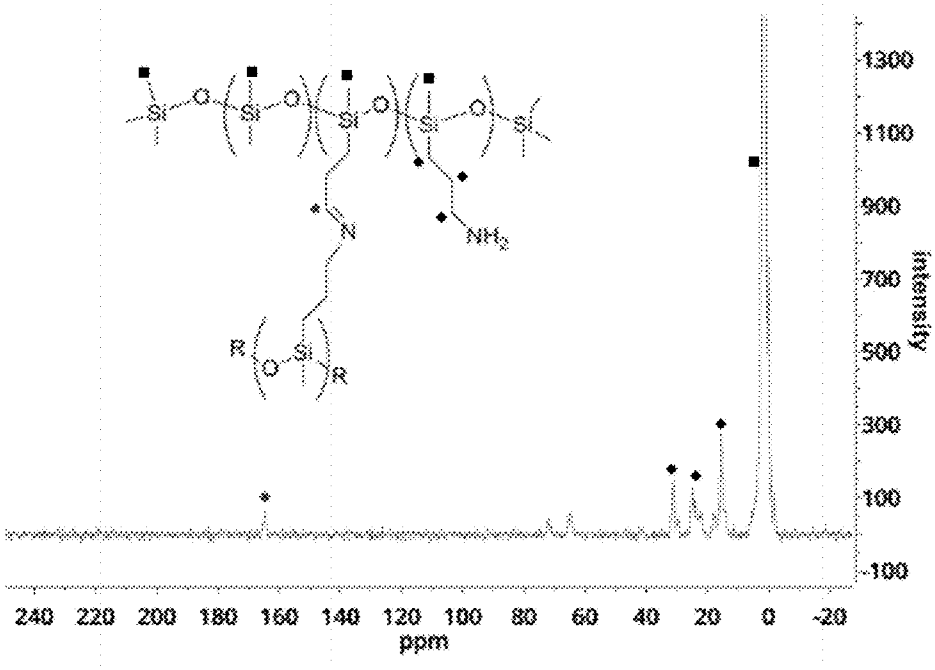
FIG. 6 shows a solid state $^{13}$C cross-polarization/magic angle spinning nuclear magnetic resonance (CP-MAS NMR) spectrum of irradiated P100 after drying under vacuum for one week showing a peak characteristic of imine carbons, 9.4 Tesla, RT.

Infrared (IR) spectroscopy was used to characterize the polymer before and after irradiation (FIG. 5). m-Xylene is not detectable in the IR spectrum after irradiation, and a mass balance analysis of samples shows that less than 5% of the initial m-xylene mass remains after four hours of irradiation (Table 2). The irradiated sample shows a new peak at 1670 $cm^{-1}$ that is attributed to the C═N imine stretch.[48] No other changes in the IR spectrum were observed, indicating no significant side reactions occurred. The cross-linked sample was soaked in DCM overnight to remove the soluble components, rinsed with DCM, and then dried in vacuo. The intensity of the imine peak is increased relative to other peaks after this procedure, demonstrating that the imine peak may be attributed to the insoluble polymer components. The presence of an imine functionality was also probed using solid state $^{13}C$ cross-polarization/magic angle spinning nuclear magnetic resonance (CP-MAS NMR) spectroscopy (FIG. 6). Measurements of a cross-linked sample of P100 showed the presence of a downfield peak centered at 165 ppm that is characteristic of imine C═N $sp^2$ carbon centers.[49]

TABLE 2

Mass balance of samples before and after irradiation for P100 and P25 small scale tests, as well as soluble % and mass swelling % determined using DCM.

| Sample | Initial polymer mass (g) | Initial m-xylene mass (g) | Total mass after irradiation (g) | Soluble Fraction (%) | Swelling (g DCM/g polymer) |
|---|---|---|---|---|---|
| P100 | 0.125 | 0.169 | 0.124 | 6.6 | 2.5 |
| P25 | 0.130 | 0.044 | 0.127 | 4.6 | 2.3 |

Sample P100 was found to solidify (giving a free-standing film) after one hour of irradiation and was used to compare the effect of different cross-linking conditions and additives on the photooxidation reaction (Table 3). A degassed sample with the same composition as P100 was irradiated under $N_2$ gas but did not result in a solid film or color change in the sample, indicating that the cross-linking reaction as well as the bleaching of PtOEP required the presence of $O_2$ (Table 3, entry B). To further investigate the reaction, butylated hydroxytoluene (BHT, a radical scavenger) and 1,4-diazabicyclo[2.2.2]octane (DABCO, a singlet $O_2$ quencher) were added to the system separately in equimolar amounts relative to the amine groups (Table 3, entries C and D).[50] Both additives delayed the onset of solidification (4 hours (BHT) and 3 hours (DABCO) respectively), indicating inhibition of the reaction leading to cross-linking. The sample containing DABCO remained the same bright red color as the initial reaction mixture, indicating that bleaching of PtOEP was also inhibited. Both samples were found to fully dissolve in DCM while crosslinked P100 has a soluble fraction of 6.5% (Table 2). Samples containing as low as 10% of the initial PtOEP loading (P10) resulted in solid films after one hour of irradiation. While not wishing to be limited by theory, the oxygen dependency and inhibition by DABCO support that the cross-linking mechanism is occurring through the photocatalytic generation of $^1O_2$ (Scheme 3). While not wishing to be limited by theory, inhibition by BHT could indicate a radical intermediate in the reaction pathway, or the simultaneous occurrence of a Type II photooxidation reaction that also leads to the formation of imine cross-links.[51]

TABLE 3

Effect of reaction conditions, additives, and blend composition on the photooxidative crosslinking of PDMS-$NH_2$ after 4 hours of 530 nm irradiation.

| Entry | Variable | Result | Color | wt % PtOEP |
|---|---|---|---|---|
| A | P100 | Solid, 1 hr | Pink | 0.020 |
| B | $N_2$ | Liquid | Red | 0.020 |
| C | BHT | Solid, 4 hrs[a] | Yellow | 0.014 |
| D | DABCO | Solid, 3 hrs[a] | Red | 0.014[b] |
| E | triethylamine | Solid, 1 hr | Pink | 0.020 |
| F | P50 | Solid, 1 hr | Pink | 0.014 |
| G | P25 | Solid, 1 hr | Pink | 0.009 |
| H | P10 | Solid, 1 hr | Pink | 0.004 |

[a]Resulting solid rapidly dissolves in DCM.
[b] DMSO required to dissolve DABCO.

Scheme 3
Proposed reaction pathway for the photooxidative crosslinking of alkyl-amine containing PDMS in the presence of oxygen

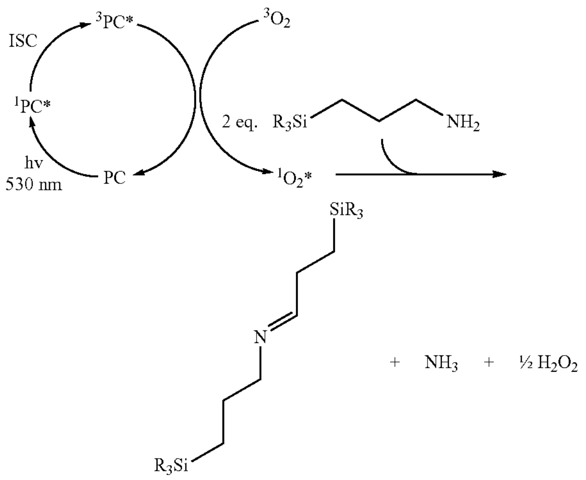

Figure 7:
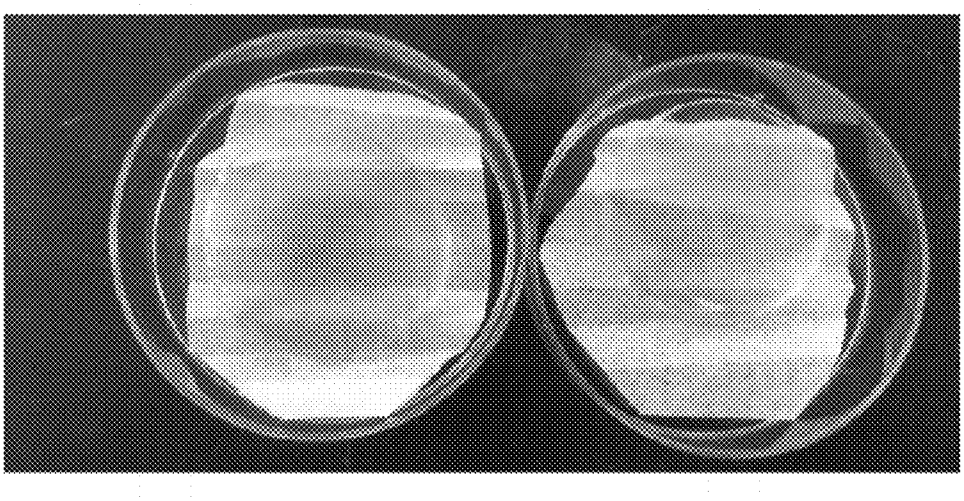
FIG. 7 shows a photograph of crosslinked P100 (left; pale yellow in color photograph) and P25 (right; pale pink in color photograph, material crosslinked similar to P100 but using 25% of the PtOEP stock solution used for P100) prepared for mechanical testing. Sample disks are 30 mm diameter, 1 mm thick.

Larger samples (30 mm diameter, 1 mm thick) were prepared for mechanical testing, irradiating samples for 18 hours using 530 nm light to ensure that the maximum extent of photochemical cross-linking occurs. Despite cross-linking occurring within 1 hour to give freestanding films, a long irradiation time was used for these samples to prevent inhomogeneous cross-linking arising from the photoreaction occurring most rapidly at the surface where the 530 nm light is most intense and the most $O_2$ is present. Samples of P100 were pale yellow while P25 samples were pale pink (FIG. 7; color observable in color photographs). While not wishing to be limited by theory, the color in P100 was attributed to the presence of platinum photodegradation products, which are present in a lower concentration in P25. Strips were cut from these samples and the mechanical properties characterized using a RSA G2 instrument by performing tensile stretching experiments in an axial mode.

P100 and P25 were found to have similar Young's moduli of approximately 2 MPa, while the ultimate (maximum) elongation values of the two samples were 157% and 37% respectively, showing that mechanical results depended strongly on the initial amount of PtOEP solution (Table 4). Mechanical properties for P100 are comparable to photo-curable acrylate PDMS systems as well as commercially available thermally-cured Sylgard™ 184.[5] P100 and P25 were found to have similar soluble fractions of 6.6 and 4.6%, respectively, in DCM and could be swollen to uptake approximately 250% their own mass in solvent (Table 2). The same polymer cross-linked using a stoichiometric condensation reaction had a soluble fraction of 19% at 5 equivalents of cross-linker, suggesting a greater density of crosslinks in the photo-crosslinked system.[46] Experiments with zinc tetraphenylporphyrin substituted for the platinum PtOEP at the same molar equivalents and under the same conditions also showed crosslinking using 395 nm light.

TABLE 4

Mechanical properties of samples measured using DMA tension experiments.

| Sample | Young's Modulus (MPa) | Tensile Strength (MPa) | Ultimate Elongation (%) |
|---|---|---|---|
| P100 | 2.15 ± 0.04 | 0.89 ± 0.06 | 157 ± 2 |
| P25 | 1.93 ± 0.03 | 0.35 ± 0.02 | 37 ± 1 |
| PA | 0.96 ± 0.07 | 0.17 ± 0.03 | 22 ± 1 |
| PB | 1.13 ± 0.01 | 0.17 ± 0.05 | 18 ± 1 |

Figure 8:
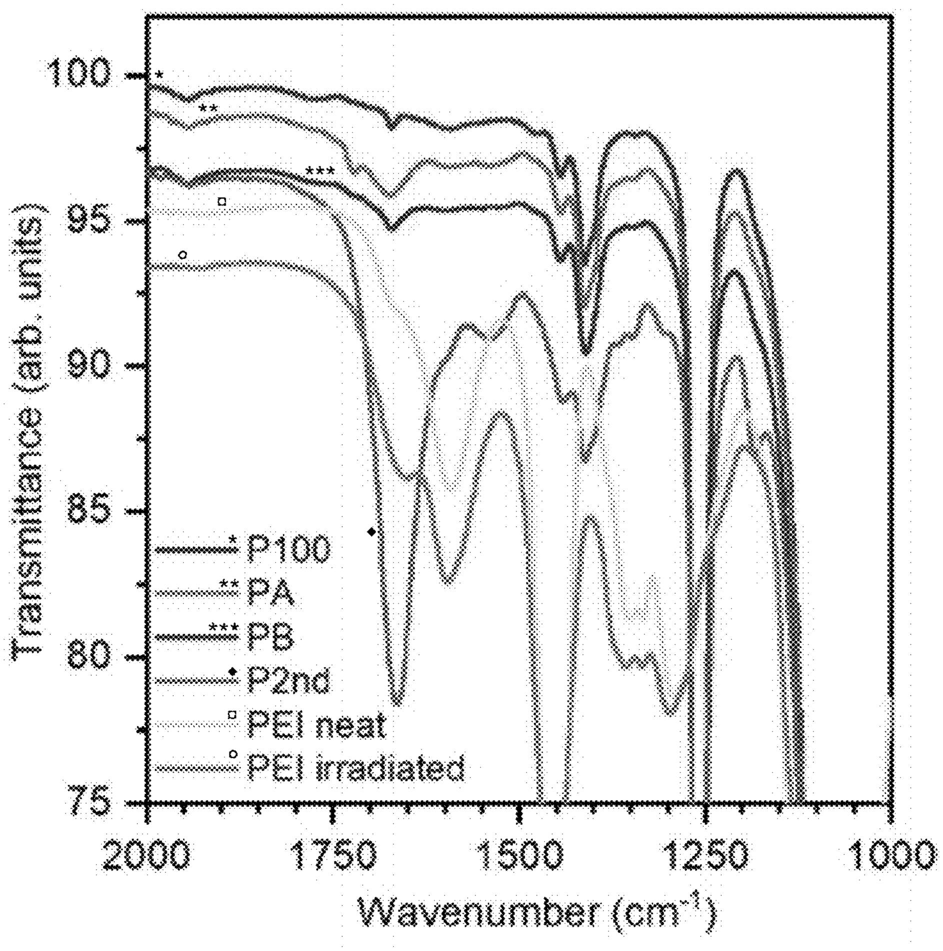
FIG. 8 shows FT-IR spectra of crosslinked P100, PA, which contains 30 wt % amine end-terminated PDMS, PB, which was crosslinked using Rose Bengal, P2nd, which was prepared using 18-24 wt % (aminoethylaminopropyl methylsiloxane) dimethylsiloxane copolymer, polyethyleneimine branched, and polyethyleneimine branched after attempting crosslinking.
Figure 9:
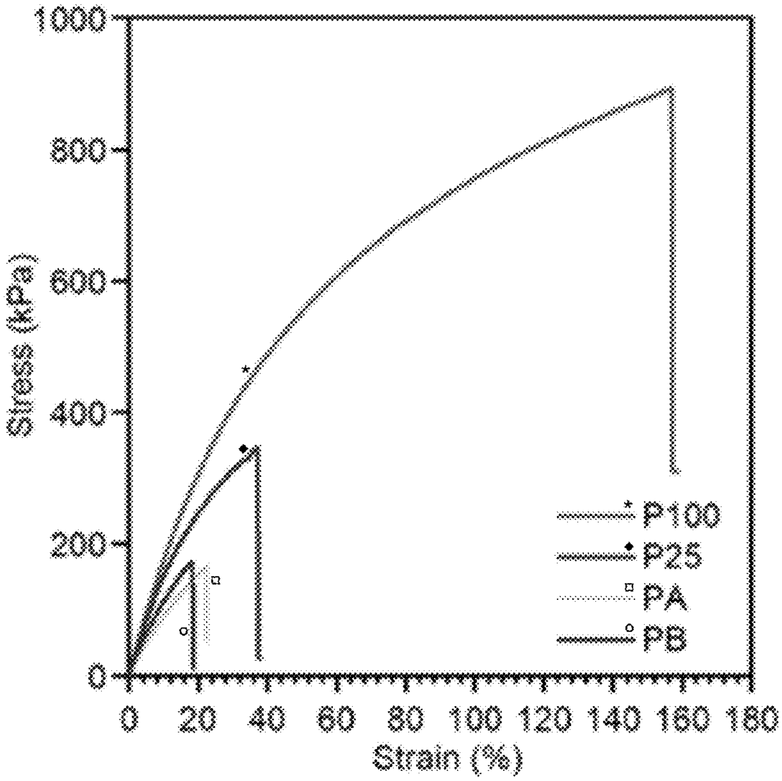
FIG. 9 shows stress-strain curves, stress (kPa) as a function of strain (%) for P100, P25, PA, and PB from axial tensile experiments, RT.

To probe the scope of this photo-cross-linking reaction, different polymers bearing primary, secondary, and tertiary amines were used to prepare additional samples. The (18-24 wt % aminoethylaminopropyl methylsiloxane) dimethylsiloxane copolymer has a secondary amine in the alkyl chain of the primary amine functionality. Under the same conditions as P100, this polymer (P2nd) cross-linked in four hours to give a tacky solid unsuitable for mechanical testing. FT-IR analysis showed a larger imine peak than in the spectrum of P100, supporting the oxidation of the secondary amines to imines as well as primary amines (FIG. 8). Branched polyethyleneimine has both secondary and tertiary amines present. Attempts to photo-cross-link this polymer resulted in a non-cross-linked colorless oil, which, while not wishing to be limited by theory, is also attributed to secondary imine formation and not quenching of $^1O_2$ by the tertiary amines. The addition of 1 molar equivalent of triethylamine, which cannot form imines, to P100 did not inhibit the cross-linking reaction (Table 3, entry E). A sample with 30% by mass of the PDMS-$NH_2$ substituted with aminopropyl end-terminated PDMS (875 g/mol) at the same PtOEP concentration as P100 was prepared using the same procedure (denoted PA). Xylenes can cause acute health issues when ingested or inhaled and is present in our system in significant quantities.[52] As such, Rose Bengal dissolved in 1,2-propanediol and ethanol as an alternative singlet oxygen generation system was used (designated as PB), in which all components are relatively non-toxic.[53] Rose Bengal was added at half the photocatalyst concentration in P100 because of an increased molar extinction coefficient compared with PtOEP. Both PA and PB resulted in solid, pale-to-colorless, samples after irradiation with the same characteristic imine peaks in their IR spectra as in P100 (FIG. 8). Mechanical testing of PA and PB demonstrated a Young's moduli 1.6 and 1.2 MPa respectively, with maximum elongation values of 22 and 18% (FIG. 9). These values are lower than for P100, while not wishing to be limited by theory, suggesting that both samples have fewer imine cross-links than for P100. In PA the end-terminated chains cannot cross-link each other and while not wishing to be limited by theory, for PB the differences may be due to change in photocatalyst concentration or photophysical properties.

Figure 10:
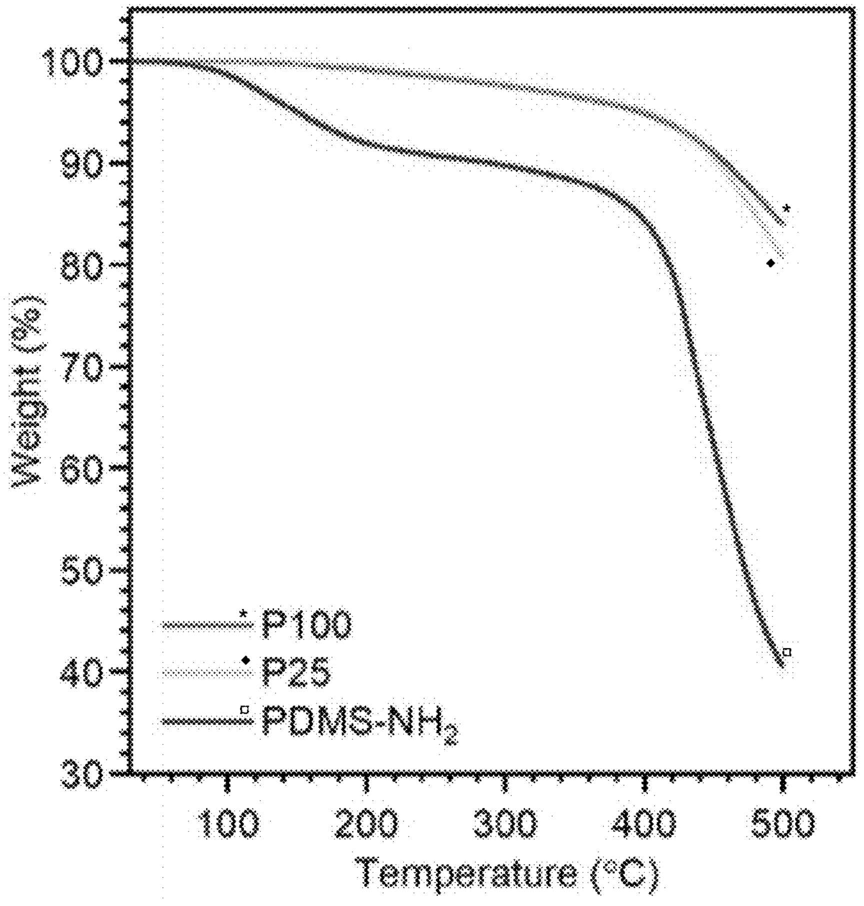
FIG. 10 shows thermogravimetric analysis (TGA), weight (%) as a function of temperature (° C.) of samples crosslinked with different amounts of PtOEP (P100, P25) as well as the non-crosslinked $PDMS-NH_2$ starting polymer. 10° C./minute, $N_2$.
Figure 11:
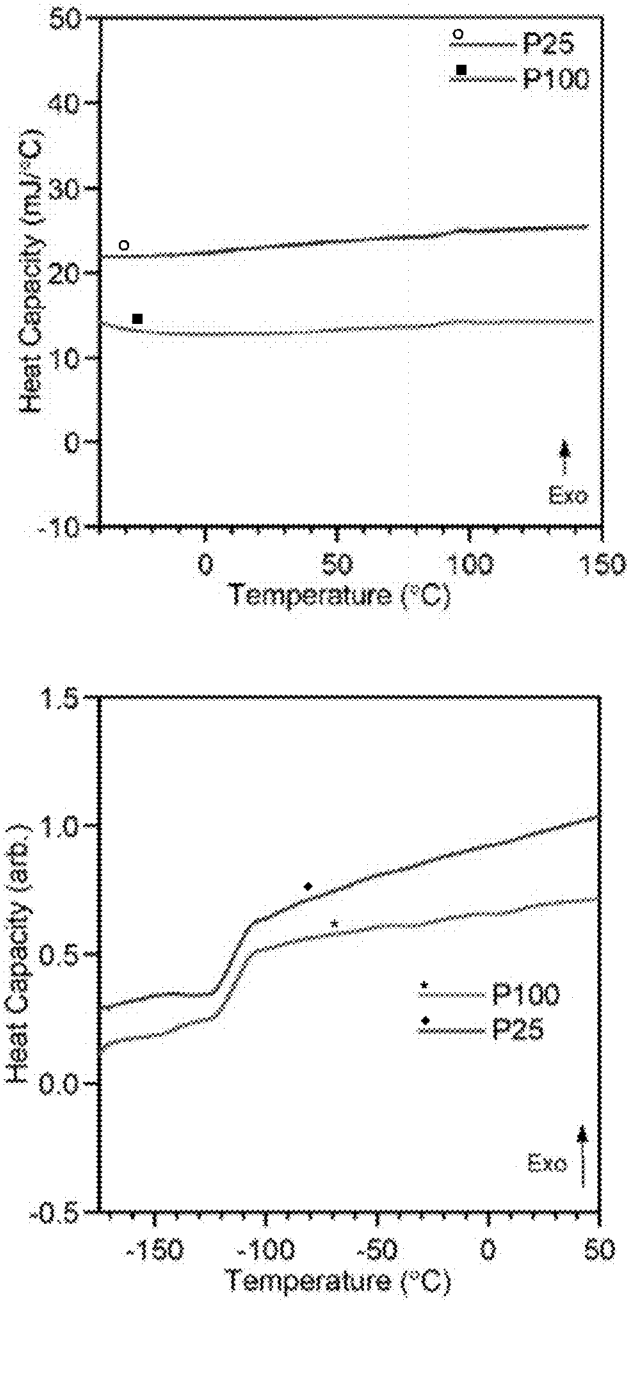
FIG. 11 shows differential scanning calorimetry (DSC) heating traces of P25 and P100, collected at 10° C./minute using a TA Instruments DSC Q2000 instrument with a TA Instruments Refrigerated Cooling System 90 at a ramp rate of 10° C./min (upper); and a Netzsch DSC Polyma at a ramp rate of 10° C./min (lower).

Crosslinked samples, as well as PDMS-$NH_2$, were analyzed for their thermal stability using TGA (FIG. 10). P100 was thermally stable up to 400° C. under $N_2$, with only a 5% mass loss. Heating further to 500° C. resulted in a total mass loss of 16%, with P25 exhibiting very similar behaviour. The non-crosslinked PDMS-$NH_2$ showed much lower thermal stability, with a mass loss of 10% between 100° C. and 200° C., followed by a large mass loss beginning at 400° C. The stability of the cross-linked samples is consistent with TGA results of linear, non-functionalized PDMS under $N_2$ and $O_2$, as well as thiol-ene photo-cross-linked PDMS.[54] The lower stability of PDMS-$NH_2$ is attributed to thermal decomposition of the free amine groups, with all samples undergoing the same thermal decomposition above 400° C.[55] Differential scanning calorimetry was performed on P100 and P25 and showed no significant thermal transitions between −40 and 150° C. (FIG. 11; upper) and a similar $T_g$ for both samples of −114° C., comparable to the value for other cross-linked PDMS samples (FIG. 11; lower).[46] The thermal hydrolytic stability of these materials was tested by exposing P100 to steam for 1 h, after which no changes to the shape, visible color, or vibrational spectrum were observed, indicating good resistance to hydrolysis of the imine bonds.

Figure 12:
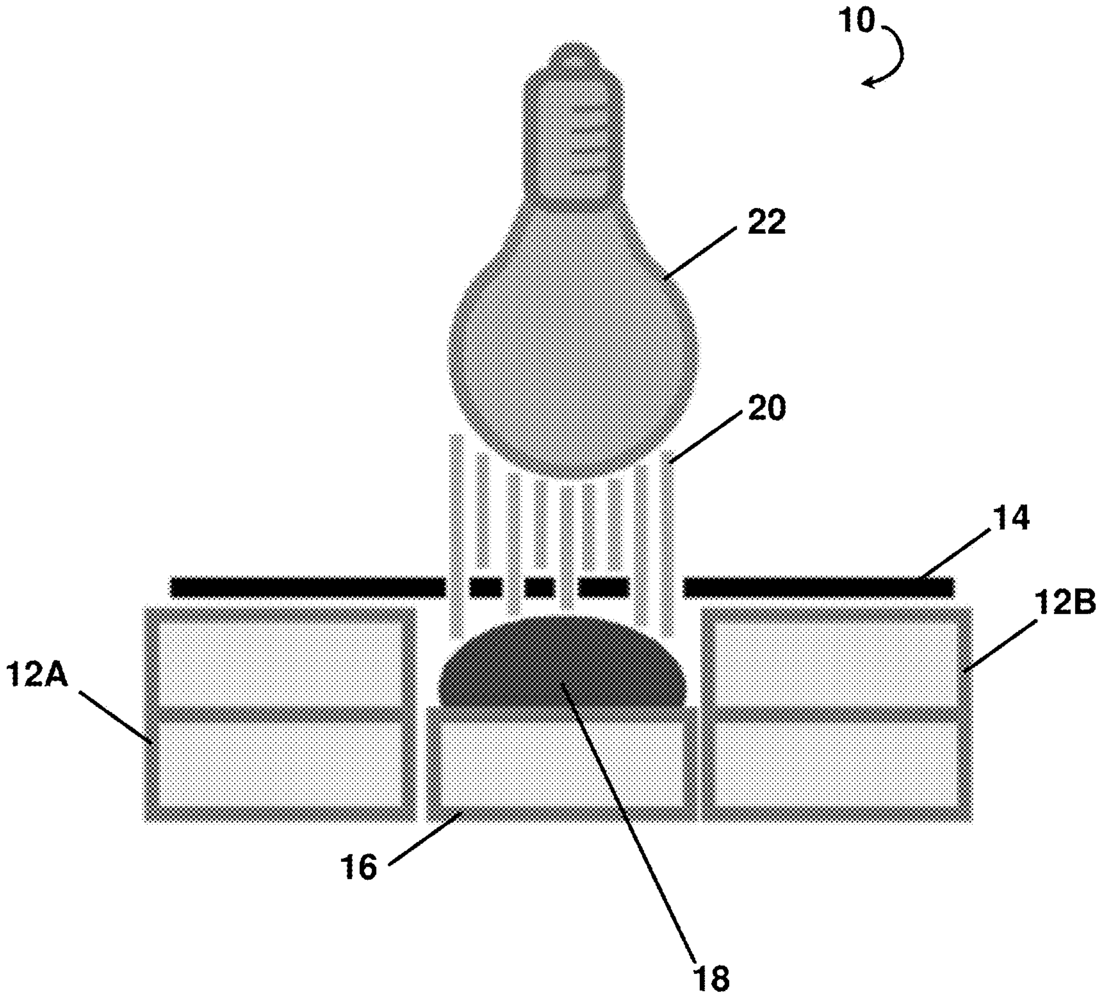
FIG. 12 is a schematic of a photolithographic setup according to an embodiment of the present disclosure.
Figure 13:
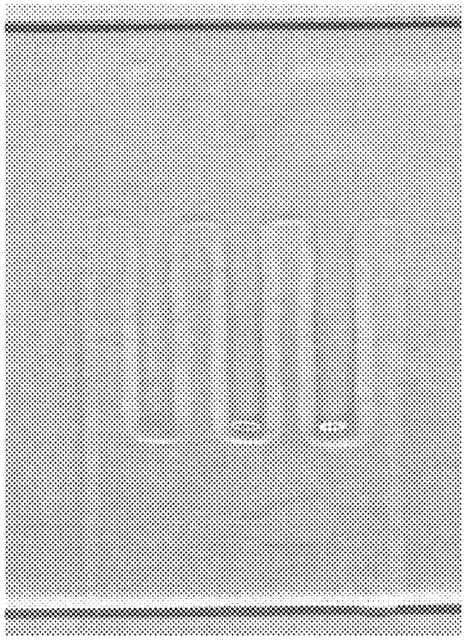
FIG. 13 is a photograph of a photopatterned slide after 1 h of 530 nm bulb irradiation followed by rinsing with ethyl acetate, features are 2 mm wide (upper); and a photograph of 2 mm lines photopatterned in P25 using a mask printed on plastic transparencies (lower).
Figure 13:
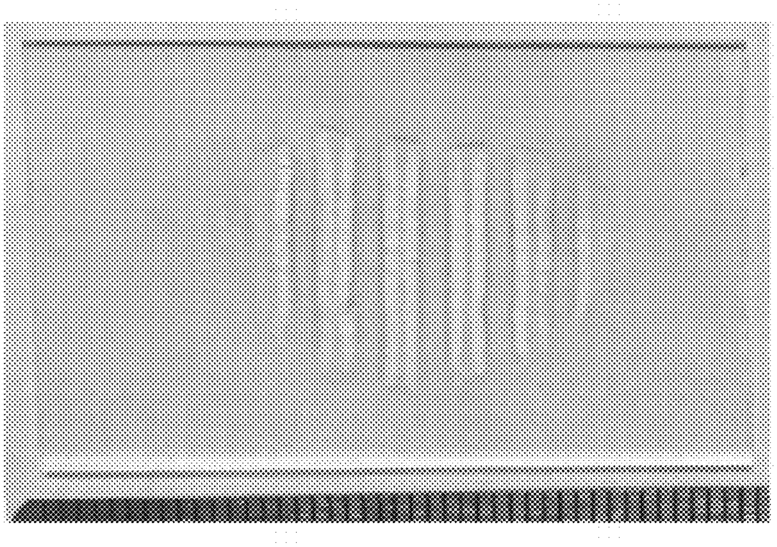

Cross-linking in these samples is controlled using visible light irradiation, and as such photolithography was carried out using an overhead transparency mounted on glass slides as the photomask. FIG. 12 is a schematic showing the photolithographic setup 10 prepared using two stacked glass microscope slides (12A, 12B), a printed overhead transparency sheet 14, and a single glass slide 16 coated in P25 18. P25 was chosen for this demonstration due to the greater viscosity of this sample compared to P100. The material 18 was deposited on the glass slide 16 and irradiated 20 through the mask 14 using a 530 nm LED bulb array 22 for one hour, followed by rinsing with ethyl acetate. After drying in air for 5 minutes, the resulting photopattern could be easily resolved (FIG. 13). Attempts to pattern features below 2 mm resulted in indistinct resolution after rinsing, which we attribute to the spacing between mask and film. These results are similar to other benchtop photolithographic systems using acrylate monomers and printed photomasks and may be applicable for the rapid fabrication of PDMS microchannels using inexpensive equipment.[56]

This Example demonstrates for the first time the cross-linking of functionalized PDMS with visible light under air. This procedure may allow, for example for the simple, visible light cross-linking of polymers such as commercially available polymers using sensitizer such as a platinum porphyrin sensitizer to generate single oxygen, which mediates the formation of imine cross-links. The coupling mechanism was investigated and found to involve both a radical intermediate and $^1O_2$ and requires the presence of $O_2$ (e.g. atmospheric $O_2$). The material was characterized using FT-IR and $^{13}C$ CP-MAS NMR spectroscopy, which showed the formation of imine functional groups without significant side-reactions. Samples were found to be mechanically robust, with Young's Moduli and ultimate elongation comparable to commercially available UV-curable siloxanes. It was also shown that this photo-oxidative cross-linking can be performed using metal-free Rose Bengal along with a benign solvent pair targeted at using green, low toxicity components. Cross-linking using $^1O_2$ is an orthogonal approach that is neither photoinitiated nor radical initiated but photocatalytically driven. The rapid curing of the system can also enable benchtop photolithography (e.g. using printed transparencies), which may be applicable for applications such as the production of photopatterned silicone microfluidic devices. It is expected that the low cost, simplicity, and ease of implementation will make this photooxidative crosslinking advantageous in a wide variety of polymeric fields and applications and may, for example, be a useful alternative for nonradically initiated cross-linking.

Example 2: Solvent-Free Photooxidative Crosslinking of Amine-PDMS

I. Experimental

A. Materials (6-7% aminopropylmethylsiloxane)-dimethylsiloxane copolymer (AMS-163), and (20-25% aminopropylmethylsiloxane)-dimethylsiloxane copolymer (AMS-1203) were purchased from Gelest. Rose Bengal lactone (95%) and Fluorescein (95%) were purchased from Sigma Aldrich. Porphyrins were purchased from Frontier Scientific. All other reagents were purchased from Sigma Aldrich and used without further purification.

B. Instrumentation

Absorption spectra were collected on a Varian Cary 5000 UV-Vis-NIR spectrophotometer.

$^1H$ NMR spectroscopic data was collected on a 400 MHz Bruker Avance 400dir spectrometer at 25° C. Residual proto-solvent peaks were used to reference the $^1H$ NMR spectra.

$^{13}C$ CP-MAS NMR spectra with high power proton decoupling were collected on a 400 MHz Bruker solid state DRX spectrometer using a sample of P1 dried under vacuum for one week. Samples were spun at 4 kHz at the magic angle. Ramped pulse at 50% on $^{13}C$ frequency were used for cross polarization with a contact time of 5 ms for all experiments. The relaxation delay was set to be 5 seconds, and acquisition time 50 ms. Data was processed with a 20 Hz line broadening exponential decay function. Chemical shift values (ppm) were referenced with adamantane $^{13}CH_2$ signal at 29.5 ppm. All experiments were done at room temperature.

Infrared spectra were collected on a PerkinElmer Frontier FT-IR with a diamond ATR plate.

Thermogravimetric analysis was performed on a Netzch TG209 Libra using an $Al_2O_3$ crucible at a temperature ramp of 10° C./min under a $N_2$ purge flow of 30 mL/min.

DSC measurements were performed using a TA Instruments DSC Q2000 instrument with a TA Instruments Refrigerated Cooling System 90 at a ramp rate of 10° C./min and a Netzsch Polyma 214 instrument with LN2 attachment at a ramp rate of 10° C./min.

Direct write printing was performed on a printer assembled from a Fab@Home V1 from Cornell University, translating in the x, y, and z directions at 25 μm resolution. Material was loaded into a syringe barrel and extruded through a metal nozzle using 35 psi nitrogen pressure.[57]

Mechanical testing was carried out on a Dynamic Mechanical Analyser (DMA, RSA G2 TA Instruments) in axial mode. Samples were cut into strips with dimensions 4 mm×3 mm×1 mm. Sample strips were extended/elongated until breakage at room temperature by applying a constant linear strain rate of 0.1 mm/min. The linear elongational strain was calculated by:

$$\epsilon = \frac{L - L_0}{L_0} \times 100$$

Where $L_0$ is the initial length of the sample (t=0) and L is the length of the sample at time t. The Young's modulus was determined from the equation $\sigma = E_\epsilon$ ($\sigma$ is the tensile stress) which is valid only for the initial elastic response of the material. The tensile strength represents the maximum stress in the stress-strain curve and the ultimate elongation, $\varepsilon_u$ shows how much the material can elongate before fracture/failure. The latter was calculated by using the following equation:

$$\varepsilon_u = \frac{L_f - L_0}{L_0} \times 100$$

where $L_f$ is the final length of the sample before failure.

Photorheology experiments were performed on a TA Instruments Discovery HR-2 using an 8 mm plate and UV curing stage equipped with 365 nm LEDs. All samples were measured at 2% strain, 10 rad/s, using a 500 μm gap, and irradiating after a 60 s dwell time. A standard sample was prepared by first dissolving OEP in toluene at a concentration of 1 mg/mL, and then combining this in a 1:1 mass ratio with PDMS-$NH_2$ using a vortexer to give a final [OEP] of 1.0 mM.

C. Preliminary Cytotoxicity Testing

Cells were purchased from ATCC and incubated in Eagle Minimum Essential Medium in Falcon BD T-25 vented flasks. Cell viability experiments were performed using 96-well flat bottom plates (Becton Dickinson). Cell monolayers were re-suspended in a fresh culture medium at an approximate density of $1\times10^5$ cells/mL. A 100 μL sample was added to each well plate. All polymer samples were autoclaved before use and prepared in triplicate. P1 was added to three wells and irradiated overnight for 18 hours using 530 nm LEDs. Poly(dimethylsiloxane) (50,000 g/mol) and 6 μm α-Amanitin (100 uL) were added to separate wells and then cells were loaded. The well plate was allowed to incubate for 72 hours. Wells were then imaged using a Olympus DP80 Camera.

D. Mammalian Cell Testing

Cells were purchased from ATCC and incubated in Eagle Minimum Essential Medium in Falcon BD T-25 vented flasks. Cell viability experiments were performed using 96-well flat bottom plates (Becton Dickinson). Cell monolayers were re-suspended in a fresh culture medium at an approximate density of $1\times10^5$ cells/mL. A 100 μL sample was added to each well plate. All polymer samples were autoclaved before use and prepared in triplicate. P3 was added to three wells and irradiated overnight for 18 hours using 530 nm LEDs. Poly(dimethylsiloxane) (50,000 g/mol) and 6 μm α-Amanitin (100 μL) were added to separate wells and then cells were loaded. The well plate was allowed to incubate for 72 hours. Wells were then imaged using an Olympus IX70 microscope with an Olympus DP80 Camera.

E. Bacterial Cell Testing

Methicillin resistant *Staphylococcus aureus* strain (MRSA; UBC Chemistry Department Collection #1057) and *Escherichia coli* (UBC Chemistry Department Collection #1105) were grown overnight at 37° C., 225 rpm in sterile Mueller-Hinton broth. The bacterial concentration in the broth was determined by absorbance at 600 nm by a Cary 100 spectrophotometer. The cultures were diluted in sterile distilled water to obtain a concentration of $10^5$ bacteria/mL and aliquots of bacterial suspension (10 ml) were transferred to sterile 50 ml Falcon tubes each containing 168 mg of tested material. After overnight incubation at 37° C., 225 rpm, the suspensions were diluted 10-fold and (20 μL per plate for *E. coli* and 10 μL per plate for MRSA) plated onto Mueller-Hinton agar plates. The plates were incubated at 37° C. overnight. The number of visible colonies on each plate was calculated to obtain the corresponding concentration of living bacteria. Each experiment was performed in triplicate, and the reported results were averaged values.

D. Sample Preparation

PDMS-F: Fluorescein (0.02 g, 0.06 mmol), PDMS-$NH_2$ (0.3 g, 0.006 mmol) and 1.5 ethanol (EtOH) were added to a round bottom flask and equipped with a condenser and magnetic stir bar. The system was stirred at 80° C. for four hours and then allowed to cool to room temperature. Ethanol was distilled using a rotary evaporator (rotavap), and then the product dried under high vacuum overnight.

Sample P1: A stock solution of Rose Bengal (RB) in EtOH was prepared by dissolving 2.0 mg RB in 6.3 mL EtOH ($3.2\times10^{-4}$ M). 1.0 g of PDMS-$NH_2$ was combined with 1.0 mL of stock solution in a round bottom flask and equipped with a condenser and magnetic stir bar. The system was stirred at 80° C. for 18 hours under $N_2$ and then allowed to cool to room temperature. EtOH was distilled using a rotary evaporator, and then the product dried under high vacuum overnight.

Sample P2, P3: Samples were prepared in the same manner as P1 but altering the concentration of the RB stock solution ($6.5\times10^{-4}$ M and $9.8\times10^{-4}$ M for P2 and P3 respectively). 1.0 g of PDMS-$NH_2$ was combined with 1.0 mL of the stock solutions and the reaction carried out as described above for P1.

Cross-linking: The polymer oils (P1, P2, and P3) were pipetted into commercially available 3 cm diameter circular silicone molds. The molds were irradiated using a Westinghouse 15 W green LED flood lamp (100 W equivalent) at a distance of 10 cm on the benchtop open to the air. Samples prepared for mechanical testing were irradiated continuously for 18 hours. During irradiation samples were not noticeably warm to the touch at any point.

P1-Soln: Rose Bengal was dissolved in an equal mass solution of ethanol and 1,2-propanediol to give a final concentration of $2.08\times10^{-3}$ M. For 1.0 g of PDMS-$NH_2$, 157 μL of RB solution was added to the polymer in a vial, mixed using a vortex mixer, and irradiation carried out using the same procedure as for other samples.

Sample crosslinked using PtOEP: A fresh PtOEP stock solution was prepared by dissolving platinum (II) octaethylporphyrin in m-xylene to give a concentration of $4.12\times10^{-4}$ M. For 1.0 g of PDMS-$NH_2$, 1.58 mL of PtOEP solution was added to the polymer in a vial and mixed using a vortex mixer. The resulting solution was transferred to a mold and irradiation carried out using the same procedure as for other samples.

E. Photolithography

For photolithography, 100-200 μL of P1 solution was pipetted onto a glass slide and allowed to spread into a thin layer. Two glass slides on either side were used to support a printed transparency sheet that was patterned with the desired mask. Irradiation was carried out using the same setup as for thick samples. After one hour of irradiation the sample was rinsed by gentle irrigation with ethyl acetate using a pipette and then allowed to air dry. Photobleaching was performed by irradiating the sample using 530 nm light overnight in the same setup as for bulk cross-linking.

F. Cryo- (−78° C.) Deposition

Figure 14:
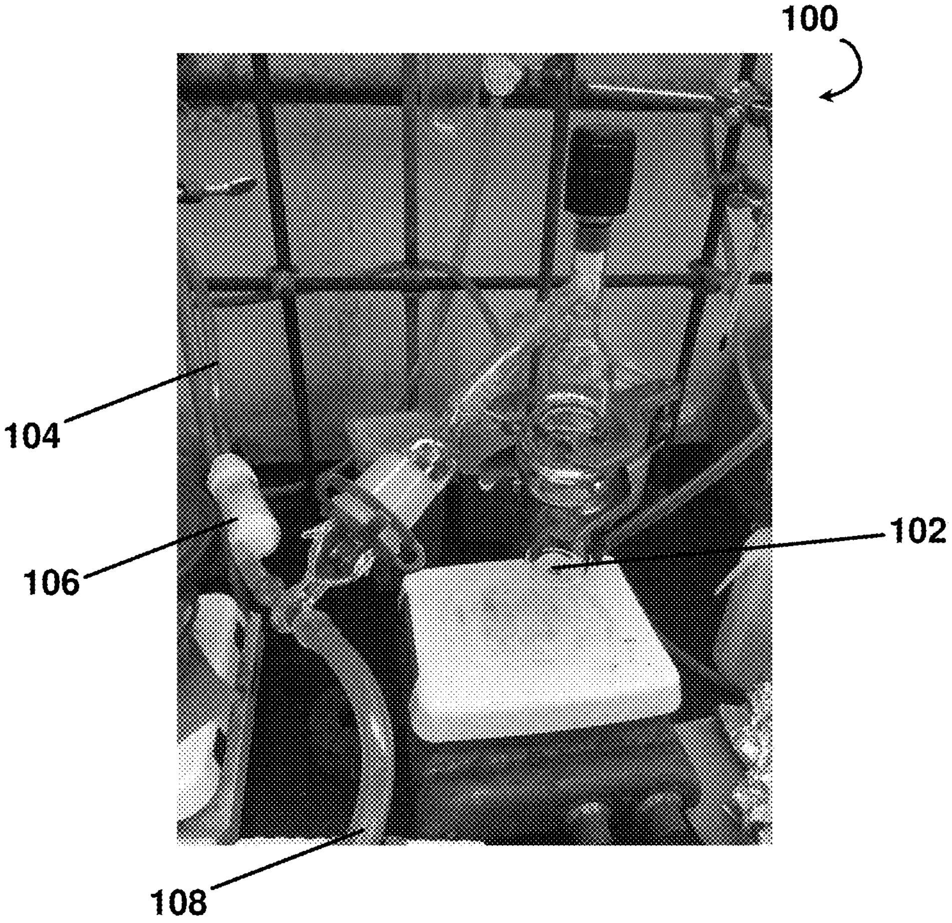
FIG. 14 is a photograph of the experimental setup used to cryo-deposit non-equilibrium 3D structures at −78° C. Vessel was immersed in a dry ice acetone bath before deposition. Setup is designed to exclude water while still providing oxygen.

FIG. 14 shows a photograph of the experimental setup 100 used to cryo-deposit non-equilibrium 3D structures of P1 at −78° C. Referring to FIG. 14, a Schlenk drying tube 102 was equipped with a compressed air line 104, passing the air intake through a drying tube 106 packed with Drierite™, and a bubbler (not shown; outlet to bubbler indicated by reference number 108) for the air outtake. This setup excludes moisture while providing a constant supply of $O_2$. The assembled apparatus was lowered into a bath of dry ice and acetone until the bottom was covered and then allowed to cool for 10 minutes. The top was removed and non-crosslinked P1 pipetted into the desired shape in Schlenk drying tube 102. The system was closed, and a 530 nm lamp bulb was used to illuminate the sample. The system was allowed to warm to room temperature over 18 hours under constant irradiation. The drying tube was then opened, and the resulting shape removed using tweezers as a single, free-standing object.

II. Results and Discussion

In Example 1 the crosslinking of primary-amine containing polydimethylsiloxane (PDMS) using photogenerated singlet oxygen was described (see also: Scheme 4). In Example 1, singlet oxygen was used to crosslink primary amine functionalities through oxidative imine bond formation, utilizing dilute metalloporphyrin or xanthene dye solutions.

Scheme 4

Scheme showing the singlet oxygen cross-linking of amine containing polymers resulting in imine cross-links and free amines. $^1O_2$ was generated from atmospheric oxygen quenching the excited triplet state of the photosensitizer.

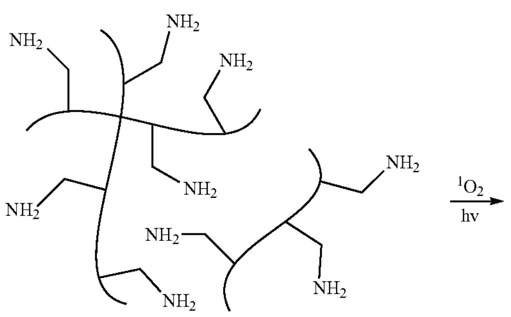

-continued

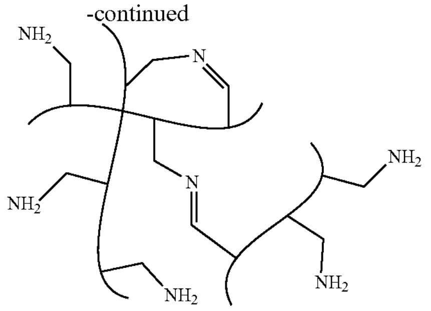

In the present Example, the one-step preparation of a solvent/monomer free liquid siloxane polymer from non-toxic components that can self-generate singlet oxygen ($^1O_2$) on irradiation to convert primary amine groups into imine cross-links is described. For example, the solid Rose Bengal photocatalyst was reacted with a polymer to result in a liquid polymer capable of self-catalyzing its own cross-linking reaction. This cross-linked the liquid polymer into a hydrophobic and elastomeric material possessing antimicrobial primary amines and imines capable of inducing cell-lysis on microbial species. In this procedure, amines serve a dual-purpose as both cross-linking sites and bioactive functionalities. The single-component nature of the material may, for example, eliminate the need for post-preparation rinsing as no water-soluble monomers or toxic initiators are used in the preparation. It was shown that the mechanical properties of the resulting material are improved by the solvent-free procedure, and this allows for example, for the production of non-equilibrium shapes, photolithography, and/or direct-write printing onto glass surfaces. For example, the preparation of non-equilibrium 3D shapes may be carried out due, for example, to the low polymer viscosity before crosslinking. By eliminating the need for toxic solvents the cytotoxicity of the cross-linked material was tested and a potential self-sterilizing effect via cationic alkyl-ammonium cell lysis was shown. The cross-linked material shows antimicrobial properties against *E. coli* (Gram Negative) and MRSA (Gram Positive), as well as CHO-K1 mammalian cells, demonstrating the preparation of a mechanically robust, hydrophobic, broad-spectrum antimicrobial polymer.

Figure 15:
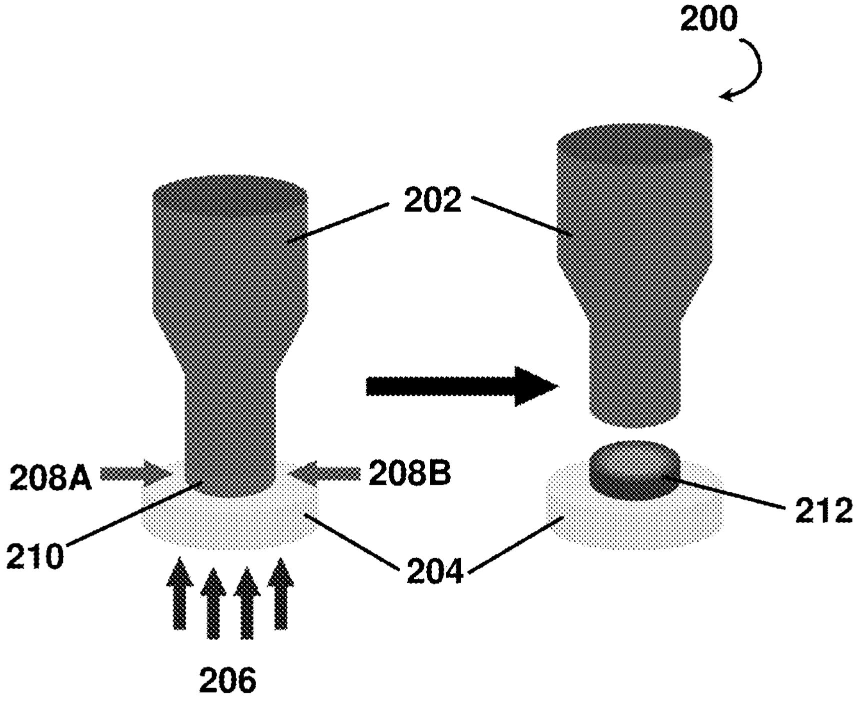
FIG. 15 is a schematic of a parallel plate photo-rheology setup according to an embodiment of the present disclosure.
Figure 16:
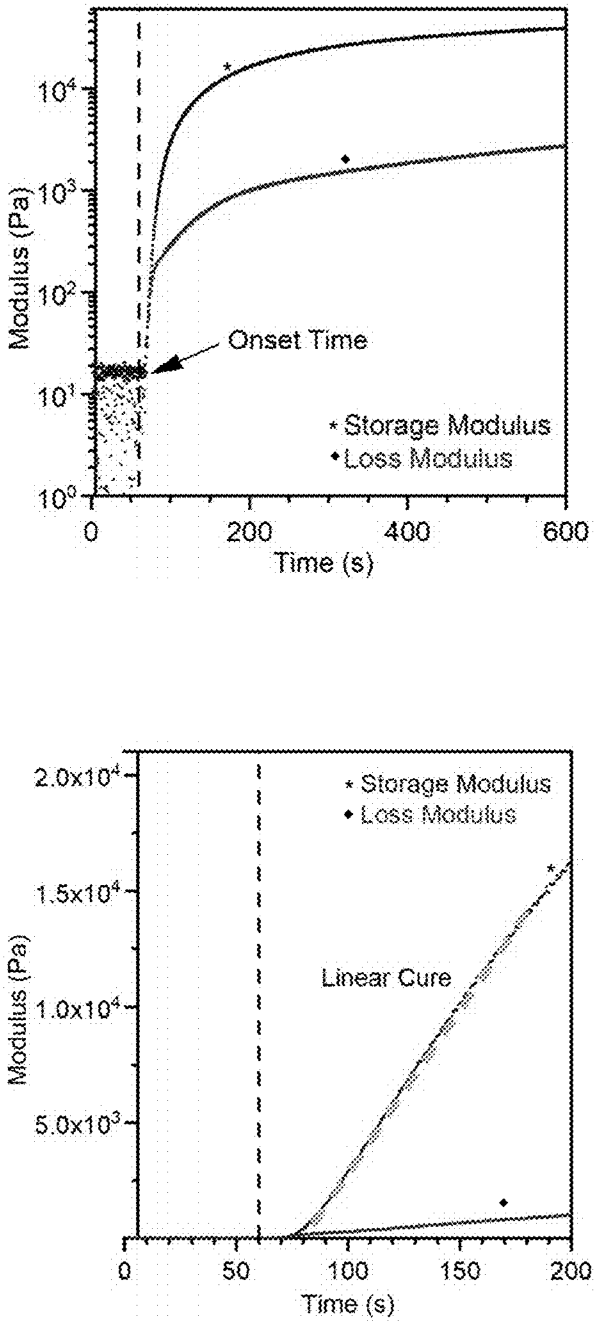
FIG. 16 shows representative photo-rheology results of $PDMS-NH_2$ and octaethylporphyrin (OEP) plotted logarithmically (upper plot) and linearly (lower plot).
Figure 17:
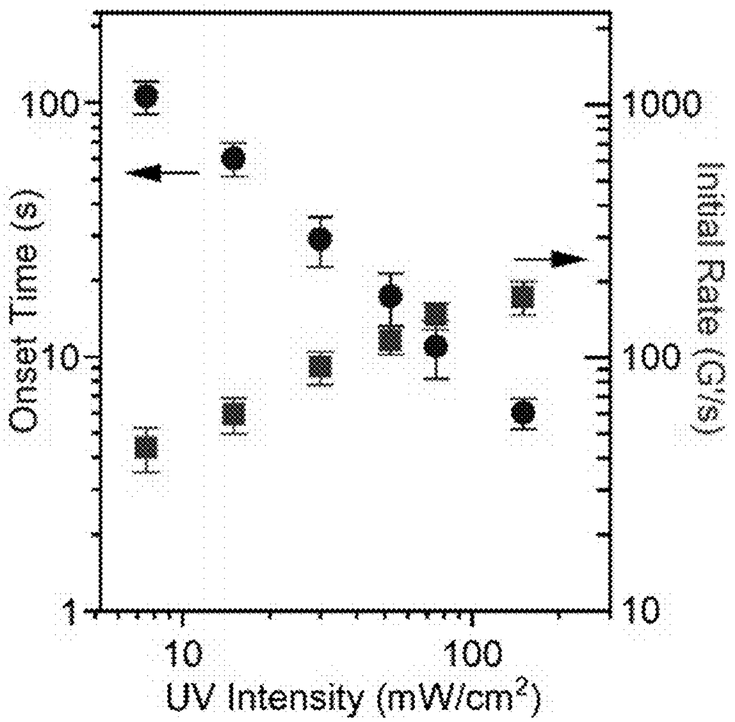
FIG. 17 shows the onset time (●) and initial cross-linking rate (■) measured using different intensities of irradiation for the cross-linking of $PDMS-NH_2$ and OEP using 365 nm light.

Photorheology was used to study the cross-linking kinetics of this system under different compositional conditions. (6-7 wt % aminopropylmethylsiloxane)-dimethylsiloxane copolymer (PDMS-$NH_2$) was combined with octaethylporphyrin (OEP), a porphyrin that can generate $^1O_2$ under irradiation wavelengths compatible with the instrumentation used herein (Scheme 5). A limitation of the parallel plate geometry for studying dynamic cross-linking in this system is the small surface area over which $O_2$ can diffuse into the material (FIG. 15). Samples irradiated without the top geometry cross-link evenly. Referring to FIG. 15, a schematic of the parallel plate photo-rheology setup 200 using a top 8 mm plate 202 and a bottom transparent acetate plate 204 is shown therein. 365 nm light 206 irradiates the sample from below, and atmospheric $O_2$ (208A, 208B) diffuses into the sample through the exposed edge. The sample is initially a liquid 210 and becomes solid after irradiation (e.g. after a time of 10 minutes) only near the polymer-air interface 212 due to limited $O_2$ diffusion. As such the polymer does not fully cure when inside the rheometer geometry and only the initial linear rate of change in moduli and onset time (G'>>G") can be determined (FIG. 16). Before cross-linking the material lacks any internal microstructure and as such the values of G' and G" are below the sensitivity of the instrumentation used. Upon irradiation with 365 nm light (vertical dotted line at 60 s, 150 mW/cm$^2$) G' rapidly increases above G" (onset time). The onset time is determined from the logarithmic plot (arrow in upper plot in FIG. 16), and the initial cure rate is determined from the slope of G' in the first 100 s of irradiation. The initial cure rate and onset time were found to depend on light intensity, with a minimum gelation time of seven seconds at 150 mW/cm$^2$ (FIG. 17).

Scheme 5

Scheme showing the structures of PDMS-$NH_2$ and OEP used in these experiments, resulting in imine cross-links after irradiation in the presence of $O_2$.

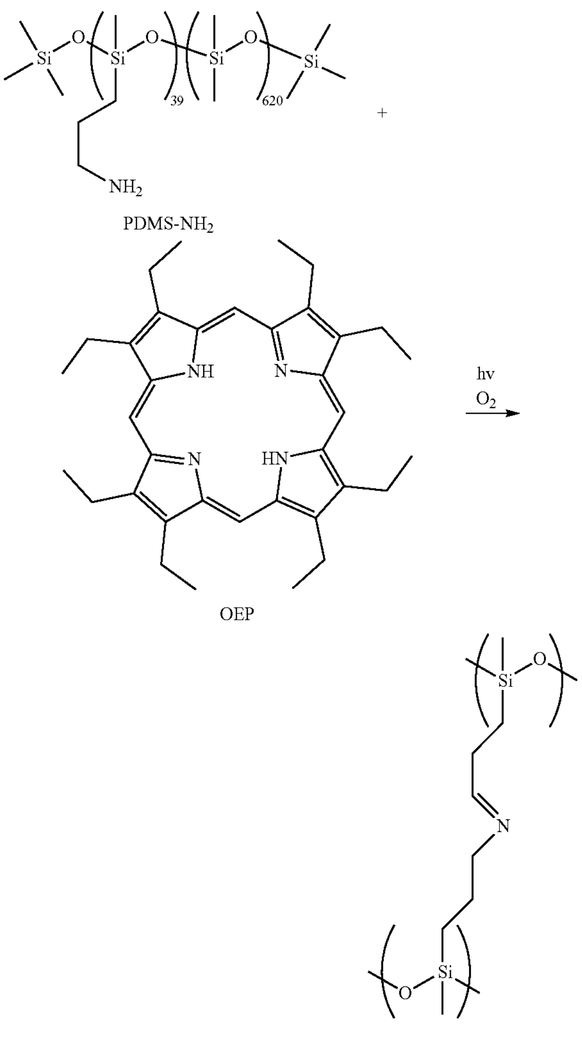

PDMS-$NH_2$

OEP

Figure 18:
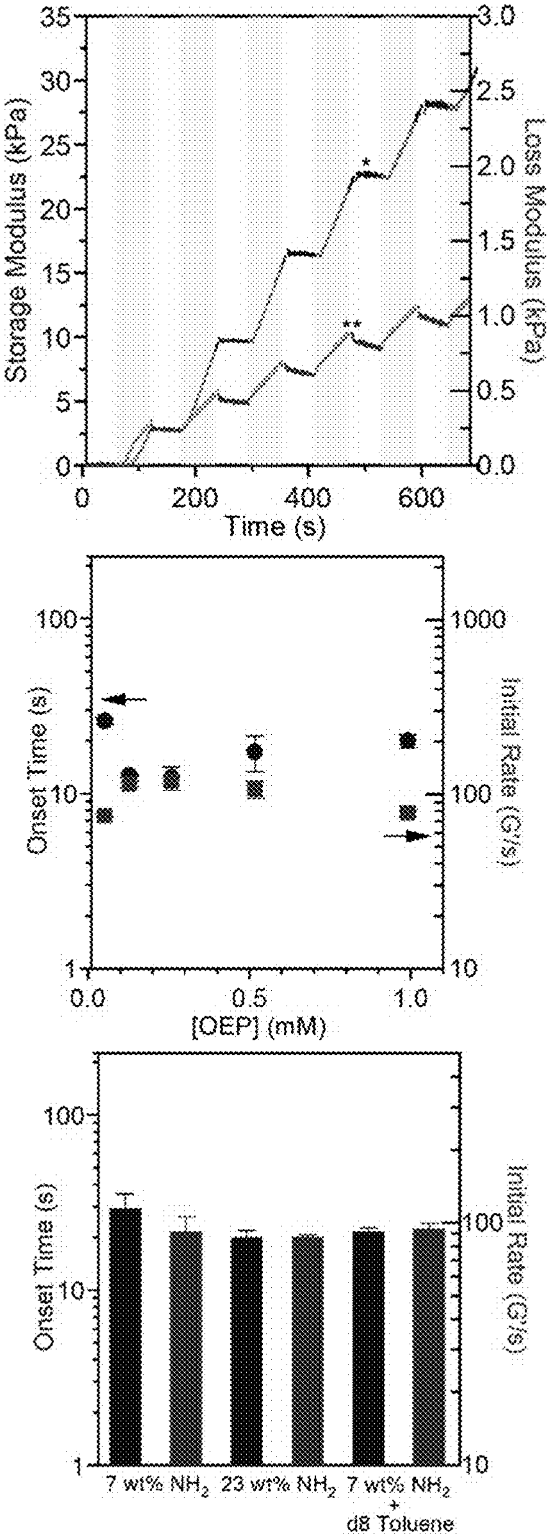
FIG. 18 shows the effect of cycling irradiation on (light grey areas, 30 mW/cm$^2$) and off (white areas) on G' and G" during a single experiment; storage modulus (*) and loss modulus (**) for the cross-linking of $PDMS-NH_2$ and OEP using 365 nm light (upper); cross-linking kinetics measured using different concentrations of the porphyrin OEP at 52.5 mW/cm$^2$ light intensity; onset time (●) and initial cross-linking rate (■) for the cross-linking of $PDMS-NH_2$ and OEP using 365 nm light (middle); and higher amine wt % polymer and deuterated toluene-$d_8$ at 30 mW/cm$^2$ light intensity; onset time (first, third and fifth columns from left) and initial cross-linking rate (second, fourth and sixth columns from left) for the cross-linking of $PDMS-NH_2$ and OEP using 365 nm light (lower).

Cycling the UV irradiation on and off during the cure resulted in no increase in G' during dark periods, consistent with the reaction not being photoinitiated but requiring constant irradiation (FIG. 18; upper plot). The concentration of OEP resulted in only minor changes to the cure kinetics, with slower curing at the high and low concentrations tested (FIG. 18; middle plot). The % transmittance (% T) at 365 nm was calculated for these samples (Table 5). The % $T_{365\ nm}$ was calculated using a sample thickness of 500 μm, $\varepsilon_{365\ nm}$=82000 $cm^{-1}M^{-1}$ and the equations A=ε b c, A=−log (T) and $T=10^{-(\varepsilon b\ c)}$.[58] The % T at 1.0 μM and 0.05 μM was 0.009 and 62.7% respectively, while not wishing to be limited by theory, suggesting that at high [OEP] the cure rate is slowed due to poor light penetration while at low concentrations there is excess light and insufficient $^1O_2$ generation occurring. Substituting a polymer with a higher amine wt % resulted in only small increases to cure speeds (FIG. 18; lower plot). Deuterated solvents have $^1O_2$ lifetimes more than ten-fold greater than their non-deuterated counterparts.[59] The use of toluene-$d_8$ did not significantly affect the curing kinetics in this system, while not wishing to be limited by theory, suggesting that the diffusion of $^1O_2$ is not a rate-limiting step (FIG. 18; lower plot). These results demonstrate that excitation of the dye is the major limiting kinetic factor under these conditions. To maximize cure rates, a material was developed that could cure using safer green light as opposed to high intensity benchtop UV irradiation that is free from soluble initiators or monomers.

TABLE 5

Photorheology kinetic data for the cross-linking of $PDMS-NH_2$ and OEP at different [OEP].

| [OEP] (mM) | Onset Time (s) | Initial Rate (G'/s) | % $T_{365nm}$ |
|---|---|---|---|
| 1.0 | 17 ± 4 | 106 ± 11 | 0.009 |
| 0.5 | 12 ± 2 | 121 ± 5 | 0.94 |
| 0.25 | 13 ± 1 | 114 ± 4 | 9.7 |
| 0.1 | 26 ± 1 | 76 ± 2 | 39.4 |
| 0.05 | 20 ± 2 | 78 ± 3 | 62.7 |

(6-7 wt % aminopropylmethylsiloxane)-dimethylsiloxane copolymer ($PDMS-NH_2$) was thermally reacted with xanthene dyes in the same manner to prepare solvent-free liquid silicones capable of generating $^1O_2$ on irradiation. Structures will be represented herein by the non-cyclized free acid tautomer owing to the strong color of all prepared samples.

Figure 19:
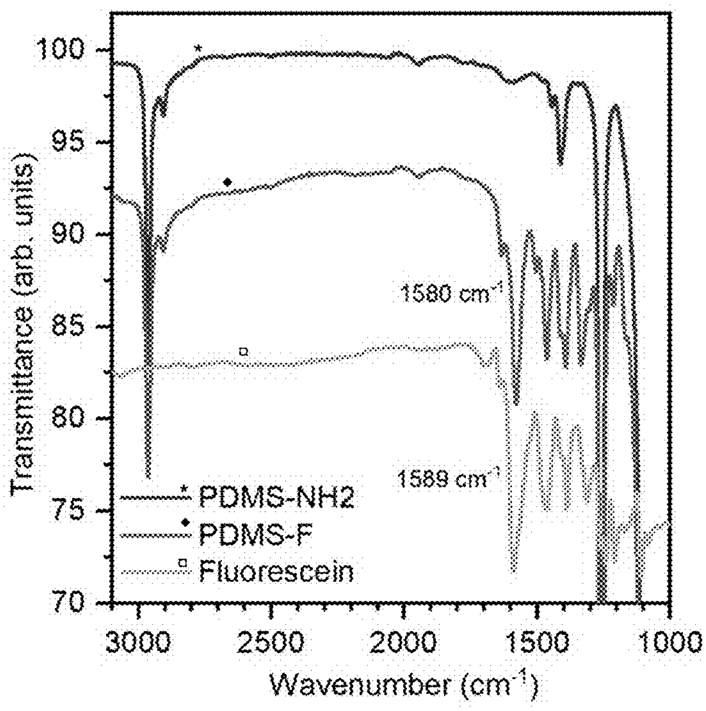
FIG. 19 shows vibrational spectra of $PDMS-NH_2$, fluorescein labelled PDMS (PDMS-F), and fluorescein.
Figure 20:
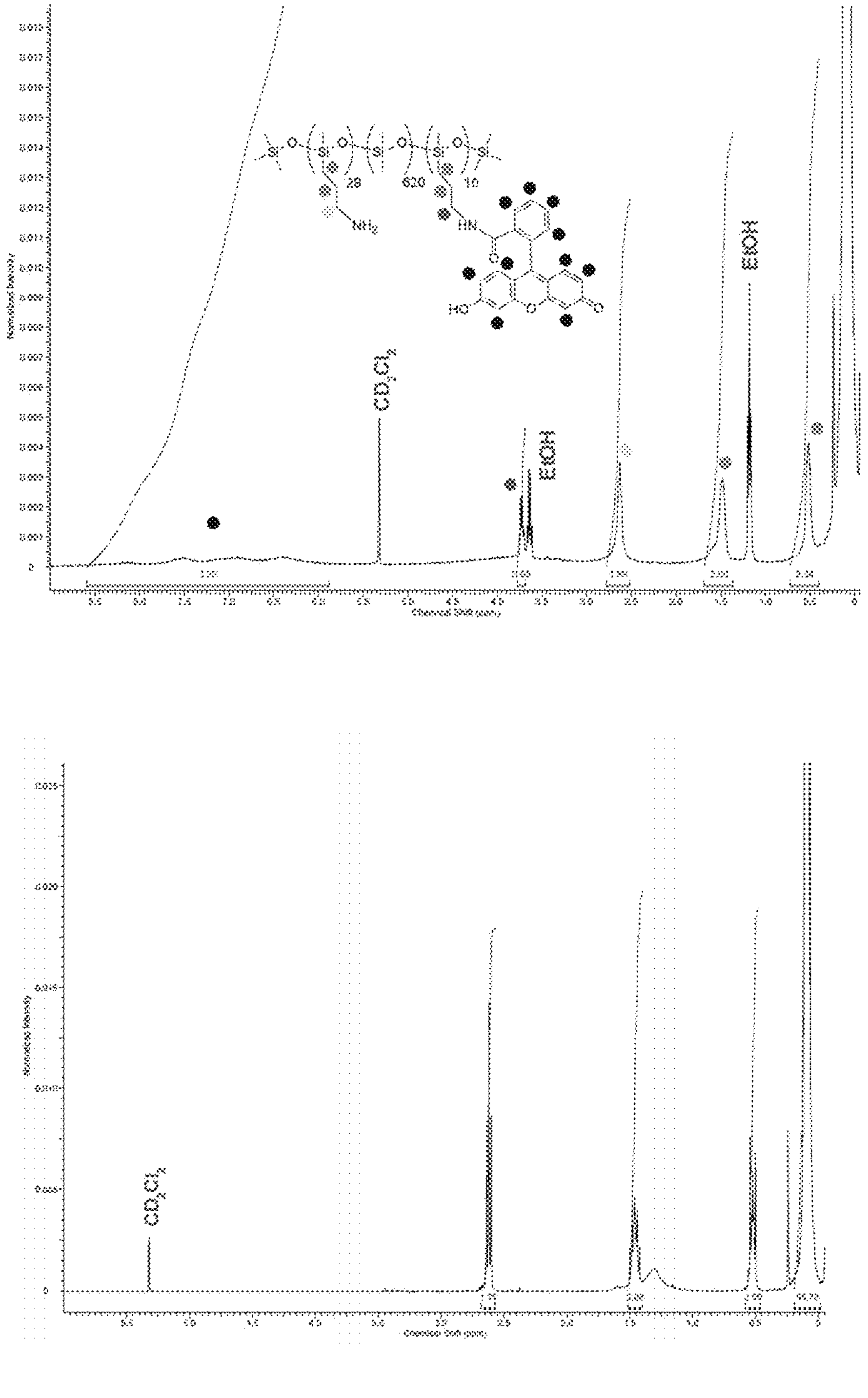
FIG. 20 shows a $^1$H NMR spectrum of PDMS-F in $CD_2Cl_2$, RT, 400 MHz (upper); and a $^1$H NMR spectrum of $PDMS-NH_2$ in $CD_2Cl_2$, RT, 400 MHz (lower).

Fluorescein was used to examine this reaction (Scheme 6), heating 10 molar equivalents of dye to reflux with $PDMS-NH_2$ for four hours in ethanol to produce a clear red oil, free from precipitate, after drying under vacuum (PDMS-F). Vigorous mixing of fluorescein with $PDMS-NH_2$ does not produce a homogeneous mixture. The solubility of this material in organic solvents was greatly reduced compared to $PDMS-NH_2$, consistent with self-association of pendant aromatic groups.[60] The FT-IR spectrum of PDMS-F shows a decrease in carbonyl stretching frequency from 1589 $cm^{-1}$ to 1580 $cm^{-1}$, consistent with the change from carboxylic acid to amide functionality in xanthene molecules (FIG. 19).[61] Accordingly, the shift in carbonyl peak is attributed to conversion from ester to amide. $^1H$ NMR spectroscopy shows a new quartet at 3.72 ppm that is attributed to the $CH_2$ alpha to the amide functionality (FIG. 20; upper). Integration values suggest that the remaining amide-alkyl peaks overlap with the unreacted alkyl-amine signals. Broadness is attributed to the poor solubility of the polymer in $CD_2Cl_2$, which was determined to be the best NMR solvent for this sample. The low concentration of dye relative to polymer and poor solubility hindered further NMR analysis, with adding additional fluorescein to the polymer resulting in a completely insoluble material. $^1H$ NMR (peaks also present in $PDMS-NH_2$ have been omitted for clarity) (400 MHz, $CD_2Cl_2$, RT): δ 7.0 (m, 10H), 3.73 (q, 6.8 Hz, 2H). A $^1H$ NMR spectrum of $PDMS-NH_2$ is provided for comparison (FIG. 20; lower). $^1H$ NMR (400 MHz, $CD_2Cl_2$, RT): δ 2.62 (m, 2H), 1.46 (m, 2H), 0.51 (m, 2H), 0.09 (s, 97H). This reaction performed using 10 molar equivalents of Rose Bengal (RB) produced a completely insoluble material after removal of the solvent, while not wishing to be limited by theory, attributed to either rapid photooxidative crosslinking under ambient conditions or strong halide-halide interactions.

Scheme 6

Reaction scheme for $PDMS-NH_2$ and fluorescein resulting in fluorescein-labelled PDMS (PDMS-F)

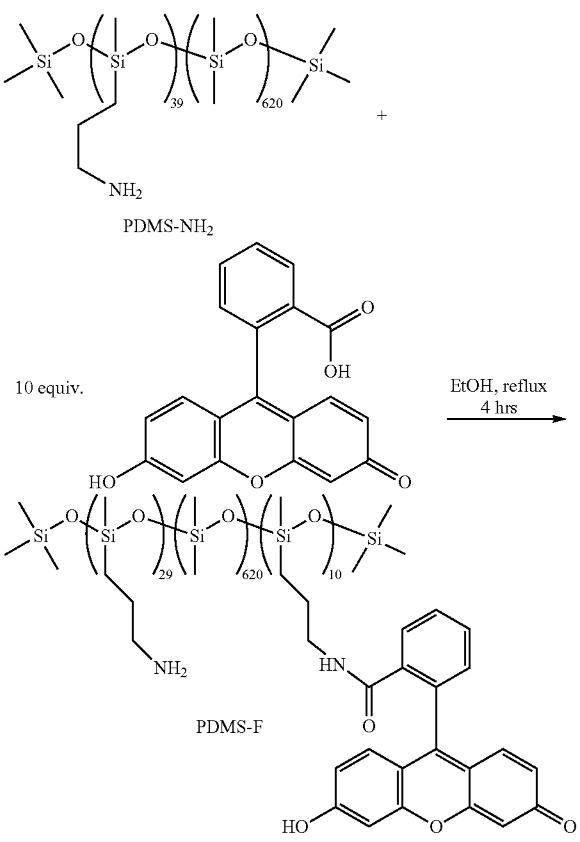

Figure 21:
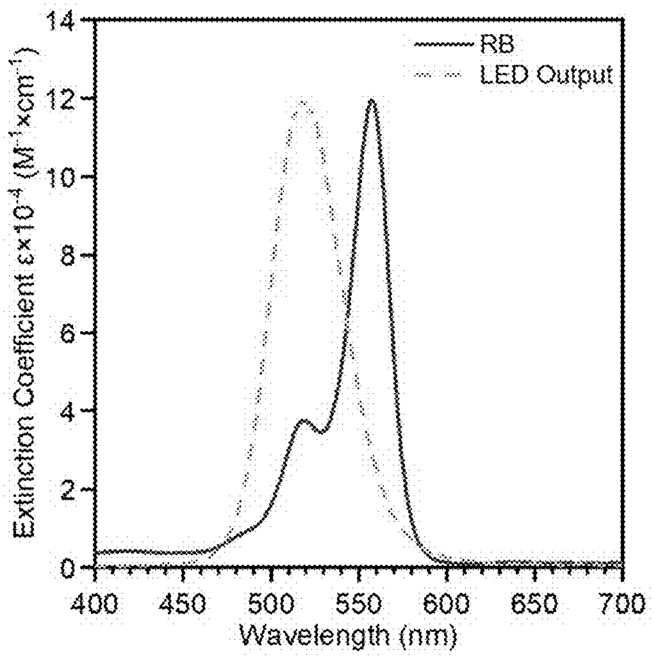
FIG. 21 shows UV-VIS spectra of Rose Bengal and the spectral output of the green LED bulb used for irradiation. MeOH, $1.17\times10^{-6}$ M.
Figure 22:
FIG. 22 shows a photograph of the material prepared by reaction of 0.016 molar equivalents RB with $PDMS-NH_2$ for 18 hours (P1) in a glass vial. No change in appearance or precipitation was observed after four weeks in the dark.
Figure 23:
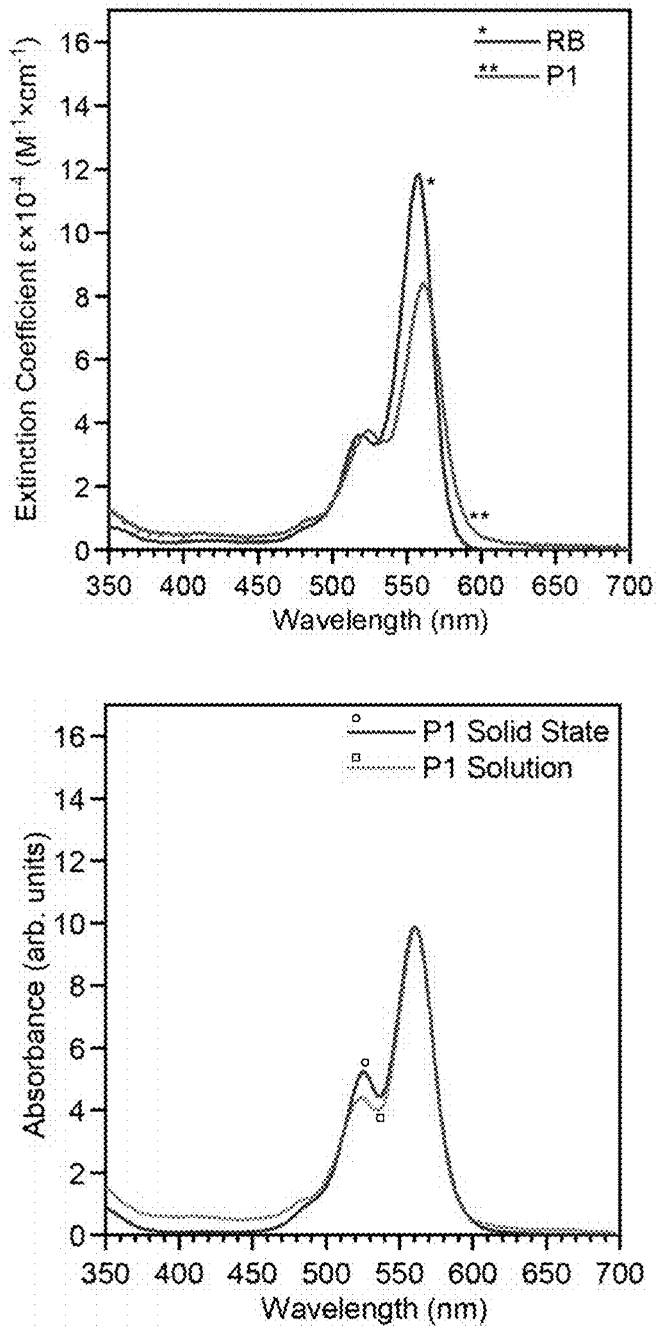
FIG. 23 shows UV-VIS spectra of Rose Bengal and P1 collected at $1.17\times10^{-6}$ M and $5.8\times10^{-7}$ M (calculated based on RB wt % in polymer) in MeOH and DCM respectively (upper); and normalized absorbance spectra of P1 measured in solution (DCM) and as a neat oil on a glass slide (lower).
Figure 24:
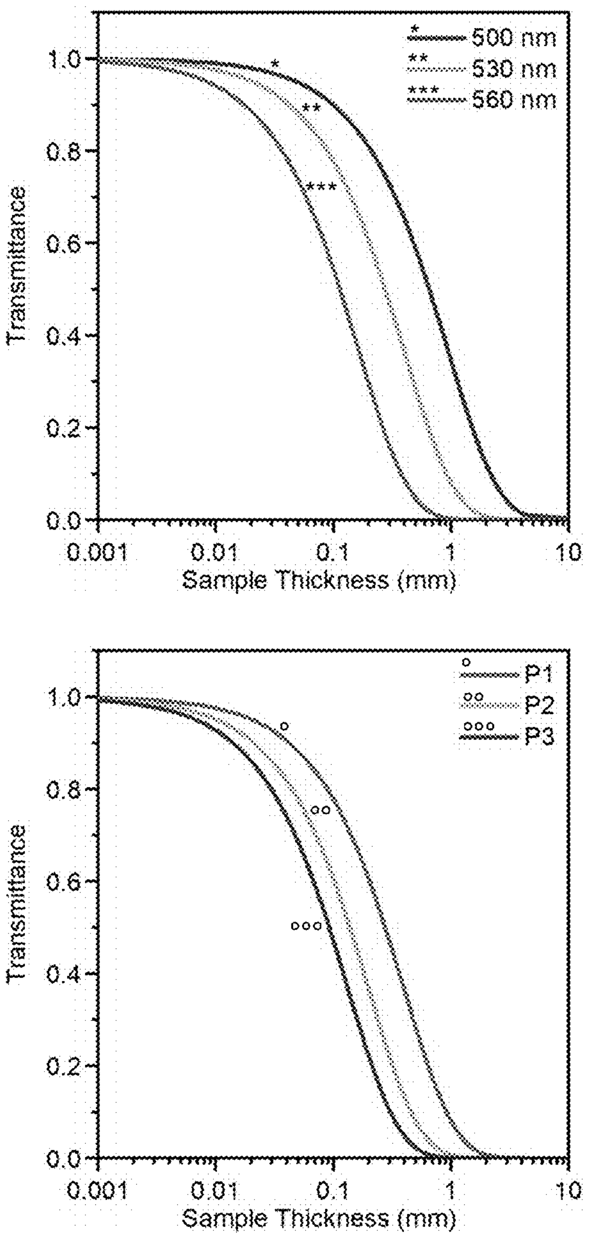
FIG. 24 shows calculated initial optical transmittance for P1 as a function of sample thickness at three different wavelengths (upper); and calculated initial optical transmittance for polymers with different amounts of Rose Bengal, calculated at 530 nm (lower).
Figure 25:
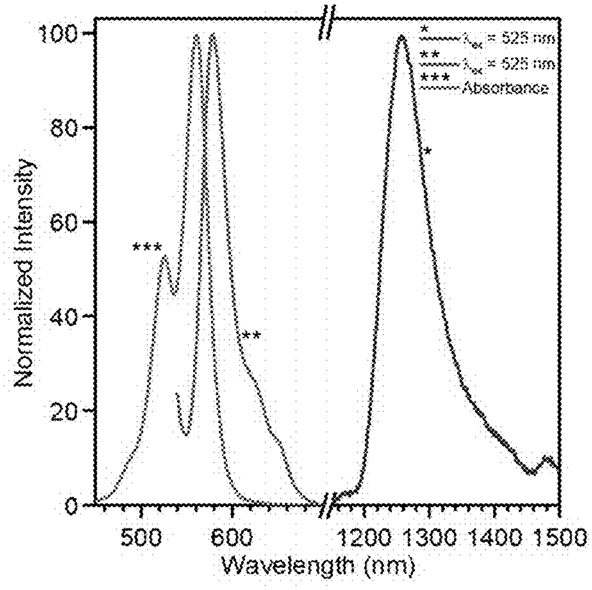
FIG. 25 shows a normalized absorbance spectrum, visible region and IR region emission of a thin film of non-cross-linked P1.

RB has a $^1O_2$ quantum yield of approximately 0.5-0.7, and the absorbance spectrum overlaps well with commercially available green LEDs (FIG. 21). 8 RB at three different molar equivalents was reacted with $PDMS-NH_2$ for 18 hours to produce solvent-free purple oils, denoted P1, P2, and P3 (Scheme 7). The low concentration of dye in these samples makes quantification of the extent of RB amide formation unfeasible, necessitating a reliance on the model systems with over 500 times the concentration of fluorescein present. However, no precipitation or phase separation when stored in the dark for over five weeks was observed (FIG. 22). The UV-VIS spectrum of P1 in solution shows similar molar extinction coefficients compared with free RB (FIG. 23; upper), and P1 in solution and as a neat film shows no major changes to spectral shape (FIG. 23; lower). The transmittance at 530 nm for these samples was calculated and determined to be suitable for samples of 1 mm thickness (FIG. 24). The emission spectrum of non-cross-linked P1 shows visible region emission (575 nm) characteristic of Rose Bengal as well as IR emission centered at 1270 nm attributed to singlet oxygen phosphorescence (FIG. 25). The IR emission at 1270 nm is a result of $^1O_2$ phosphorescence.

Figure 26:
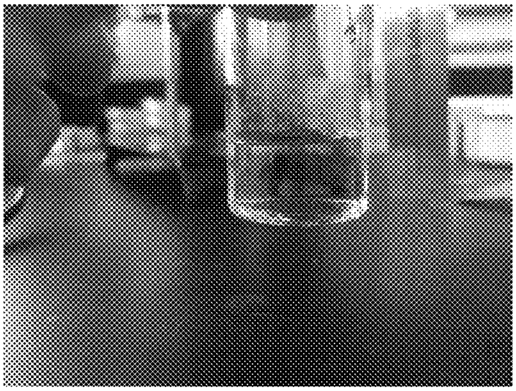
FIG. 26 is a photograph showing 150 μL of non-cross-linked P1 and 5 mL $H_2O$ in a vial after one week of storing in the dark (upper); and UV-VIS absorbance spectrum of the neat supernatant from the vial, compared against a calculated theoretical spectrum assuming complete solubility/miscibility of the polymer and dye with water (lower). No miscibility between the polymer and water was observed, and no Rose Bengal leached into solution.
Figure 26:
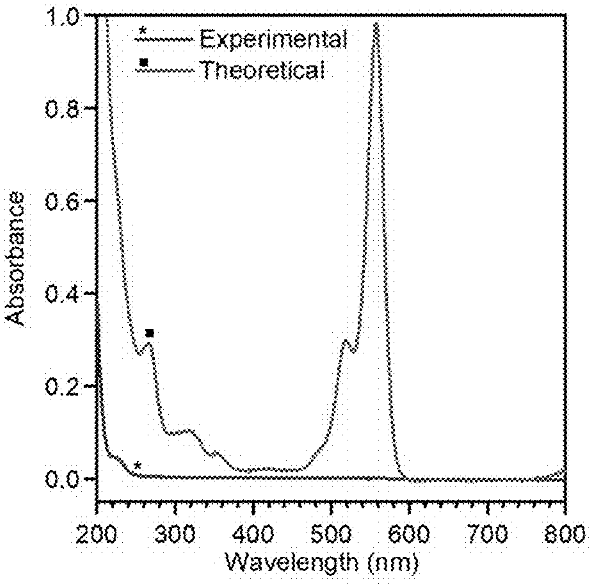

These results confirm that the photophysical properties of the dyes have not been impacted by reaction with the polymer. A sample of P1 in water after one week showed no leaching of the dye into solution, while not wishing to be limited by theory, supporting the attachment of the dye to the polymer and resulting hydrophobicity (FIG. 26).

Scheme 7. Condensation reaction between PDMS—$NH_2$ and different molar equivalents of RB resulting in a solvent-free liquid polymers after drying under vacuum.

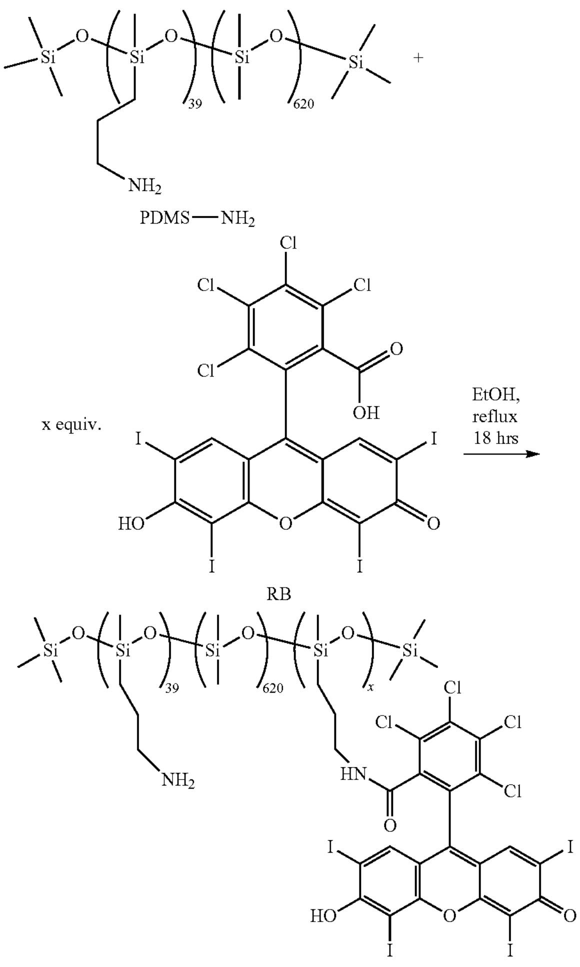

PDMS—$NH_2$

RB x = 0.016 (P1)
0.032 (P2)
0.048 (P3)

Figure 27:
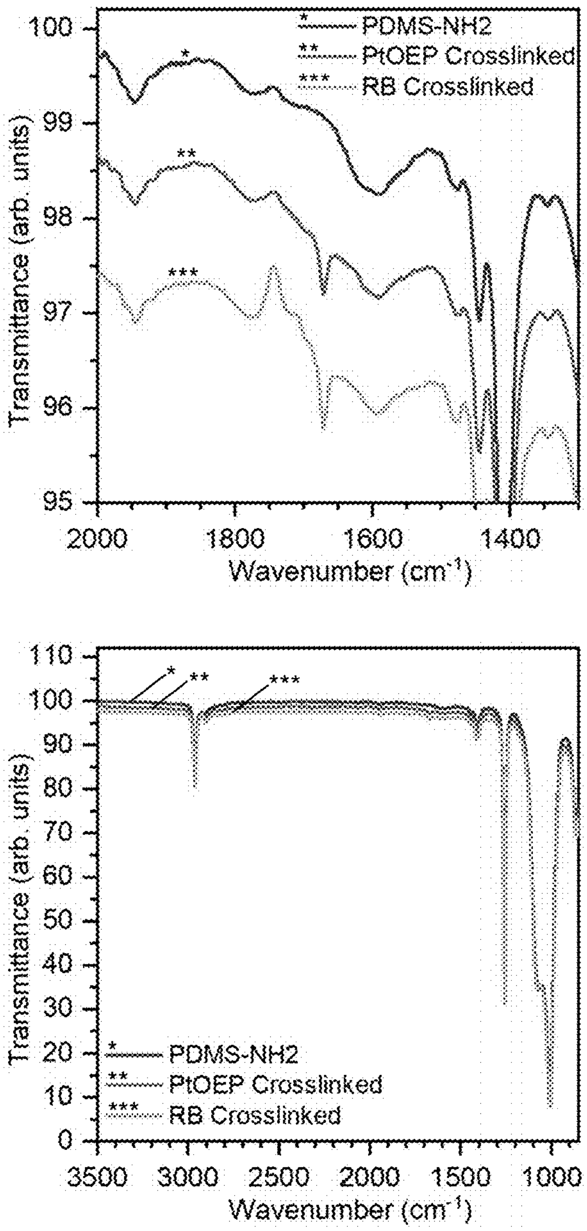
FIG. 27 shows a focused view (upper) and the full view (lower) of vibrational spectra of PDMS-$NH_2$, a sample cross-linked using a PtOEP solution, and a sample cross-linked using RB attached to the polymer (P1).
Figure 28:
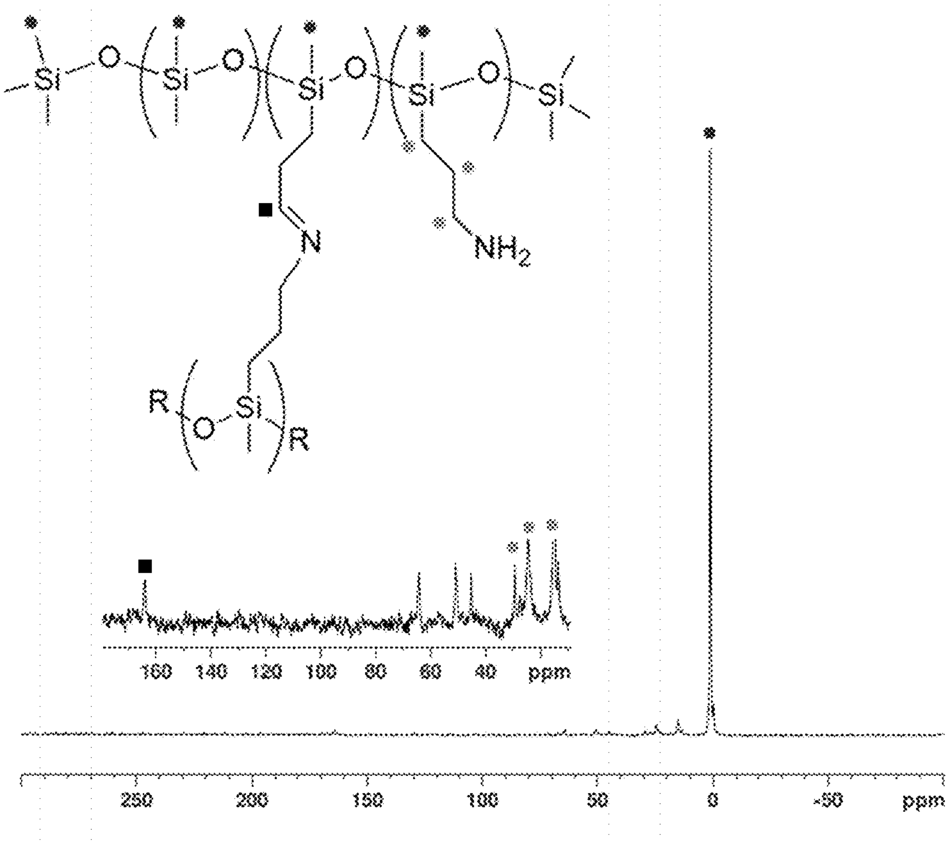
FIG. 28 shows a solid state $^{13}C$ CP-MAS NMR spectrum of a cross-linked sample of P1 after drying under vacuum for one week. 400 MHz, RT.
Figure 29:
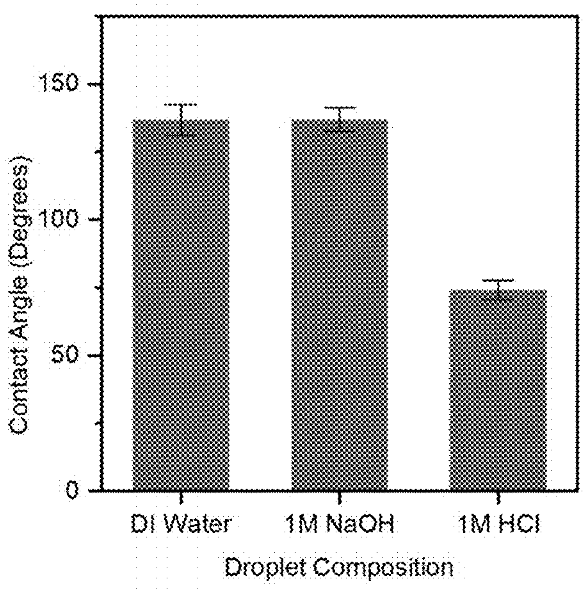
FIG. 29 is a plot showing water contact angles of a cross-linked sample of P1 and 10 μL droplets of deionized water, 1M NaOH, and 1M HCl.
Figure 30:
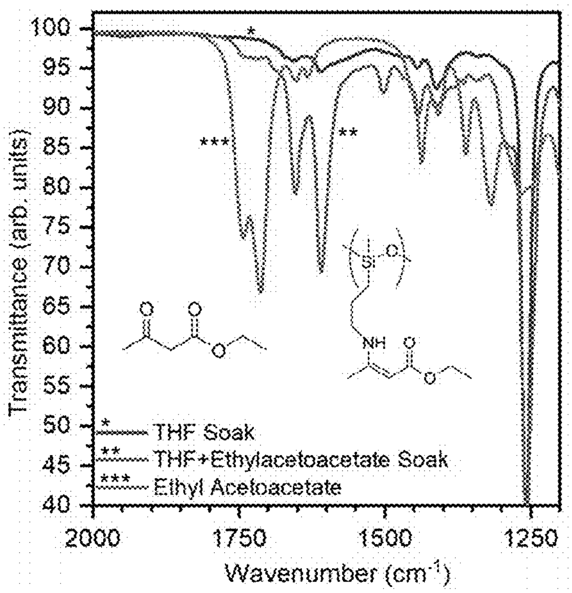
FIG. 30 shows vibrational spectra of a piece of P1 after soaking in THF, soaking in 25 wt % ethyl acetoacetate in THF, and the spectrum of pure ethyl acetoacetate.

530 nm irradiation of a neat film of P1 exposed to air resulted in a solid material after 10 minutes. Irradiation of a degassed sample in a $N_2$ environment does not result in crosslinking, confirming the requirement for $O_2$. The FT-IR spectrum of crosslinked P1 shows only a single new peak at 1671 $cm^{-1}$ compared with the starting polymer, attributed to the C═N imine peak (FIG. 27).[62] This result is consistent with the results hereinabove using a platinum octaethylporphyrin solution as a photocatalyst (Example 1); the same imine peak at 1671 $cm^{-1}$ is observed for both cross-linked samples. $^{13}C$ CP-MAS NMR of crosslinked P1 shows a peak centered at 165 ppm consistent with imine $sp^2$ carbons (FIG. 28).[63] This demonstrates that $^1O_2$ generation and photooxidative amine crosslinking can be performed under solvent-free conditions, removing the need for solubilized dye. The water contact angle of a cross-linked sample of P1 was found to be 85±2° and 94°±2° for deionized water and 1M NaOH respectively, decreasing to 74°±3° for 1M HCl due to enhanced wetting of the surface as a result of amine/imine protonation (FIG. 29). Contact angles were measured in quadruplicate from photographs. A sample of P1 soaked in ethyl acetoacetate overnight followed by extensive rinsing has new vibrational peaks at 1609 $cm^{-1}$ and 1659 $cm^{-1}$ attributed to formation of the enamine condensation product, demonstrating that $NH_2$ functionalities in the polymer are present and remain reactive (FIG. 30). Acridine carboxaldehyde was also reacted with PDMS-$NH_2$ in the same manner and equivalents as for the Rose Bengal containing polymers. The material was purified in the same fashion. Irradiation with UV light of a wavelength of 395 nm resulted in gelation (liquid to solid transition) after one hour.

95% transmittance at 530 nm was calculated and found to be 1.2, 0.6, and 0.4 mm for P1, P2, and P3 respectively (FIG. 24; upper, Table 6). These values were suitable for the preparation of 1 mm thick samples for mechanical testing. Samples thicker than 1 mm were not explored due to low optical transmittance possibly leading to heterogenous samples.

TABLE 6

Composition and optical penetration of samples with different amounts of molar equivalents of RB reacted with PDMS-$NH_2$. Thickness was calculated for 530 nm light.

| Entry | Molar Equiv RB | wt % RB | Thickness at 5% T (mm) |
|---|---|---|---|
| P1 | 0.016 | 0.032 | 1.2 |
| P2 | 0.032 | 0.064 | 0.6 |
| P3 | 0.048 | 0.096 | 0.4 |

Figure 31:
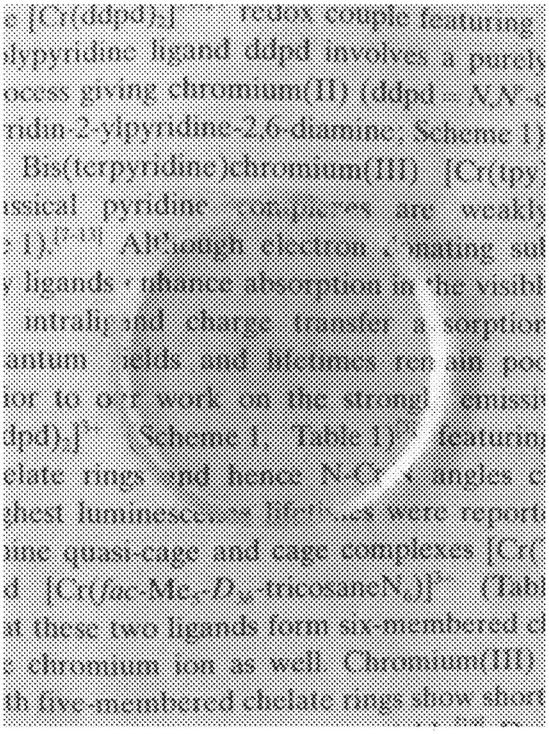
FIG. 31 shows photographs of the sample P1 (upper) and material prepared by reaction of 0.032 molar equivalents RB with PDMS-$NH_2$ for 18 hours (P2; lower) used for mechanical testing. The samples are 1 mm thick, 30 mm diameter.
Figure 31:
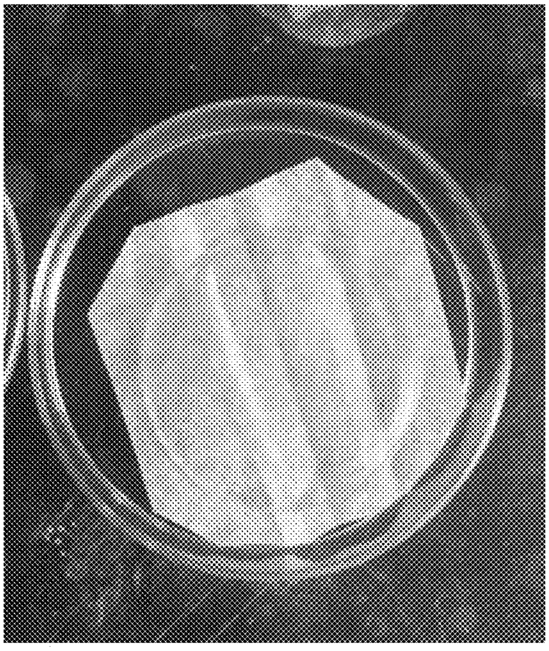
Figure 32:
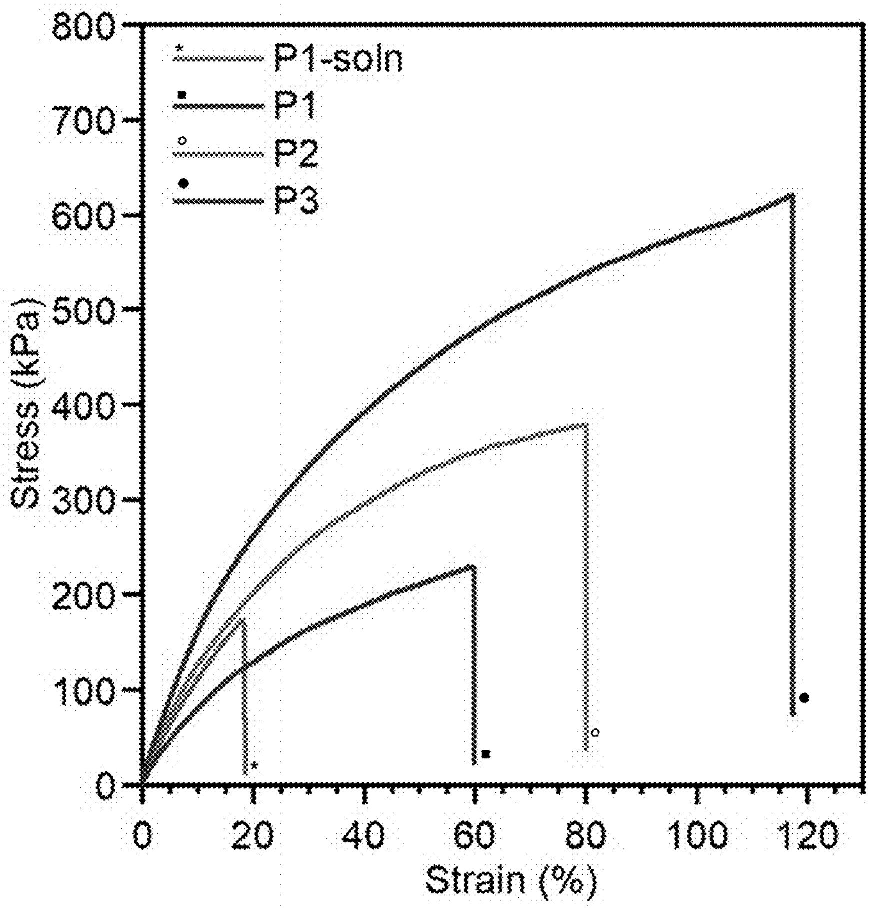
FIG. 32 shows stress-strain curves obtained from tensile experiments for materials cross-linked using RB dissolved in solution and solvent-free RB attached to the polymer.

Materials for mechanical testing were prepared by irradiating materials for 18 hours in molds using 530 nm LED lights to ensure complete photo-oxidative cross-linking. The resulting samples were a transparent off-white to pale yellow, measuring 1 mm thick and 30 mm in diameter (FIG. 31). Strips were cut and their mechanical properties tested using a Dynamic Mechanical Analyser (DMA, RSA G2 TA instruments) in axial mode, averaging the results from three measurements (FIG. 32, Table 7). P1 was compared with a sample prepared at the same molar equivalency of RB but with the dye added as a solution of 1,2-propanediol and EtOH (P1-soln). Both samples exhibited similar Young's modulus (initial slope of the stress-strain curve) but the ultimate elongational strain of P1 was approximately three times greater than that observed for P1-soln (58% versus 18%). Similarly, the tensile strength (maximum stress before failure) of P1 was approximately 30% greater than that for P1-soln (0.22 MPa versus 0.17 MPa). While not wishing to be limited by theory, this difference was attributed to evaporation of the solvent in P1-soln during crosslinking causing precipitation of the dye, preventing further $^1O_2$ generation. Owing to the low $T_g$ of crosslinked PDMS, the amorphous liquid-like state of individual P1 chains after crosslinking is proposed to allow for $^1O_2$ generation after solidification, leading to a greater extent of crosslinking.

TABLE 7

Mechanical properties of samples prepared with different amounts of RB attached to $PDMS-NH_2$, as well as a sample (P1-soln) prepared using a RB containing solution. Measured using DMA tension experiments.

| Sample | Molar Equiv RB | Young's Modulus (MPa) | Tensile Strength (MPa) | Max Elongation (%) |
|---|---|---|---|---|
| P1-soln | 0.016 | 1.13 ± 0.01 | 0.17 ± 0.05 | 18 ± 1 |
| P1 | 0.016 | 1.11 ± 0.01 | 0.22 ± 0.01 | 58 ± 3 |
| P2 | 0.032 | 2.00 ± 0.09 | 0.39 ± 0.02 | 81 ± 4 |
| P3 | 0.048 | 2.15 ± 0.08 | 0.55 ± 0.04 | 117 ± 8 |

The mechanical properties of P2 and P3 were also measured and compared with P1 (FIG. 32, Table 5). P2 and P3 have similar Young's moduli of approximately 2 MPa and higher, greater than the value of 1.1 kPa for P1. The ultimate elongation of the samples increases along with increasing RB content from 58% to 117% for P1 to P3. These mechanical results are comparable with the results described hereinabove in Example 1 as well as samples crosslinked using photo-acrylate UV chemistry.[12(a)]

Figure 33:
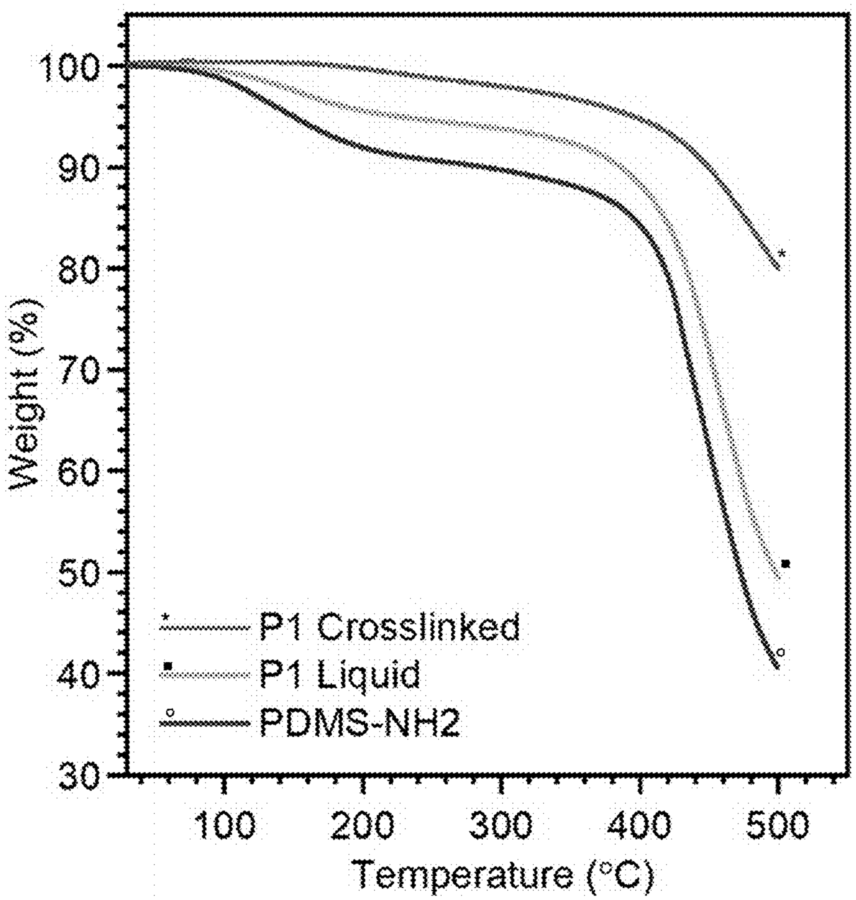
FIG. 33 shows thermogravimetric analysis of the PDMS-$NH_2$ starting material, P1 liquid, and P1 cross-linked using 530 nm light. 10° C./minute, $N_2$.
Figure 34:
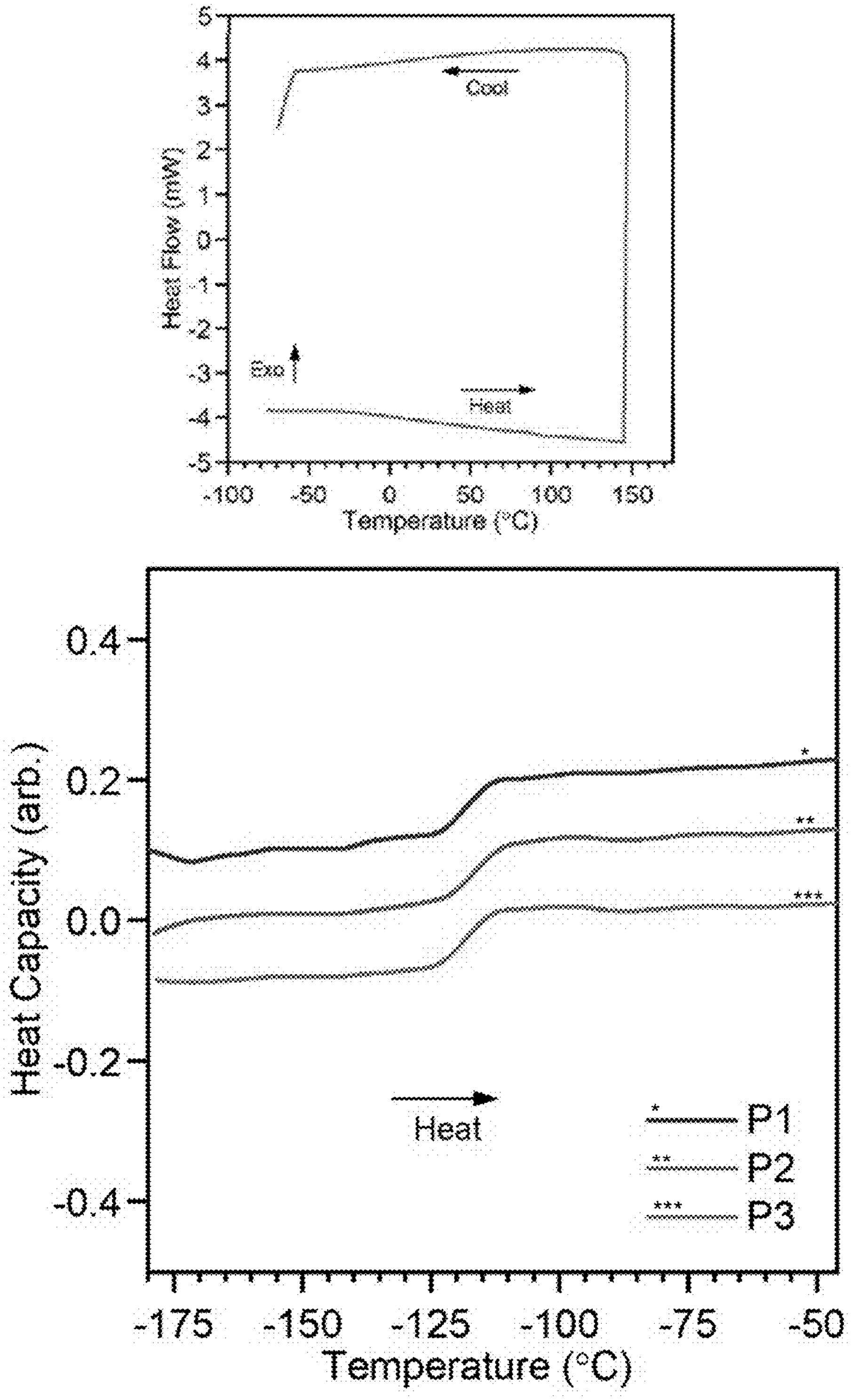
FIG. 34 shows DSC heating and cooling traces of P1 using a TA Instruments DSC Q2000 instrument with a TA Instruments Refrigerated Cooling System 90, collected at 10° C./min, $N_2$ (upper); and heating traces of P1, P2, and material prepared by reaction of 0.048 molar equivalents RB with PDMS-$NH_2$ for 18 hours (P3), collected using a Netzsch Polyma 214 instrument with LN2 attachment at a ramp rate of 10° C./min (lower).

The soluble fraction was found to be 22% for P1, decreasing to 4% for P2 and P3 consistent with a greater crosslinking extent (Table 8). The soluble fraction was determined by adding a contiguous piece of polymer, approximately 0.3 g, to 10 mL of DCM in a sealed vial and allowing to stand overnight. The DCM was decanted off, the system rinsed with additional DCM, and then the sample removed and patted dry with tissue. After being weighed, the sample was then dried for three days under vacuum and reweighed. The initial and final masses were used to determine the soluble fraction, and the swollen mass and final mass was used to determine the mass ratio of DCM uptaken in the swollen gels. All samples were found to be completely insoluble in water. TGA analysis of P1 shows less than 5% mass loss below 400° C., a large improvement over $PDMS-NH_2$ which is thermally unstable above 120° C. (FIG. 33). The lack of mass loss below 200° C. supports the absence of solvent in the cross-linked material. No significant thermal transitions were observed between-50 and 150° C. using differential scanning calorimetry (FIG. 34; upper), with an expected $T_g$ near −120° C. below the capabilities of the instrumentation (TA Instruments DSC Q2000 instrument with a TA Instruments Refrigerated Cooling System 90 at a ramp rate of 10° C./min). Using a Netzsch Polyma 214 instrument with LN2 attachment at a ramp rate of 10° C./min all samples showed a similar glass transition temperature of −115° C. as measured using differential scanning calorimetry, consistent with other cross-linked siloxanes (FIG. 34; lower).[46]

TABLE 8

Soluble fraction and swelling ratio for samples cross-linked using different molar equivalents of RB.

| Sample | Soluble Fraction (%) | Swelling (g DCM/g polymer) |
|---|---|---|
| P1 | 22.3 | 4.9 |
| P2 | 4.2 | 2.7 |
| P3 | 4.4 | 2.2 |

Figure 35:
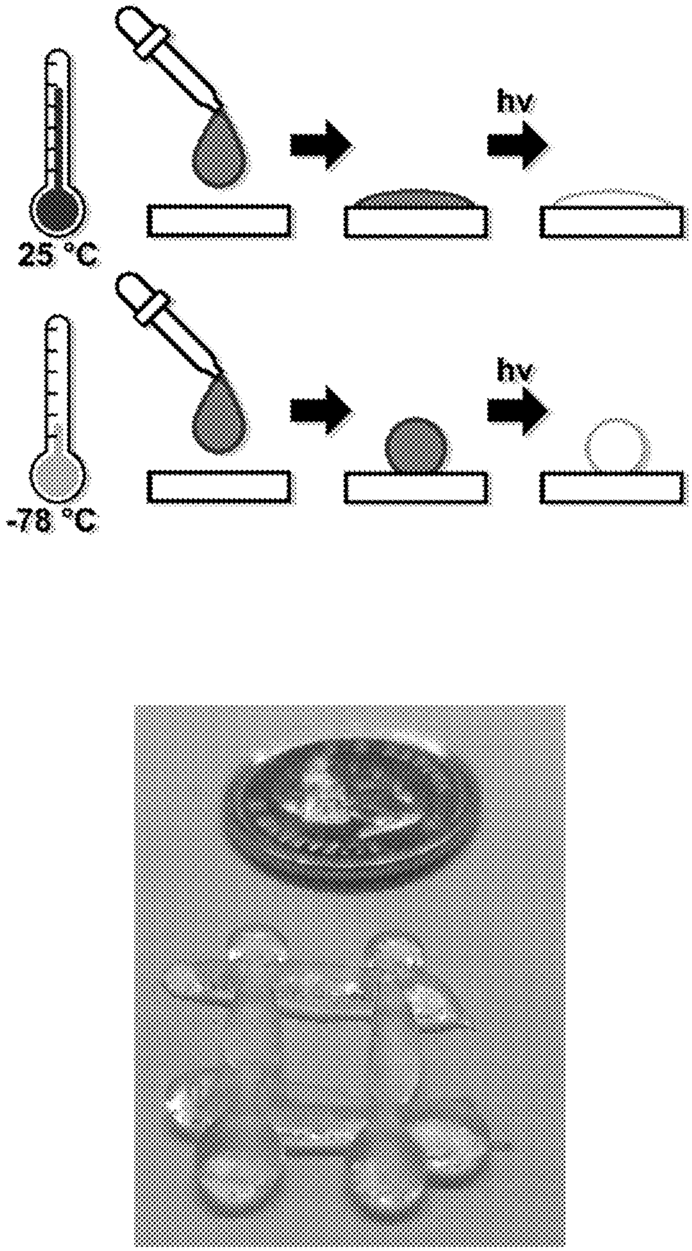
FIG. 35 shows a schematic depicting the difference in deposition shape when performed at room temperature (top) and −78° C. (bottom) (upper image); and a photograph of a hashtag shape produced with a quarter for reference (lower image).
Figure 36:
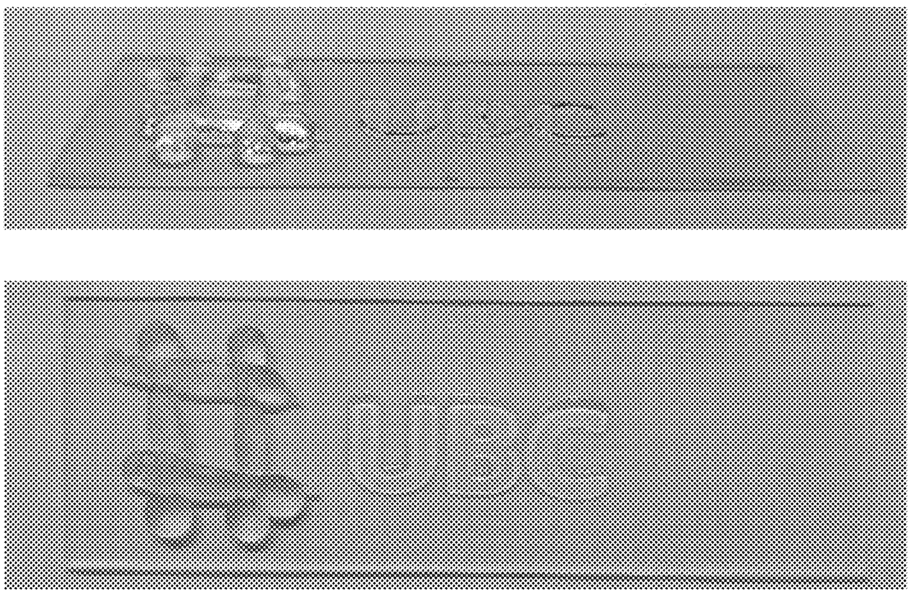
FIG. 36 shows photographs of a side-on view (top image) and top view (lower image) of a non-equilibrium hashtag structure prepared using −78° C. deposition alongside the letters "UBC" stereolithographically printed using a 2 mm resolution photomask.
Figure 37:
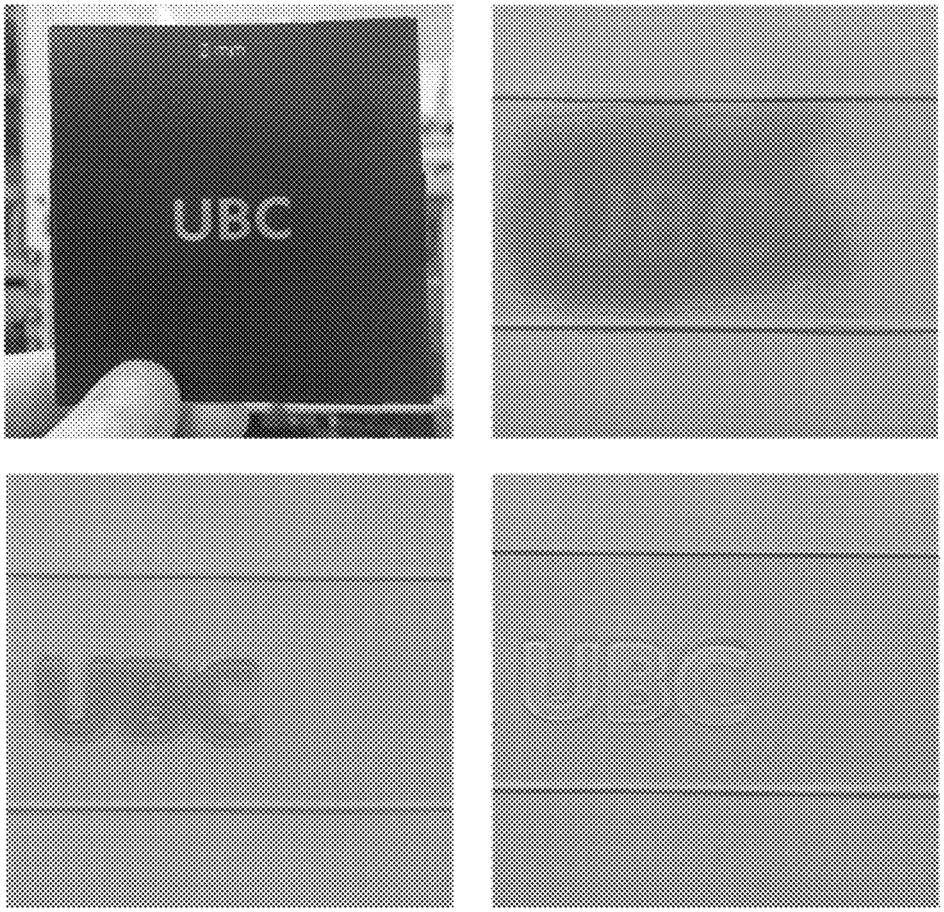
FIG. 37 shows photolithography of P1 to give the letters UBC after one hour of 530 nm irradiation: printed photomask used to pattern the polymer (top left); P1 on a glass slide after one hour of 530 nm irradiation through the photomask, wherein colorless areas are regions that were exposed to light (top right); slide after rinsing with ethyl acetate wherein a pink color diffused into the printed structure during rinsing (bottom left); and slide after photobleaching overnight using 530 nm light to give a clear, colorless pattern (bottom right).
Figure 38:
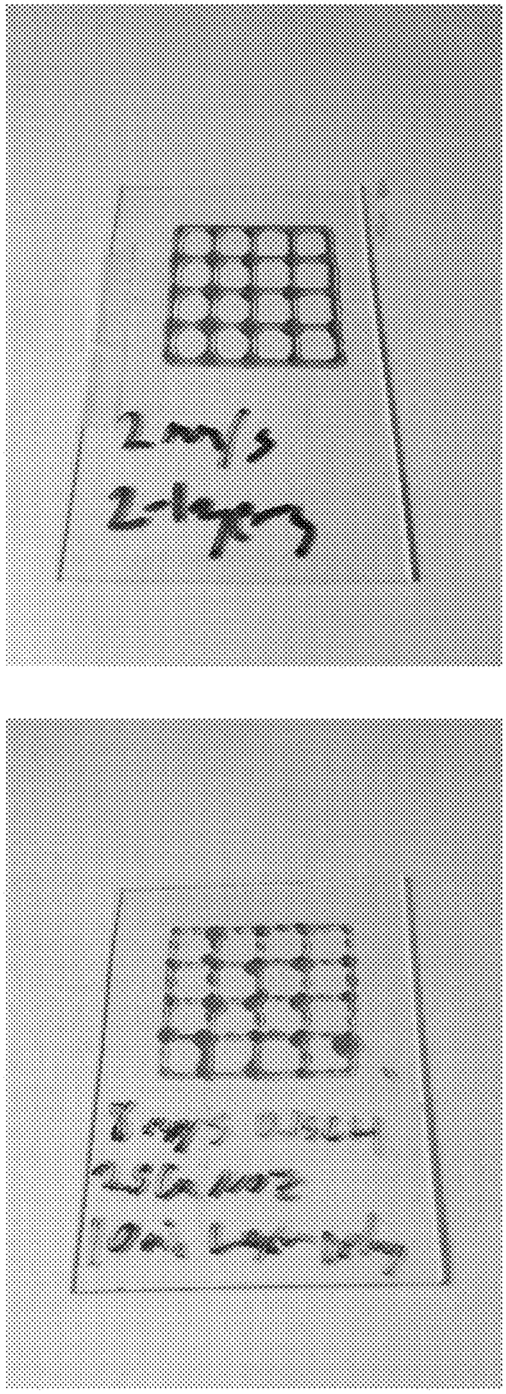
FIG. 38 shows photographs of direct-write 3D printing of P3 at two different print speeds, 2 mm/s (top image) and 8 mm/s (bottom image) onto glass slides.

The solvent-free single component nature of the material allows it to be worked with in ways not possible with a solvated siloxane. For example, samples cooled to −78° C. using a dry ice bath result in a low viscosity that prevents macroscopic flow, while solvated samples did not gel. This allows for the formation of non-equilibrium shapes by depositing P1 into a vessel cooled to −78° C. (FIG. 14), where the oil rapidly solidifies in place and can then be photo-cross-linked into non-equilibrium shapes while warming to room temperature (FIG. 35). Phase separation or precipitation was not observed on cooling, attributed to the sample being a single component mixture. Samples irradiated with 530 nm light as the vessel warms to room temperature overnight were crosslinked into these non-equilibrium shapes and could be removed as free-standing 3D structures. This technique (sometimes referred to herein as cryo-deposition) could only be achieved when the samples were solvent free as the addition of solvent prevented solidification at −78° C. A 3D hashtag structure was prepared where the overlap of the arms can be clearly seen (FIG. 35, lower image; FIG. 36). The same structure could not be prepared at room temperature as the liquid spread evenly across the substrate. The cryo-deposited structure was compared alongside the 2 mm wide letters UBC prepared in one hour using a photomask (FIG. 36). Photolithography using masks printed onto plastic transparencies was performed, demonstrating the efficacy of this crosslinking procedure for photo-patterning (FIG. 37). These structures demonstrate the versatility of solvent-free material that is capable of rapid photo-crosslinking under a variety of manufacturing conditions. We also explored the direct-write printing of P3 onto glass to create sub-millimeter features with more precision than benchtop photomasks allow for (FIG. 38). Exposure of the printed material to 530 nm light immediately after printing fixed the shape and prevented pooling. Despite the relatively fast gelation (G'>G") for $PDMS-NH_2$ and OEP attempts to print the material using a DLP 3D printer resulted in no cross-linking, while not wishing to be limited by theory, proposed to be a result of poor $O_2$ diffusion analogous to the results seen in parallel plate rheology. Accordingly, using a printer with an oxygen permeable membrane/window may allow 3D printing near the window.

Previously reported photo-crosslinked PDMS devices were prepared using cytotoxic initiators that had to be removed using successive washes to enable biocompatabilty.[12(a),12(b)] m-xylene has toxic properties which may be undesirable for certain uses.[64] In contrast, $PDMS-NH_2$ has low toxicity for uses such as cosmetics.[12(b)] Additionally, RB has been explored for use as a corneal stain and in photodynamic therapy, and has no significant toxicity when applied topically.[65] As a cross-linked material, the amine/imine functionalities can be protonated in aqueous environments and induce contact killing of microbial species. The antimicrobial mechanism of solubilized and immobilized quaternary-ammonium species is proposed to proceed through electrostatic attraction, interdigitation or stripping of the cell membrane, and then leakage of the intercellular fluid leading to cell lysis.[66] The preliminary cytotoxicity of cross-linked P1 was probed using the CHO-K1 cell line to investigate the materials potential use in medical devices. The antimicrobial activity of cross-linked P3, the sample with the most robust mechanical properties, was probed using the CHO-K1 mammalian cell line as well as *E. coli* (Gram negative) and methicillin-resistant *Staphylococcus aureus* (MRSA) to investigate its activity as a broad-spectrum antimicrobial material.

Figure 39:
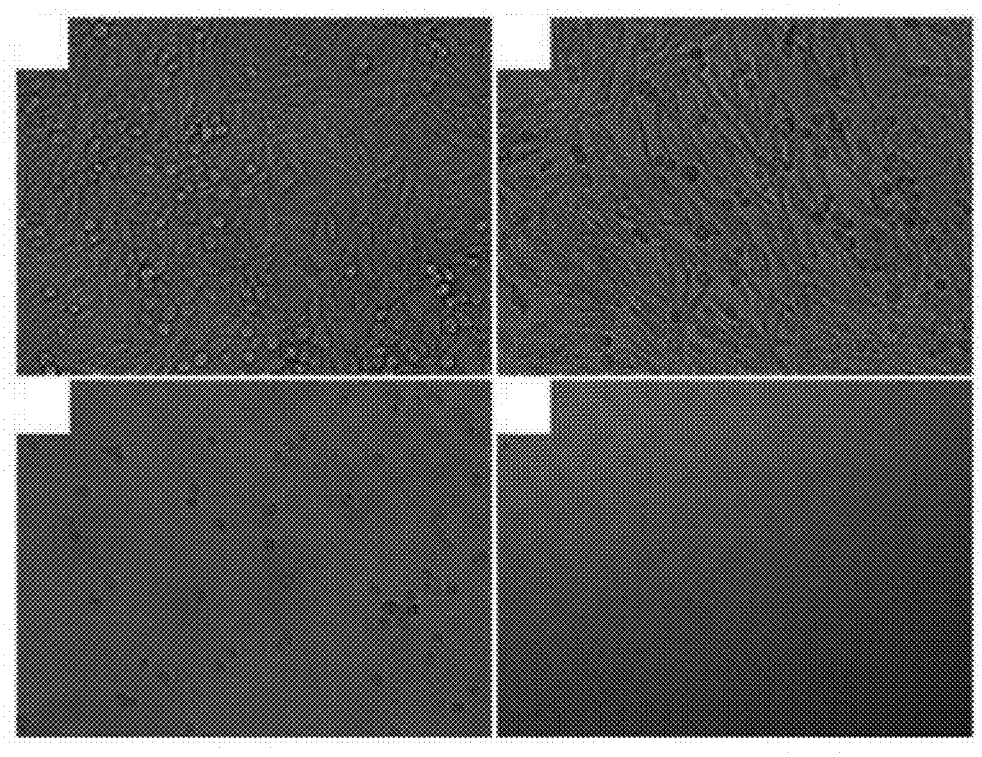
FIG. 39 shows microscope images of CHO-K1 cells incubated for 72 hours with cell medium and no additive (upper left); PDMS 50,000 g/mol (upper right); 6 μm α-Amanitin (lower left); and crosslinked P1 (lower right).
Figure 40:
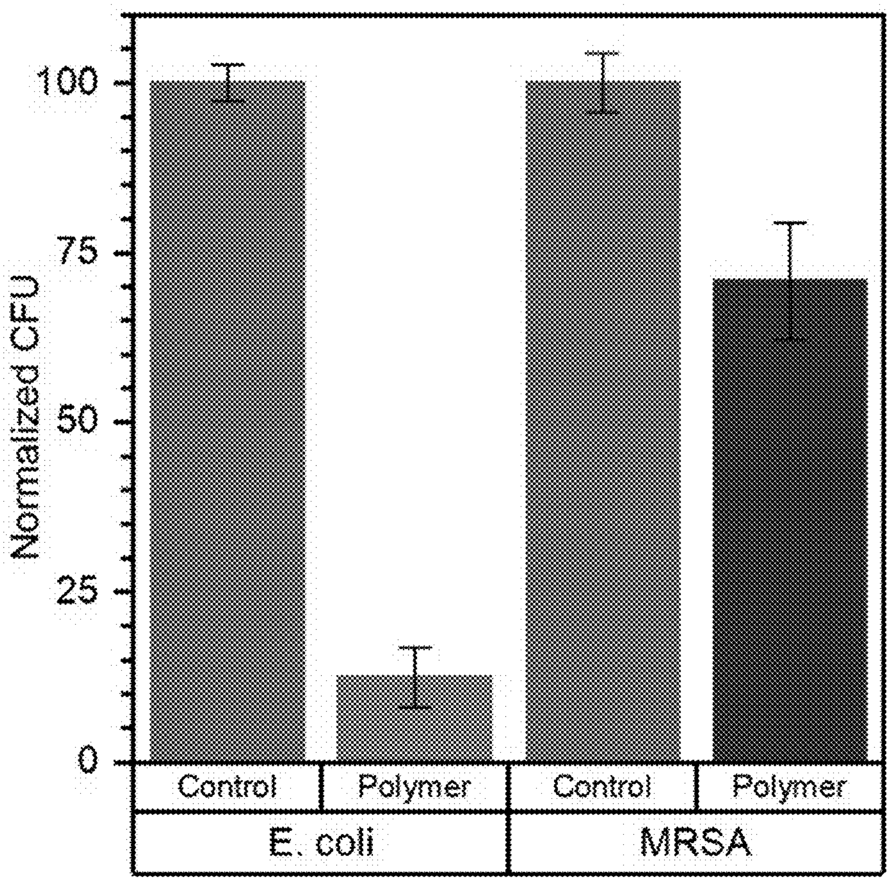
FIG. 40 shows normalized CFUs for *Escherichia coli* (*E. coli*) and methicillin resistant *Staphylococcus aureus* (MRSA) incubated with cross-linked P3 powder for 24 hours under constant shaking, compared with controls with no polymer. Determined from colony counts grown on agar plates in triplicate.
Figure 41:
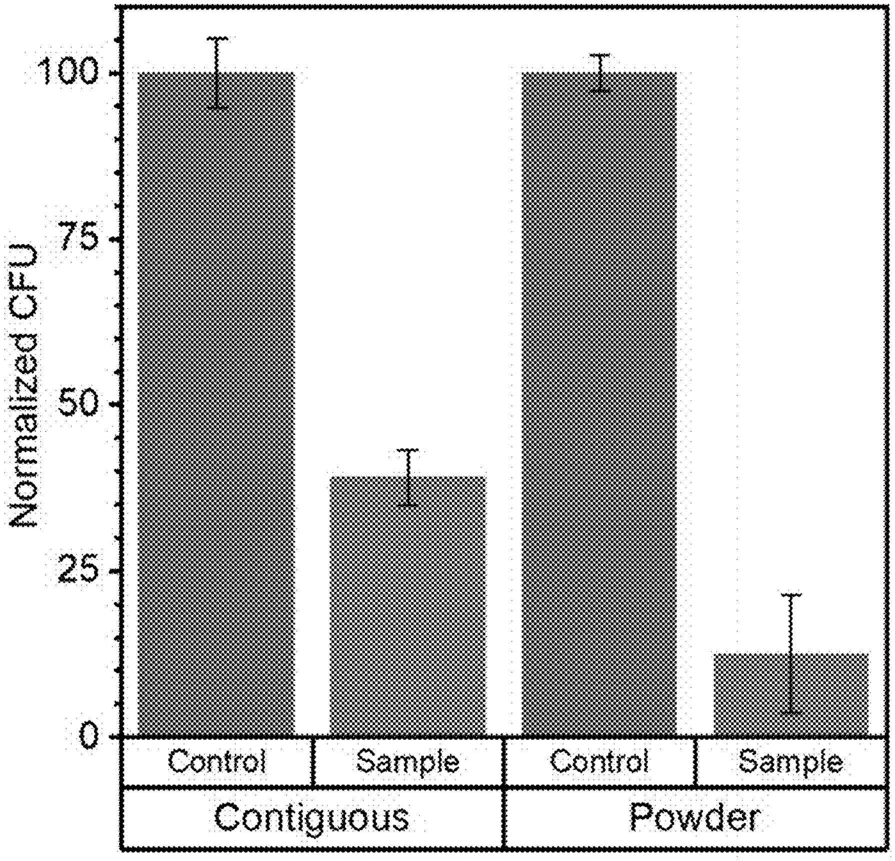
FIG. 41 shows normalized CFUs for *E. coli* incubated with cross-linked P3 powder and a continuous sample at the same polymer mass. Samples were incubated for 24 hours under constant shaking and compared with controls with no polymer. Determined from colony counts grown on agar plates in triplicate.

P1 was sterilized using an autoclave and then loaded into a 96 well plate. The plate was irradiated for 18 hours in the same conditions as previously described. Non-functionalized silicone (PDMS, 50,000 g/mol) and wells with no additive were used as controls, along with α-Amanitin as a negative control.[67] All samples were prepared in triplicate. The temperature requirement for autoclaving prevented the use of PDMS-$NH_2$ as a control. The plate was loaded with CHO-K1 cells in a buffer solution and allowed to incubate at room temperature for 72 hours. The samples were then imaged using a microscope (FIG. 39). P1 was observed to have resulted in complete cell lysis, with no visible intact cells in any well containing the material. PDMS, the blank, and α-Amanitin did not result in complete cell lysis. α-Amanitin results in cell death without lysis. Cross-linked P3 was ground to a uniform powder and incubated with the two bacterial strains for 24 hours under constant shaking to dynamically reintroduce fresh bacteria to the material surface. Aliquots were taken and diluted, and the resulting colony forming units (CFUs) measured after 24 hours of growth on sterile agar plates. The results were compared against controls with no polymer. An 85% reduction in CFUs of *E. coli* was observed at the concentrations tested, with a 29% reduction in CFUs for MRSA under the same conditions (FIG. 40). Previously reported QAC materials such as polyallylamine exhibit greater antimicrobial activity against Gram positive bacteria than Gram negative, opposite to what was observed in this system.[68] A 61% reduction in CFUs for *E. coli* was determined for a continuous piece of cross-linked P3 at the same mass loading as in FIG. 40, demonstrating that the antimicrobial activity is inherent to the material and depends on exposed surface area (FIG. 41). Solutions challenged with twice the mass of P3 powder resulted in a >99% reduction in CFUs for *E. coli.*

Figure 42:
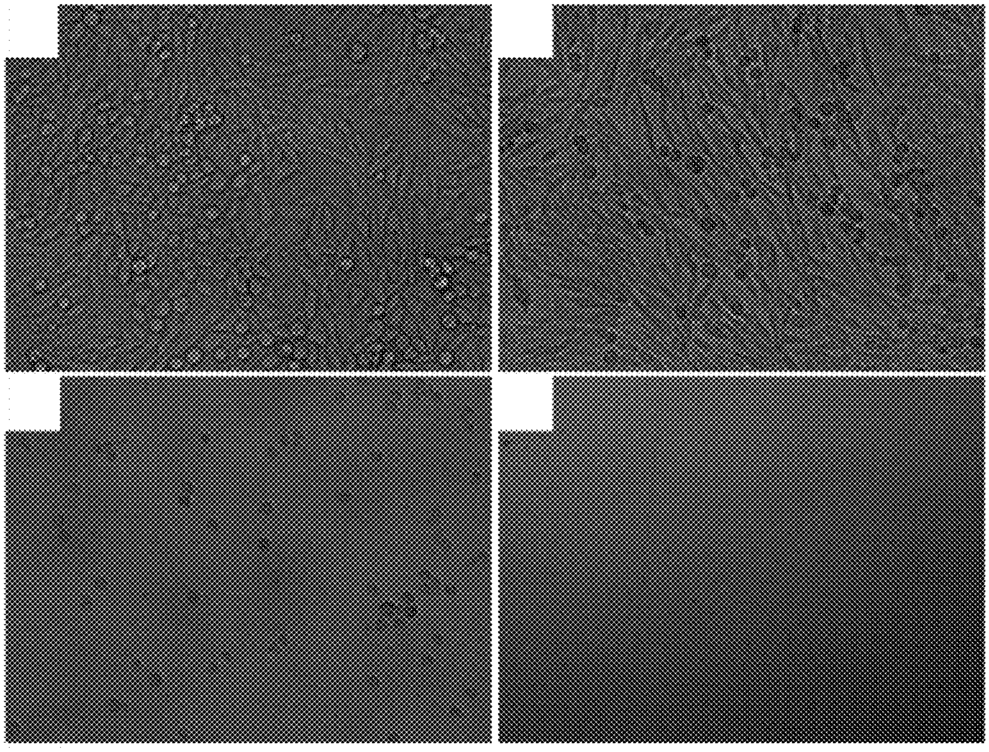
FIG. 42 shows microscope images of CHO-K1 cells incubated for 72 hours with cell medium and no additive (upper left); PDMS 50,000 g/mol (upper right); 6 μm α-Amanitin (lower left); and cross-linked P3 (lower right).

CHO-K1 cells were incubated at room temperature for 72 hours in a 96 well plate coated with cross-linked P3 along with non-functionalized PDMS (50,000 g/mol) and α-amanitin, a naturally occurring toxin that results in cell death, as controls.[67] The temperature requirement for autoclaving prevented the use of PDMS-$NH_2$ as a control. The samples were then imaged using a microscope (FIG. 42). P3 was observed to result in complete cell lysis, with no visible intact cells in any well containing the material. Non-functionalized PDMS, the blank, and α-amanitin did not result in complete cell lysis. α-Amanitin results in cell death without lysis. This shows that the amine and imine cross-links in our material possess broad-spectrum antimicrobial activity, acting on both primarily anionic bacterial membranes and zwitterionic mammalian membranes, with only weak activity against Gram positive bacteria.[69] While not wishing to be limited by theory, this may be a result of the high contrast in polarity between the hydrophobic polymer backbone and polar amine/ammonium functionalities, in comparison with QACs such as alkylated PEI that is uniformly hydrophilic. Cell lysis induced by amine-coated surfaces is a phenomenon attributed to the formation of cationic groups at biological pH that can interrupt and disrupt the integrity of cell walls.[70] This has been reported for carbon backbone polymers grafted to Si surfaces, but this is the first example of a non-grafting approach using silicone to our knowledge.[71] This property should be integral to our material and not limited to a surface layer, and as such may be useful in combating disease transmission via contaminated medical equipment in hospitals.[72]

We have demonstrated the preparation of a solvent-free liquid material capable of undergoing self-catalyzed photo-cross-linking by combining a sensitizer such as Rose Bengal with primary amine containing PDMS. When the sensitizer was Rose Bengal, 530 nm irradiation of this material under ambient conditions results in rapid cross-linking via photo-oxidative $^1O_2$ imine coupling without the need for solvent. We investigated the cross-linking kinetics of a model system using photorheology experiments and determined that light intensity is the largest contributor to cure speeds. The mechanical properties of this material are an improvement over samples prepared using the same concentration of dye in solution. Furthermore, the ultimate elongation can be increased two-fold by increasing the amount of dye attached to the polymer. The solvent-free nature of this material allows, for example, for the fabrication of non-equilibrium shapes by performing deposition and photocrosslinking beginning at −78° C. We tested the cytotoxicity of the crosslinked material using the CHO-K1 cell line and found the polymer induces complete cell lysis consistent with self-sterilizing cationic amine surfaces. The antimicrobial activity of this material is greater against *E. coli* compared with MRSA, and exhibits complete cell lysis of model mammalian cells. Accordingly, the material may be useful for reducing or preventing transmission of diseases such as human immunodeficiency virus (HIV) and malaria that spread through contact with infected bodily-fluids/cells via cell lysis of such cells because lysing open the cell in these cases may cause the virus/parasites to be more readily exposed to the environment and lose infectivity. Additionally, the material may be useful for reducing or preventing transmission of diseases such as bacterial diseases where the bacteria itself can be directly exposed to the polymer surface. The simplicity and low cost of our single component system may, for example, make it an attractive method for the preparation (e.g. by photolithographic methods) of objects such as self-sterilizing silicone devices.

Example 3: Dual-Action Antimicrobial Textile Coating

I. Experimental

A. Materials (6-7% aminopropylmethylsiloxane)-dimethylsiloxane copolymer (AMS-163) and (20-25% aminopropylmethylsiloxane)-dimethylsiloxane copolymer (AMS-1203) were purchased from Gelest. Rose Bengal lactone (95%) was purchased from Sigma Aldrich. Tetraphenylporphyrin was purchased from Frontier Scientific.

B. Instrumentation

Absorption spectra were collected on a Varian Cary 5000 UV-Vis-NIR spectrophotometer using a quartz cuvette (solution) or glass slide (solid state). Steady-state photoluminescence measurements were collected using a Photon Technology International (PTI) QuantaMaster 50 fluorimeter utilizing a 75 W Xe arc lamp as the source.

Infrared spectra were collected on a PerkinElmer Frontier FT-IR with a diamond ATR plate. Thermogravimetric analysis was performed using a Netzch TG209 Libra with $Al_2O_3$ crucibles at a temperature ramp of 10° C./min under a $N_2$ purge flow of 30 mL/min.

Water contact angles were determined from analysis of digital photographs of 10 μL droplets on treated fabric samples, taken in quadruplicate.

Scanning electron microscopy (SEM) images were collected on a FEI Quanta 650 instrument with tungsten hairpin filament.

C. Polymer Preparation

RB (0.048 molar equivalents) was condensed with PDMS-$NH_2$ to afford PRB as in line with the procedure described above in Example 2. TPP was dissolved in toluene at a concentration of 1 mg/mL and combined with PRB (0.2 mL per gram of PRB) to give a relative molar ratio of 0.016 moles TPP per mole of polymer. This mixture was diluted with THF to afford solutions of 1, 5, and 15 wt % PRB and then used directly.

D. Tensile Measurements

Fabric for tensile measurements was cut to a size of 10 mm (course direction) by 70 cm (wale direction) using a Cricut cutting plotter. Strips were treated as previously described and measured until break using an Instron 5980 under a 2 kN load at 20 cm/min with a clamp distance of 40 mm.

E. Substrate Oxidation

Uric acid was dissolved in a 0.02 M phosphate buffer to afford a concentration of $2\times10^{-4}$ M. 3 mL of this was added to a quartz cuvette and 20 mg of C/13 added. The system was irradiated using a 15 W 530 nm LED from a distance of 4 cm and the change in absorbance at 292 nm monitored using UV-VIS spectroscopy.

F. Bacterial Cell Testing

*Escherichia coli* (UBC Chemistry Department Collection #1105) was grown overnight at 37° C., 225 rpm in sterile Mueller-Hinton broth. The bacterial concentration in the broth was determined by absorbance at 600 nm by Cary100 spectrophotometer. The cultures were diluted in sterile distilled water to obtain a concentration of $10^5$ bacteria/mL and aliquots of bacterial suspension (10 ml) were transferred to sterile 50 ml Falcon tubes each containing the coated material at the specific surface area. After overnight incubation at 37° C., 225 rpm, the suspensions were diluted 10-fold and (20 μL per plate) plated onto Mueller-Hinton agar plates. The plates were incubated at 37° C. overnight. The number of visible colonies on each plate was calculated to obtain the corresponding concentration of living bacteria. Each experiment was performed in triplicate, and the reported results were averaged values. For aPDI experiments, incubation with the material was carried out at room temperature either covered in foil to exclude light or irradiated using 530 nm light from a distance of 2 cm. Aliquots were drawn, diluted, and plated onto agar using the same procedure.

II. Results and Discussion

A dual-functional approach to antimicrobial textile is presented herein, utilizing a single polymer with both antimicrobial functionalities (primary amines) and a covalently attached photosensitizer that can actively generate $^1O_2$ on irradiation with green light. This provides both a passive and active method of antimicrobial action. We demonstrate the coating of synthetic and natural textiles at room temperature using only a soak procedure followed by UV crosslinking to affix the polymer onto the fabric. The treated textiles demonstrate only minimal loss of mechanical properties for high polymer loadings and exhibit high degrees of hydrophobicity which may prevent bacterial adhesion. We demonstrate the passive antimicrobial activity against *E. Coli* as well as a rapid enhancement of the antimicrobial inactivation using aPDI through the generation of $^1O_2$ using visible light.

Figure 43:
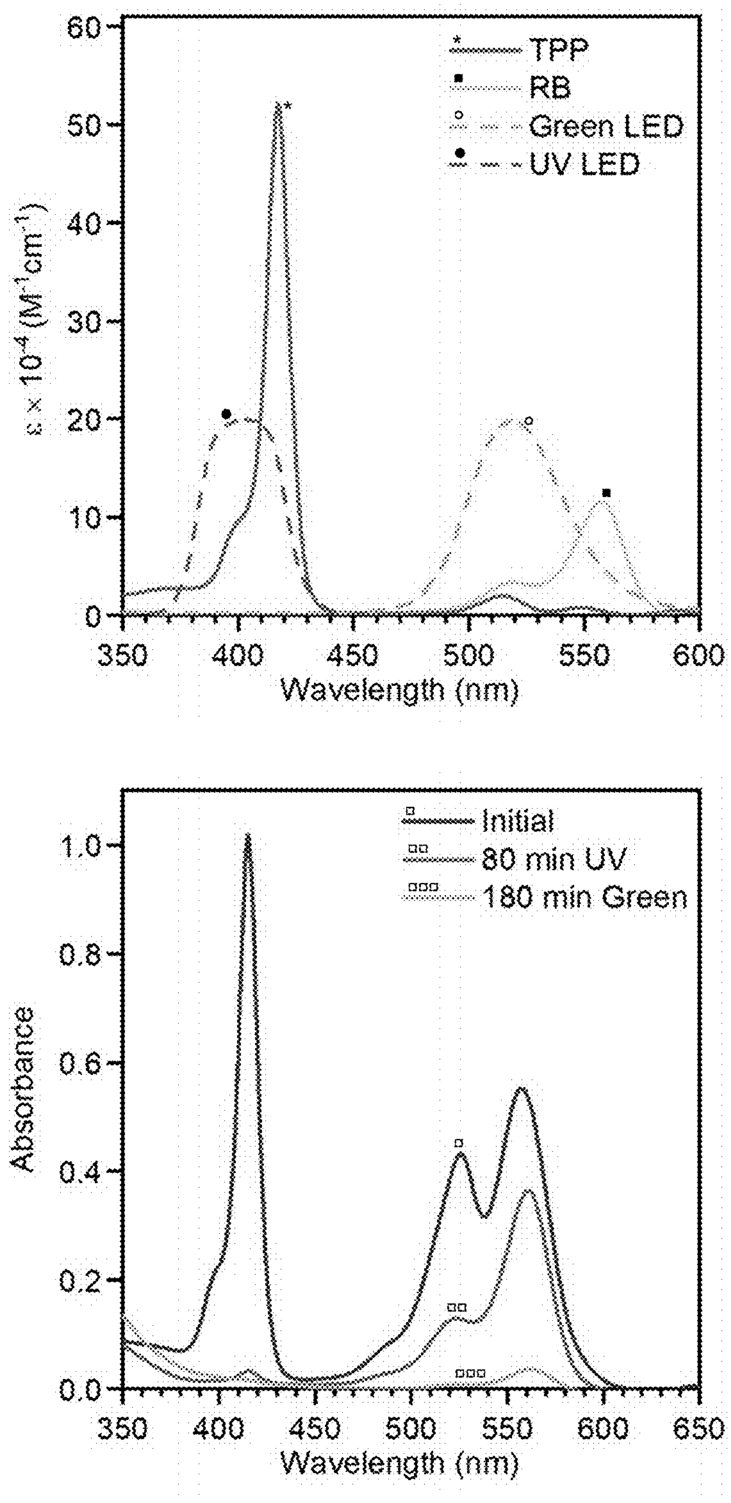
FIG. 43 shows absorbance spectra of Rose Bengal lactone (RB) and tetraphenylporphyrin (TPP) in methanol, and the measured spectral output of the green and UV LEDs used (upper); and absorbance spectra of a thin film of (7 wt % aminopropylmethylsiloxane)-dimethylsiloxane copolymer with 0.048 molar equivalents of RB covalently condensed onto the polymer chain (PRB) containing TPP before irradiation, and subsequently after UV then green light irradiation (lower).

In this Example (6-7 wt % aminopropylmethylsiloxane)-dimethylsiloxane copolymer (PDMS-$NH_2$) with 0.048 molar equivalents of Rose Bengal lactone (RB) covalently condensed onto the polymer chain (PRB) was used as the antimicrobial polymer and $^1O_2$ source respectively (Scheme 8). This system can be photo-cross-linked from a solvent-free liquid to an elastomeric solid using 530 nm light via $^1O_2$ oxidation of the primary amine functionalities into imine cross-links (Example 2). However, this process photo-bleaches the RB. To avoid this, tetraphenylporphyrin (TPP) as an orthogonal $^1O_2$ source (FIG. 43; upper) was used. Only TPP absorbs light in the UV region, while both TPP and RB absorb green light. In a thin film experiment TPP was selectively photo-bleached over RB using 405 nm irradiation followed by excitation and bleaching of RB using 530 nm light (FIG. 43; lower). UV irradiation excites and photodegrades TPP without fully degrading RB.

Scheme 8

Structure of Rose Bengal containing polymer (prepared from PDMS-$NH_2$ and 0.048 molar equivalents of RB) and TPP used in these experiments

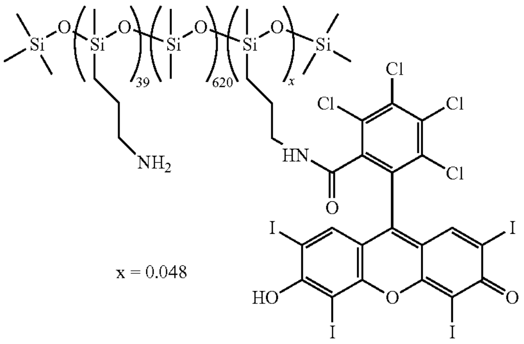

x = 0.048

PRB

+

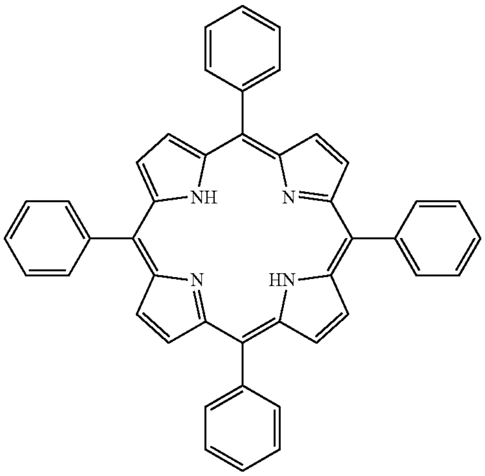

0.016 eqv.

TPP

Figure 44:
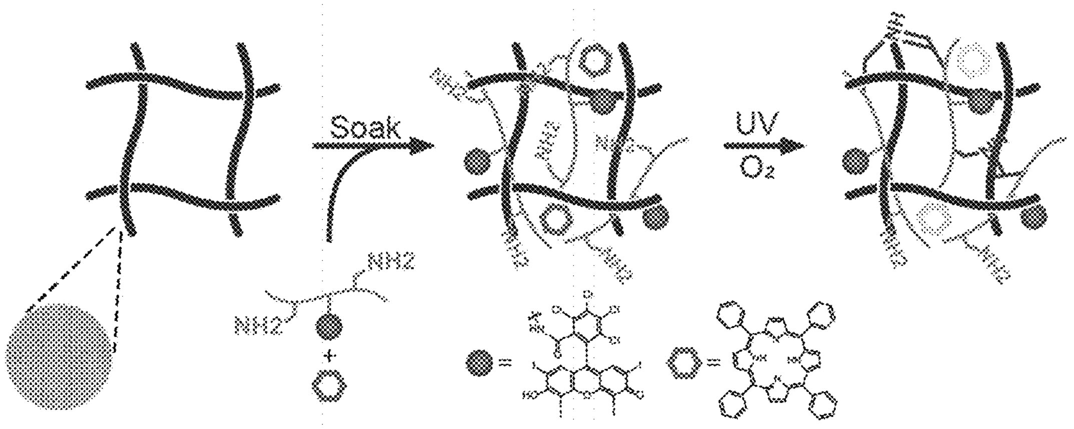
FIG. 44 shows a scheme of textile treatment using a solution soak followed by UV irradiation resulting in imine cross-links from TPP derived $^1O_2$.
Figure 45:
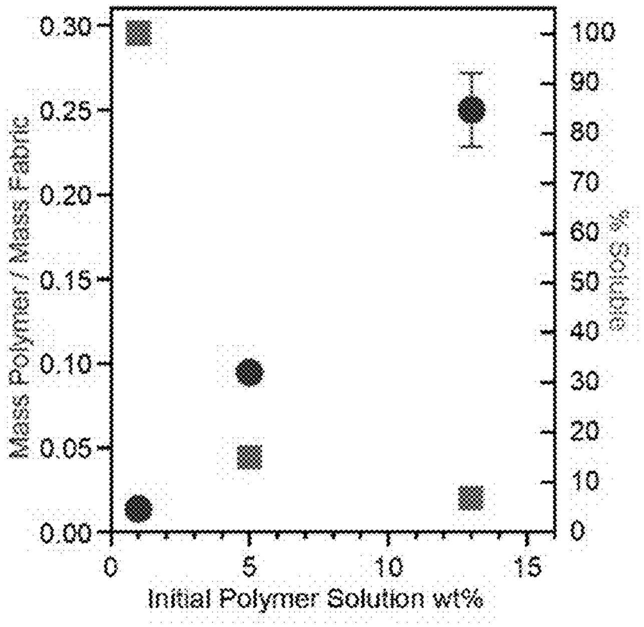
FIG. 45 shows a plot of polymer mass loading and unloading for cotton treated with different wt % polymer solutions, mass polymer/mass fabric (●) and % soluble (■) (upper); and water contact angles of cotton fabric prepared using different polymer wt % solutions, measured using 10 μL droplets (lower).
Figure 45:
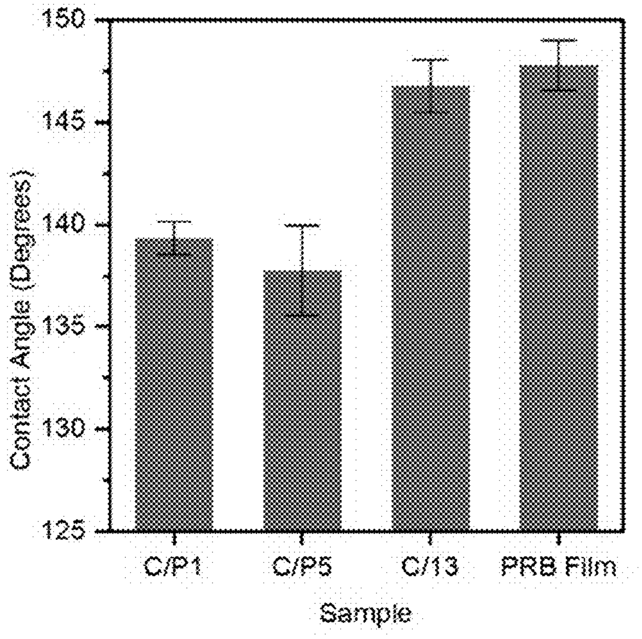
Figure 46:
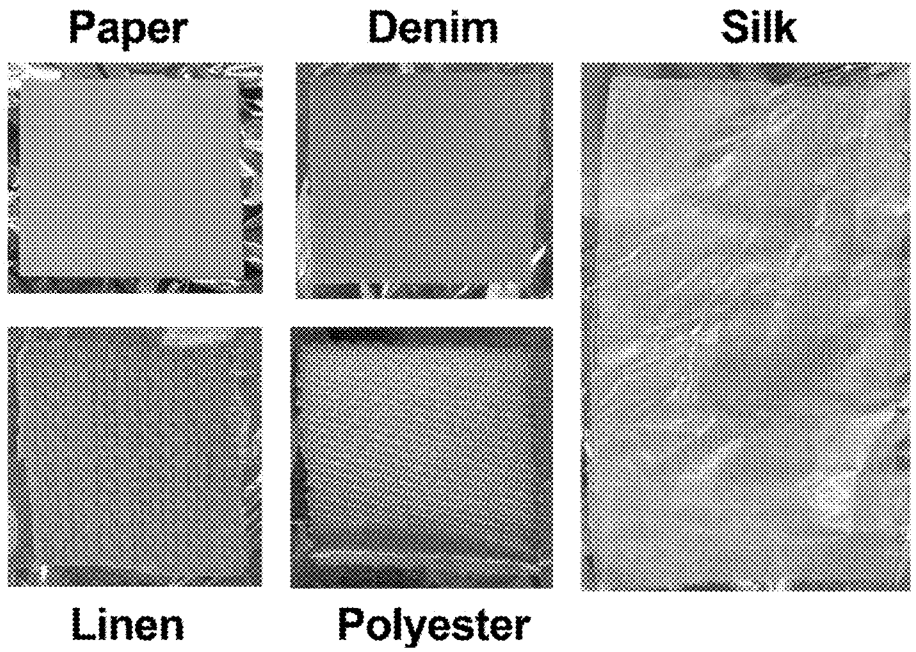
FIG. 46 shows photographs of materials soaked in PRB and TPP combined using toluene and diluted with tetrahydrofuran (THF) to afford a solution of 13% polymer weight (P13%) solution for 10 minutes followed by 30 minutes of 395 irradiation per side: paper (upper left); denim (upper center); linen (lower left); polyester (lower center); and silk (right).
Figure 47:
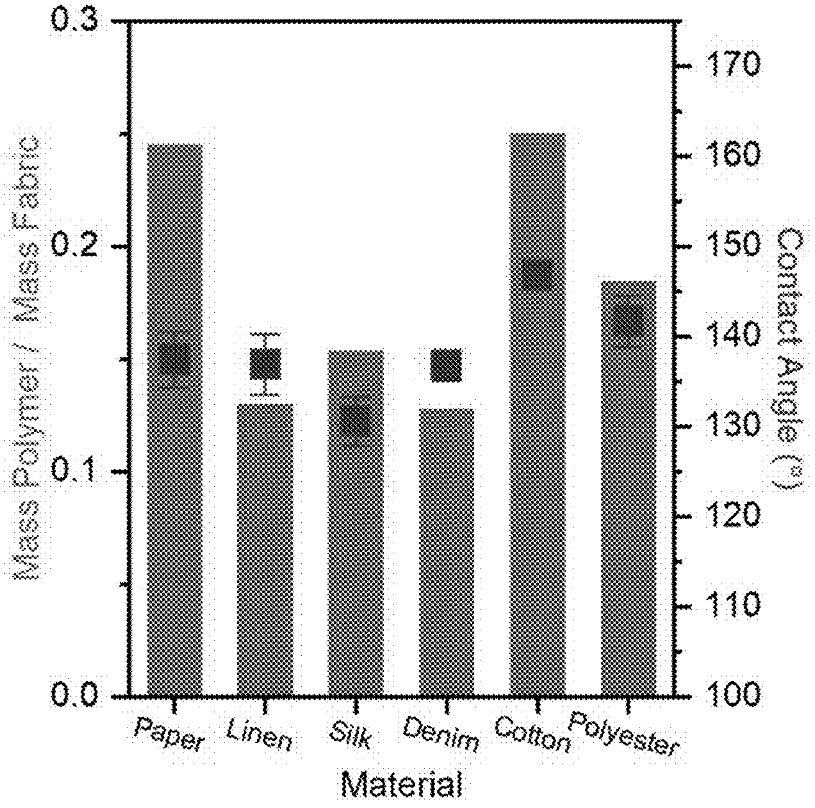
FIG. 47 shows the mass loading of P13% onto different materials (lighter columns) and the resulting water contact angles (darker columns) measured using 10 μL droplets.
Figure 48:
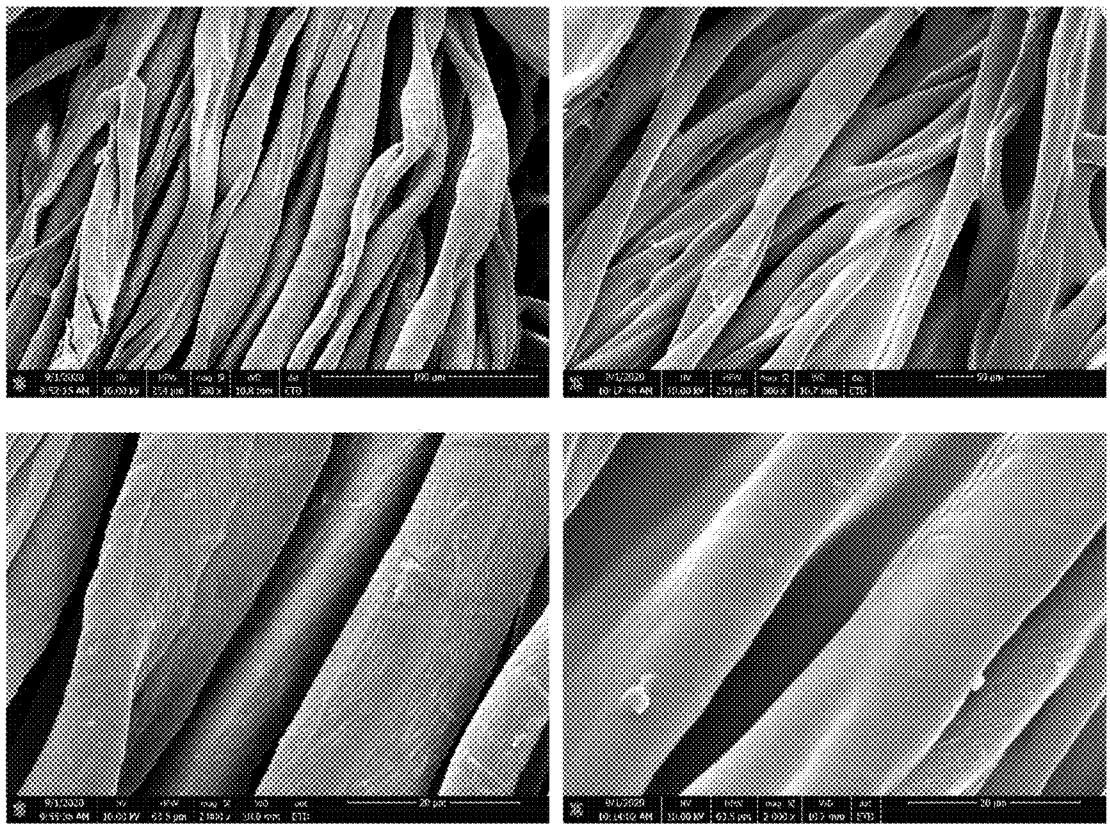
FIG. 48 shows scanning electron microscopy (SEM) images of untreated cotton (upper left, lower left) and cotton fabric soaked in a solution of P13% for 10 minutes followed by 30 minutes of 405 nm irradiation per side (C/13) (upper right, lower right) at 500× (top) and 2000× (bottom) magnification. Scale bars show 100 μm (upper left); 50 μm (upper right); and 20 μm (lower left and lower right).

Preparation and physical characterization: Textiles were treated using a room temperature soak procedure followed by 405 nm irradiation to fix the polymer into the fabric through $^1O_2$ cross-linking. PRB and TPP were combined using toluene and diluted with tetrahydrofuran (THF) to afford solutions of 1%, 5%, and 13% polymer weight %, denoted P1%, P5%, and P13% respectively. Cotton fabric was soaked in these solutions for ten minutes followed by 30 minutes of 405 nm irradiation per side open to air to afford samples C/1, C/5, and C/13 (FIG. 44). The mass of polymer on the fabric increased linearly with the polymer solution wt %, to a maximum of 0.24 grams PRB per gram of fabric for P13% (FIG. 45; upper). The change in mass of the loaded fabric after soaking in THF was used to determine the extent of polymer crosslinking and attachment to the fibers. At low mass loadings (P1%), and for samples that were not exposed to 405 nm light, >99% of the loaded polymer was soluble in THF, indicating a low degree of crosslinking (FIG. 45; upper). The % soluble decreased to 13% and 7% respectively for C/5 and C/13, demonstrating a greater crosslinking extent and interpenetration with the cotton fibers. C/13 soaked in water or simulated laundry detergent overnight showed no mass change after drying and no coloration of the supernatant. All coated samples became hydrophobic after treatment with the maximum contact angle of C/13 being 147±1° (FIG. 45; lower). The same procedure for P13% was used treat other natural and synthetic fibers including linen, polyester, denim, silk, and paper (FIG. 46). Mass loadings varied from 0.12 (denim) to 0.23 (paper) grams PRB per gram of material, attributed to differences in material morphology and porosity (FIG. 47). All coated materials were hydrophobic after treatment with water contact angles ranging from 131±2° (silk) to 142±3° (polyester) (FIG. 47). FIG. 48 shows scanning electron microscopy (SEM) images of untreated cotton (upper left, lower left) and C/13 (upper right, lower right) at 500× (top) and 2000× (bottom) magnification. Scale bars show 100 μm (upper left), 20 μm (lower left), 50 μm (upper right) and 20 μm (lower right).

Figure 49:
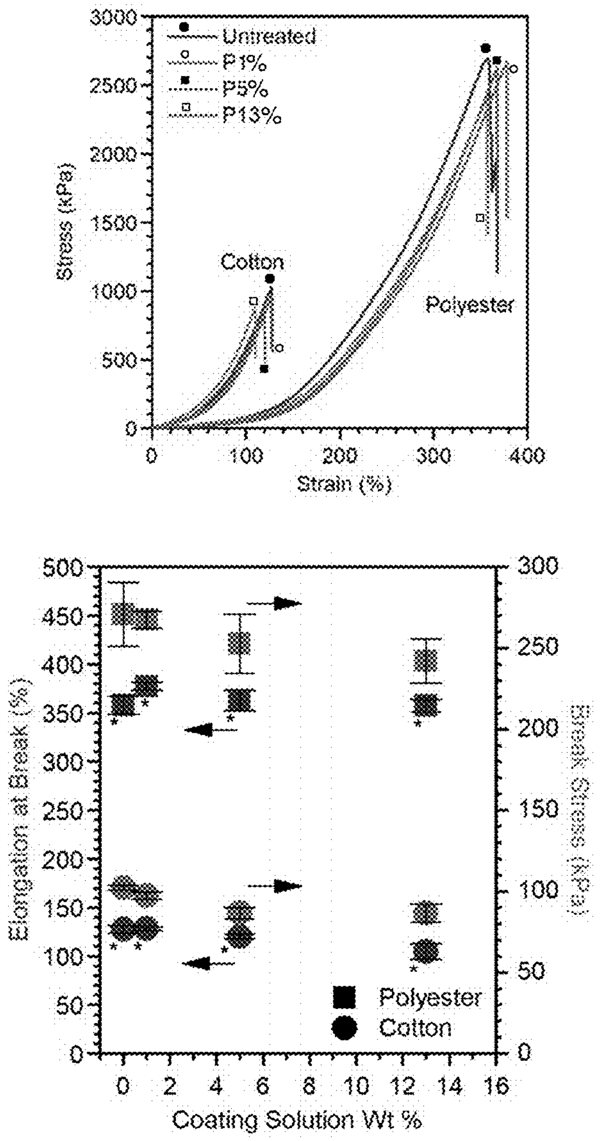
FIG. 49 shows representative stress-strain curves determined from Instron mechanical testing of cotton and polyester strips treated using % 1 (P1%), %5 (P5%), and 13% (P13%) polymer weight % of PRB and TPP in toluene diluted with tetrahydrofuran (THF) solutions in comparison to control, wherein samples were measured in triplicate at 20 cm/min (upper); and the elongation at break (*) and break stress determined from Instron mechanical testing of cotton and polyester strips treated using P1%, P5%, and P13% solutions, measured in triplicate at 20 cm/min
Figure 50:
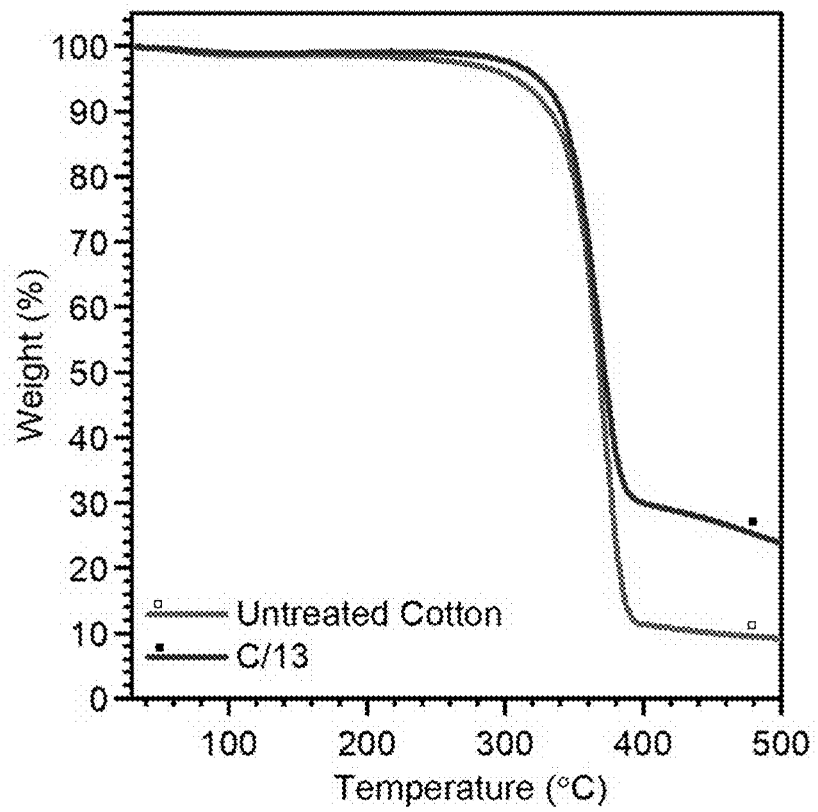
FIG. 50 shows TGA traces of untreated cotton and C/13 measured at 10° C./minute under $N_2$.

Mechanical characterization: The impacts of polymer coating on the mechanical properties of fabrics were tested for cotton and polyester, the most elastic textile used in these experiments. Strips were cut to a uniform size and coated using P1%, P5%, or P13% and their elongation at break and break stress determined using an Instron system in tensile mode (FIG. 49; upper). An 18% decrease in elongation at break (128±3% to 105±7%) and a 13% decrease in break stress (102±2 kPa to 87±5 kPa) were observed for the highest polymer loading on cotton (P13%), with only 1% decreases in both values for polyester treated with the same solution (FIG. 49; lower). Cross-linked PRB by itself has an elongation at break of 117±8% and a break stress of 550 kPa. Thermogravimetric analysis of C/13 compared with untreated cotton showed an increase in the onset temperature ($T_o$) of 14° C. from 304° C. to 320° C. respectively (FIG. 50). $T_o$ of crosslinked PRB is 423° C.

Figure 51:
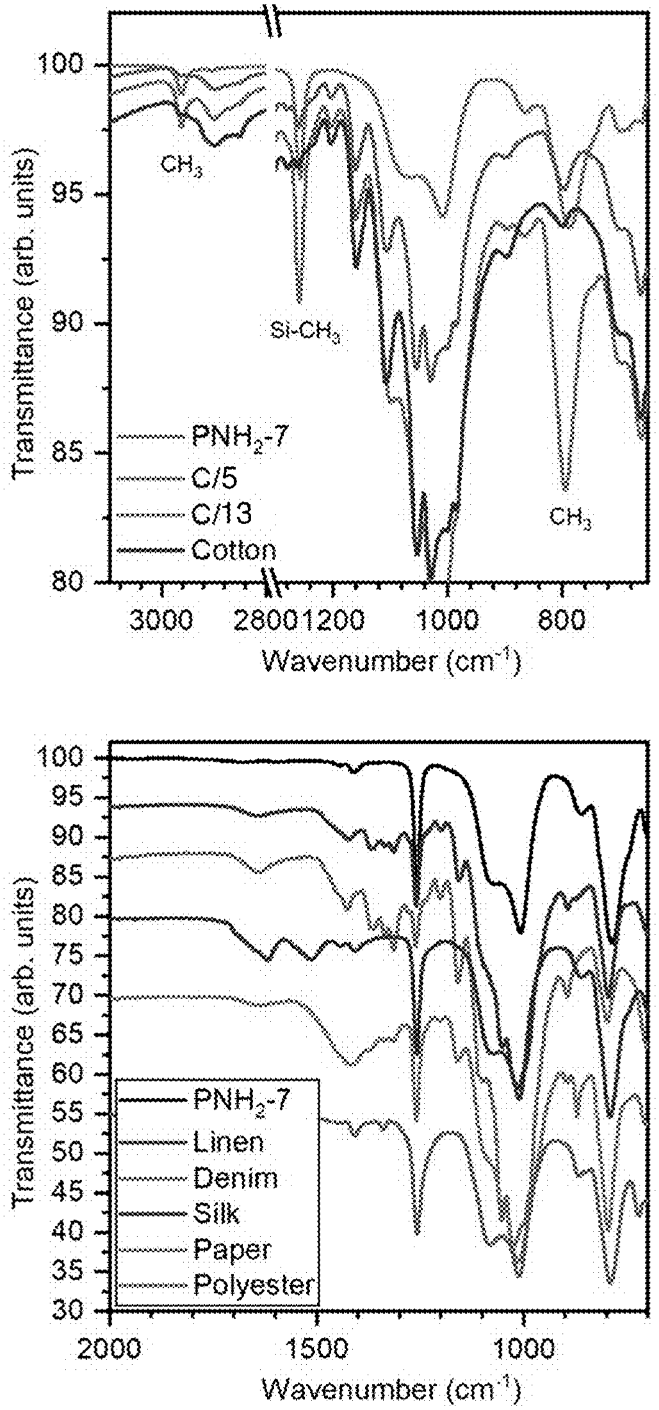
FIG. 51 shows FT-IR vibrational spectra of, from top to bottom: the non-cross-linked PDMS-$NH_2$, cotton fabric soaked in a solution of P5% for 10 minutes followed by 30 minutes of 405 nm irradiation per side (C/5), treated fabric sample C/13, and untreated cotton wherein peaks at 1258 $cm^{-1}$ and 793 $cm^{-1}$ are assigned to the Si—$CH_3$ and PDMS $CH_3$ vibrational modes respectively (upper); and FT-IR vibrational spectra of from top to bottom: the non-cross-linked PDMS-$NH_2$, linen treated with P13%, denim treated with P13%, silk treated with P13%, paper treated with P13% and polyester treated with P13% wherein all treated materials show peaks assigned to PDMS stretching frequencies (lower).
Figure 52:
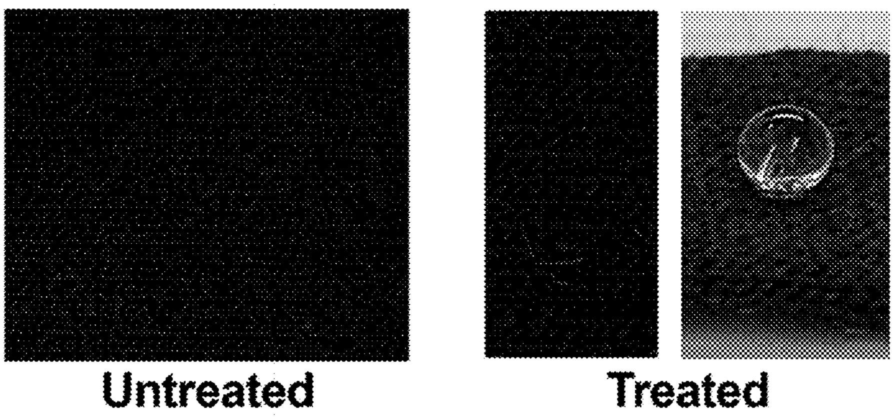
FIG. 52 shows photographs of black colored cotton untreated (left) and treated with P13% (right) showing no change in color.

Vibration and absorption measurements: FT-IR spectroscopy of treated samples showed new vibrational peaks at 1258 $cm^{-1}$ and 793 $cm^{-1}$ that correspond with the PDMS-$NH_2$ siloxane backbone (FIG. 51; upper). All other tested materials coated with P13% show the same vibrational peaks (FIG. 51; lower) The white cotton becomes pink after treatment owing to the RB. RB coated onto black colored cotton remains black owing to the transparency of the polymer (FIG. 52). A 10 μL drop of water shows a high contact angle on the treated fabric (FIG. 52; right image), while the untreated fabric wets fully (FIG. 52; left image).

Figure 53:
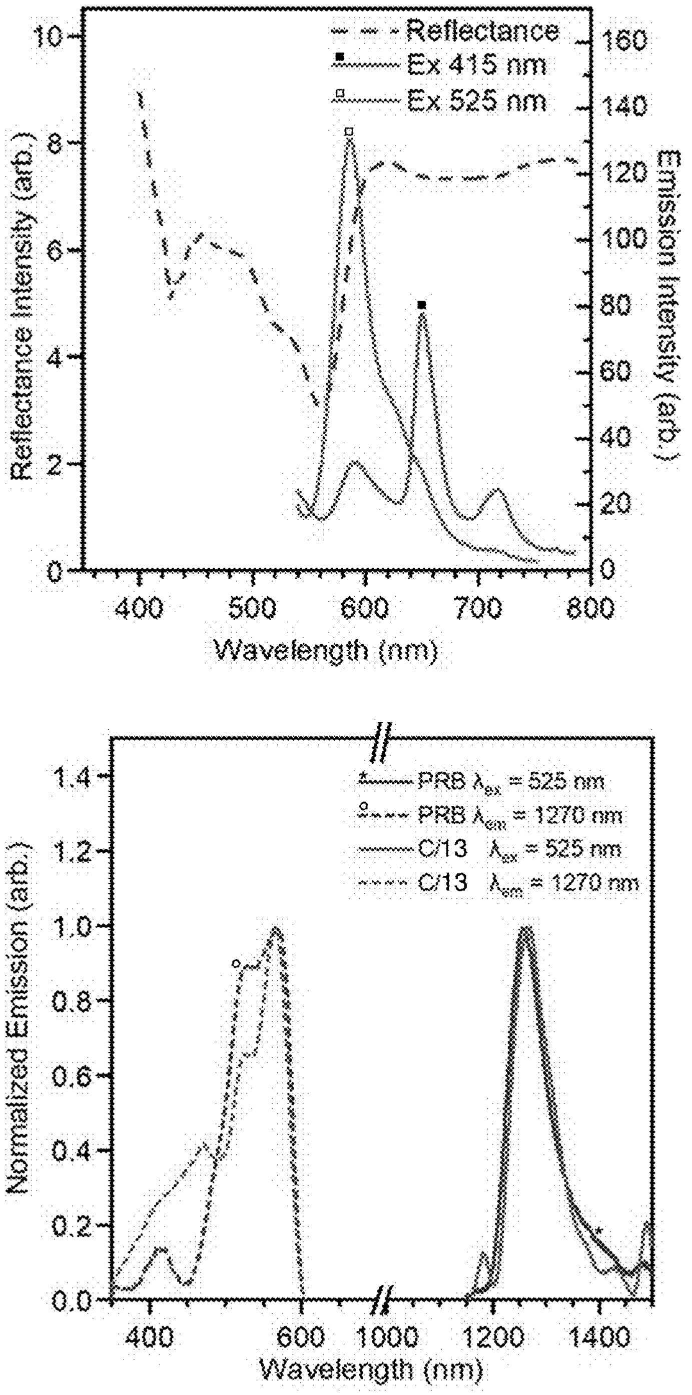
FIG. 53 shows reflectance and emission spectra of C/13 (upper); and IR emission and excitation spectra of a thin film of crosslinked PRB and treated C/13 (lower). $^1O_2$ phosphorescence at 1270 nm is observed for both materials as a result of RB excitation at 525 nm.

The transmittance spectrum of C/13 shows two peaks at 525 and 415 nm attributed to the absorbance of RBL and TPP respectively (FIG. 53; upper, FIG. 43; upper). Excitation at these wavelengths results in emission spectra characteristic of RBL and TPP, revealing that TPP is not fully photobleached during cross-linking and that both chromophores remain photoactive in the treated textiles (FIG. 53; upper). $^1O_2$ exhibits characteristic phosphorescence centered at 1270 nm. The IR emission spectra of a thin film of crosslinked PRB and treated C/13 were collected and both exhibit emission at 1270 nm when excited at 525 nm (FIG. 53; lower).

Figure 54:
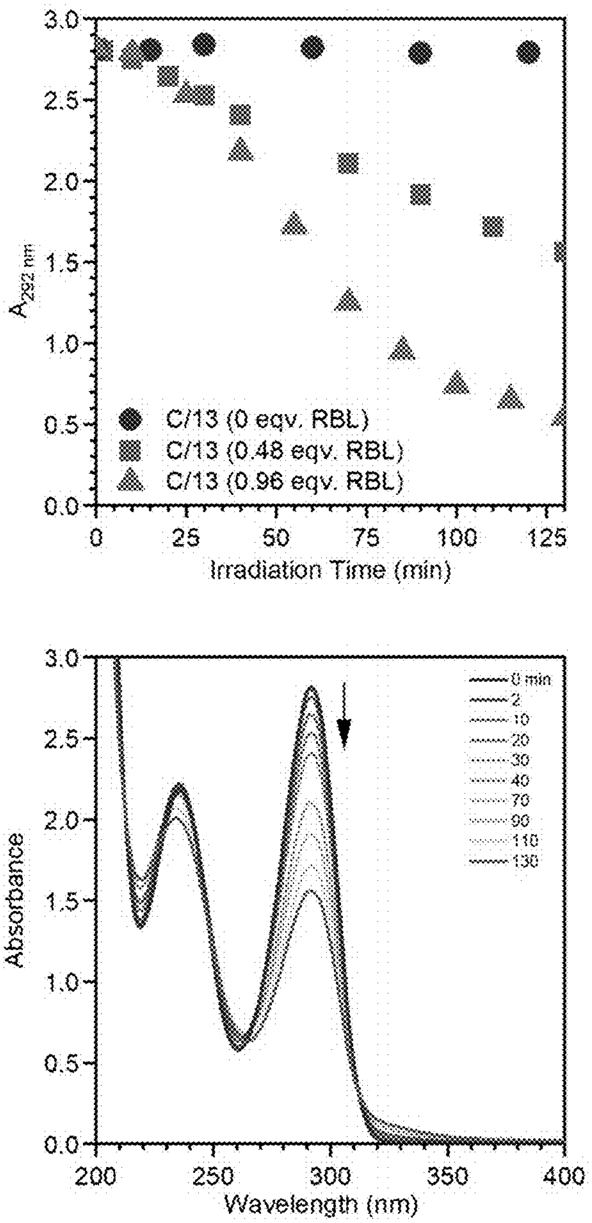
FIG. 54 shows absorbance at 292 nm of a 3 mL $2\times10^{-4}$ M solution of uric acid in a 0.02 M phosphate buffer containing 20 mg C/13 fabric samples of varying RB molar equivalents wherein the cuvettes were irradiated using 15 W 530 nm LED from a distance of 4 cm (upper); and absorbance spectra collected during the photooxidative degradation of uric acid using C/13 cotton samples at 0.048 molar equivalents of RB (lower).

Substrate Oxidation: To further assess the $^1O_2$ generating capabilities of the treated textiles, an experiment was performed monitoring the oxidative degradation of uric acid using UV-VIS spectroscopy. $^1O_2$ decomposes uric acid beginning with a conversion to parabonic acid, resulting in a decrease in the absorbance at 292 nm. A static cuvette containing C/13 and the aqueous uric acid solution was irradiated using 530 nm light and the change in absorbance measured as a function of irradiation time (FIG. 54). The initial uric acid concentration was $2\times10^{-4}$ M in 0.02 M phosphate buffer. Fabric mass was 20 mg for a 3 mL solution. The sample was irradiated using 15 W 530 nm LED from a distance of 4 cm. A 55% decrease in the absorbance at 292 nm was observed after 130 minutes of irradiation. A control sample of C/13 prepared without RB showed no decrease in absorbance on irradiation while a sample with twice the RB molar equivalence had an 81% decrease in absorbance after 130 minutes. No absorbance above 375 nm was observed during these experiments, indicating that RB was not released into solution and remained attached to the fabric. These results indicate that $^1O_2$ can be generated from the treated fabric in sufficient quantities to oxidize dissolved or suspended molecules despite the diffusion distance of $^1O_2$ being on the order of hundreds of nanometers. While RB has high selectively for producing $^1O_2$ over other reactive oxygen species (Type I), the diffusion distances suggested by this experiment, while not wishing to be limited by theory, may indicate the formation of subsequent reactive species such as peroxides or hydroxyl radicals resulting from aqueous quenching of $^1O_2$ (Type II).

Figure 55:
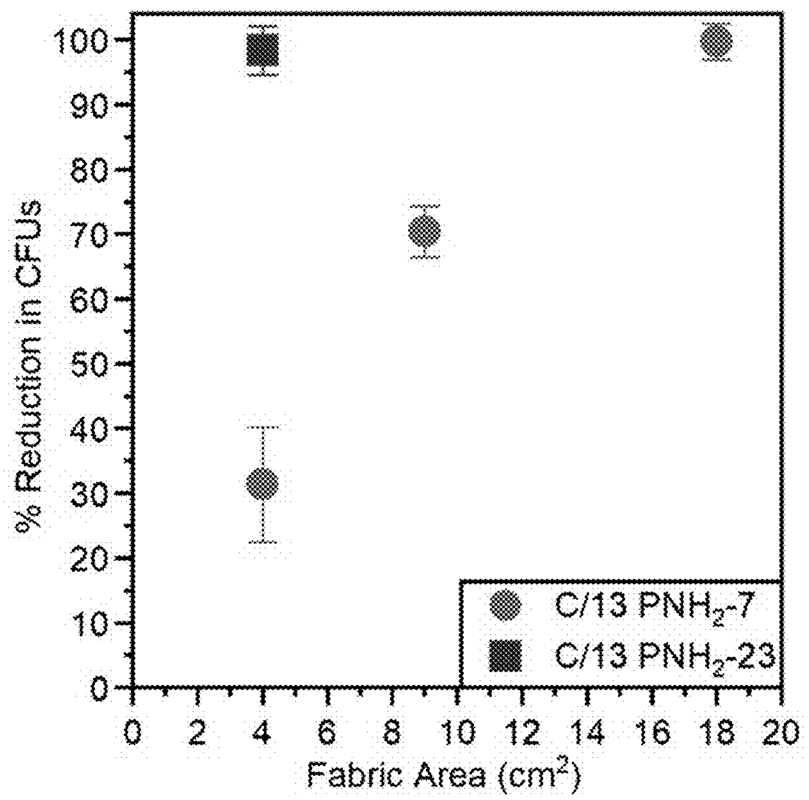
FIG. 55 shows the reduction in *E. coli* colony-forming units (CFUs) after 24 hours of 37° C. incubation in the dark with different size samples of C/13 as measured using colony counts on agar after 24 hours growth time. Initial bacterial concentration was $10^5$ bacteria/mL using a volume of 10 mL for all samples. Experiments performed in triplicate.
Figure 56:
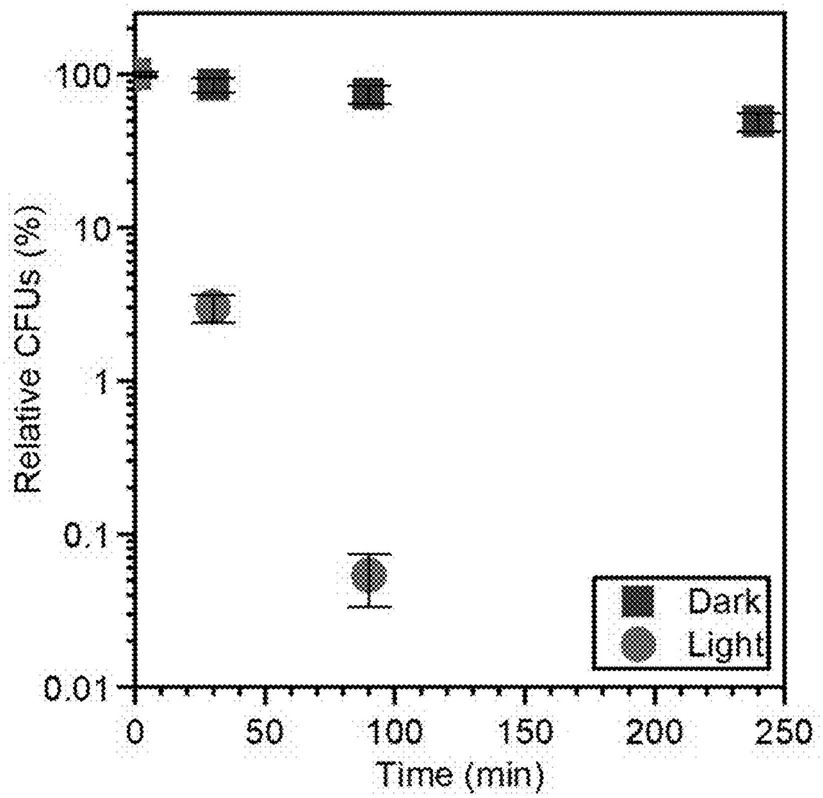
FIG. 56 shows the antibacterial activity of C/13 measured in the dark and under constant 530 nm irradiation at room temperature, assessed using the relative number of *E. coli* CFUs after aliquots were drawn at set time intervals and grown on agar plates for 24 hours. Experiments performed in triplicate.

Contact Antimicrobial Activity: $^1O_2$ crosslinked PDMS-$NH_2$ exhibits contact antimicrobial activity against mammalian cells as well as increased efficacy versus *E. coli* compared to MRSA (Example 2). Initially for this study of coated textiles the antimicrobial activity versus *E. Coli* in the dark was investigated, examining only the passive activity of the primary amine functionalities. Coated fabric samples of C/13 were cut to different sizes and challenged with a fixed concentration suspension of *E. Coli* under dynamic shaking conditions overnight at 37° C., followed by dilution and plating onto agar to compare the number of colony forming units (CFUs) against a control with no added fabric (FIG. 55). A 31±8% decrease was observed for a 4 $cm^2$ sample, increasing to 99±2% decrease for 18 $cm^2$. Owing to the heterogenous nature of the samples and dynamic agitation during incubation, a larger surface area is expected to increase the frequency of polymer-bacteria contact and result in the greater decrease in CFUs as observed. To confirm that this antibacterial activity is a result of the primary amine groups, (23 wt % aminopropylmethylsiloxane)-dimethylsiloxane copolymer ($PNH_2$-23) was prepared in an analogous fashion to PDMS-$NH_2$ and coated onto cotton. A 4 $cm^2$ sample of this material resulted in a 98±3% reduction in CFUs, a 3 times greater decrease than for PDMS-$NH_2$. These results demonstrate the passive antimicrobial activity of the treated textiles resulting from the cross-linked amine containing polymer.

aPDI Studies: Antimicrobial experiments performed in the dark can interrogate selectively the passive contact killing effect of the amine groups, but aPDI from the photo-generated $^1O_2$ cannot be isolated from the passive effect. Time-dependent experiments were run in tandem for C/13, irradiating one set of samples with 530 nm light (passive and active effects) while others remained in the dark (passive only). Aliquots were drawn and diluted, and the relative number of CFUs at a given time were compared between the light and dark samples (FIG. 56). A 15±9% decrease (dark) compared with a 97.0±0.6% decrease (light) in CFUs relative to t=0 after 30 minutes, a 6.5× increase in disinfection rate, demonstrates C/13 has strong aPDI activity with a greater rate than the passive amine contact killing. No CFUs were observed for the irradiated samples at t=240 min, while the dark samples had a decrease in CFUs of 51±7% versus t=0 min.

While the disclosure has been described with reference to what are presently considered to be the preferred examples, it is to be understood that the disclosure is not limited to the disclosed examples. To the contrary, the present disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

FULL CITATIONS FOR DOCUMENTS REFERRED TO IN THE DESCRIPTION

[1] (a) De Jong, J.; Lammertink, R. G. H.; Wessling, M. Membranes and microfluidics: A review. Lab Chip 2006, 6, 1125-1139; (b) Mokkaphan, J.; Banlunara, W.; Palaga, T.; Sombuntham, P.; Wanichwecharungruang, S. Silicone surface with drug nanodepots for medical devices. ACS Appl. Mater. Interfaces 2014, 6, 20188-20196.

[2] (a) Jellali, R.; Alexandre, M.; Jérôme, C. Photosensitive polydimethylsiloxane networks for adjustable-patterned films. Polym. Chem. 2017, 8, 2499-2508; (b) Jothimuthu, P.; Carroll, A.; Bhagat, A. A. S.; Lin, G.; Mark, J. E.; Papautsky, I. Photodefinable PDMS thin films for microfabrication applications. J. Micromech. Microeng. 2009, 19, 045024; (c) Schaffner, M.; Faber, J. A.; Pianegonda, L.; Ruhs, P. A.; Coulter, F.; Studart, A. R. 3D printing of robotic soft actuators with programmable bioinspired architectures. Nat. Commun. 2018, 9, 878.

[3] (a) Zeng, H.; Martella, D.; Wasylczyk, P.; Cerretti, G.; Lavocat, J. C. G.; Ho, C. H.; Parmeggiani, C.; Wiersma, D. S. High-resolution 3d direct laser writing for liquid-crystalline elastomer microstructures. Adv. Mater. 2014, 26, 2319-2322; (b) Credi, C.; Fiorese, A.; Tironi, M.; Bernasconi, R.; Magagnin, L.; Levi, M.; Turri, S. 3D Printing of Cantilever-Type Microstructures by Stereolithography of Ferromagnetic Photopolymers. ACS Appl. Mater. Interfaces 2016, 8, 26332-26342.

[4] (a) Layani, M.; Wang, X.; Magdassi, S. Novel Materials for 3D Printing by Photopolymerization. Adv. Mater. 2018, 30, 1706344; (b) Pekkanen, A. M.; Mondschein, R. J.; Williams, C. B.; Long, T. E. 3D Printing Polymers with Supramolecular Functionality for Biological Applications. Biomacromolecules 2017, 18, 2669-2687; (c) Lee, J. Y.; An, J.; Chua, C. K. Fundamentals and applications of 3D printing for novel materials. Appl. Mater. Today 2017, 7, 120-133.

[5] Bhattacharjee, N.; Parra-Cabrera, C.; Kim, Y. T.; Kuo, A. P.; Folch, A. Desktop-Stereolithography 3D-Printing of a Poly(dimethylsiloxane)-Based Material with Sylgard-184 Properties. Adv. Mater. 2018, 30, 1-7.

[6] Lowe, A. B. Thiol-ene "click" reactions and recent applications in polymer and materials synthesis: A first update. Polym. Chem. 2014, 5, 4820.

[7] Schwartz, J. J.; Boydston, A. J. Multimaterial actinic spatial control 3D and 4D printing. Nat. Commun. 2019, 10, 791.

[8] DeRosa, M. C.; Crutchley, R. J. Photosensitized singlet oxygen and its applications. Coord. Chem. Rev. 2002, 233-234, 351-371.

[9] (a) Ge, J.; Lan, M.; Zhou, B.; Liu, W.; Guo, L.; Wang, H.; Jia, Q.; Niu, G.; Huang, X.; Zhou, H.; Meng, X.; Wang, P.; Lee, C. S.; Zhang, W.; Han, X. A graphene quantum dot photodynamic therapy agent with high singlet oxygen generation. Nat. Commun. 2014, 5, 4596; (b) Turan, I. S.; Yildiz, D.; Turksoy, A.; Gunaydin, G.; Akkaya, E. U. A Bifunctional Photosensitizer for Enhanced Fractional Photodynamic Therapy: Singlet Oxygen Generation in the Presence and Absence of Light. Angew. Chem. Int. Ed. 2016, 55, 2875-2878; (c) Tian, X.; Gao, P.; Nie, Y.; Yang, C.; Zhou, Z.; Li, Y.; Wang, Y. A novel singlet oxygen involved peroxymonosulfate activation mechanism for degradation of ofloxacin and phenol in water. Chem. Commun. 2017, 53, 6589-6592; (d) Chen, B.; Wang, L.; Gao, S. Recent Advances in Aerobic Oxidation of Alcohols and Amines to Imines. ACS Catal. 2015, 5, 5851-5876.

[10] (a) Op De Beeck, M.; Madder, A. Sequence specific DNA cross-linking triggered by visible light. J. Am. Chem. Soc. 2012, 134, 10737-107490; (b) Schmidt, M. J.; Summerer, D. Red-light-controlled protein-RNA crosslinking with a genetically encoded furan. Angew. Chem. Int. Ed. 2013, 52, 4690-4693.

[11] Son, T. II; Sakuragi, M.; Takahashi, S.; Obuse, S.; Kang, J.; Fujishiro, M.; Matsushita, H.; Gong, J.; Shimizu, S.; Tajima, Y.; Yoshida, Y.; Suzuki, K.; Yamamoto, T.; Nakamura, M.; Ito, Y. Visible light-induced crosslinkable gelatin. Acta Biomater. 2010, 6, 4005-4010.

[12] (a) Jothimuthu, P.; Carroll, A.; Bhagat, A. A. S.; Lin, G.; Mark, J. E.; Papautsky, I. Photodefinable PDMS thin films for microfabrication applications. J. Micromech. Microeng. 2009, 19, 045024; (b) Bhattacharjee, N.; Parra-Cabrera, C.; Kim, Y. T.; Kuo, A. P.; Folch, A. Desktop-Stereolithography 3D-Printing of a Poly (dimethylsiloxane)-Based Material with Sylgard-184 Properties. Adv. Mater. 2018, 30, 1-7; (c) Schaffner, M.; Faber, J. A.; Pianegonda, L.; Ruhs, P. A.; Coulter, F.; Studart, A. R. 3D printing of robotic soft actuators with programmable bioinspired architectures. Nat. Commun. 2018, 9, 878.

[13] (a) Wang, X.; Maeda, K.; Thomas, A.; Takanabe, K.; Xin, G.; Carlsson, J. M.; Domen, K.; Antonietti, M. A metal-free polymeric photocatalyst for hydrogen production from water under visible light. Nat. Mater. 2009, 8, 76-80; (b) Jiang, J. X.; Li, Y.; Wu, X.; Xiao, J.; Adams, D. J.; Cooper, A. I. Conjugated microporous polymers with rose bengal dye for highly efficient heterogeneous organo-photocatalysis. Macromolecules 2013, 46, 8779-8783; (c) Ding, X.; Han, B. H. Metallophthalocyanine-based conjugated microporous polymers as highly efficient photosensitizers for singlet oxygen generation. Angew. Chem. Int. Ed. 2015, 54, 6536-6539; (d) Beltrán, A.; Mikhailov, M.; Sokolov, M. N.; Perez-Laguna, V.; Rezusta, A.; Revillo, M. J.; Galindo, F. A photobleaching resistant polymer supported hexanuclear molybdenum iodide cluster for photocatalytic oxygenations and photodynamic inactivation of: *Staphylococcus aureus*. J. Mater. Chem. B 2016, 4, 5975-5979; (e) Han, X.; Bourne, R. A.; Poliakoff, M.; George, M. W. Immobilised photosensitisers for continuous flow reactions of singlet oxygen in supercritical carbon dioxide. Chem. Sci. 2011, 2, 1059-1067.

[14] (a) Buehmeiser, M. R. Polymer-supported well-defined metathesis catalysts. Chem. Rev. 2009, 109, 303-321; (b) Lu, J.; Toy, P. H. Organic polymer supports for synthesis and for reagent and catalyst immobilization. Chem. Rev. 2009, 109, 815-838.

[15] (a) Davies, M. J. Singlet oxygen-mediated damage to proteins and its consequences. Biochem. Biophys. Res. Commun. 2003, 305, 761-770; (b) Gracanin, M.; Hawkins, C. L.; Pattison, D. I.; Davies, M. J. Singlet-oxygen-mediated amino acid and protein oxidation: Formation of tryptophan peroxides and decomposition products. Free Radic. Biol. Med. 2009, 47, 92-102; (c) Khan, A. U.; Mei, Y. H.; Wilson, T. A proposed function for spermine and spermidine: Protection of replicating DNA against damage by singlet oxygen. Proc. Natl. Acad. Sci. U.S.A 1992, 89, 11426-11427.

[16] Chen, B.; Wang, L.; Gao, S. Recent Advances in Aerobic Oxidation of Alcohols and Amines to Imines. ACS Catal. 2015, 5, 5851-5876.

[17] (a) Aguirre-Diaz, L. M.; Snejko, N.; Iglesias, M.; Sánchez, F.; Gutiérrez-Puebla, E.; Monge, M. A. Efficient Rare-Earth-Based Coordination Polymers as Green Photocatalysts for the Synthesis of Imines at Room Temperature. Inorg. Chem. 2018, 57, 6883-6892; (b) Berlicka, A.; König, B. Porphycene-mediated photooxidation of benzylamines by visible light. Photochem. Photobiol. Sci. 2010, 9, 1359-1366; (c) Jin, J.; Yang, C.; Zhang, B.; Deng, K. Selective oxidation of amines using $O_2$ catalyzed by cobalt thioporphyrazine under visible light. J. Catal. 2018, 361, 33-39.

[18] (a) Taynton, P.; Yu, K.; Shoemaker, R. K.; Jin, Y.; Qi, H. J.; Zhang, W. Heat- or water-driven malleability in a highly recyclable covalent network polymer. Adv. Mater. 2014, 26, 3938-3942; (b) Zhu, C.; Xi, C.; Doro, W.; Wang, T.; Zhang, X.; Jin, Y.; Zhang, W. Tuning the physical properties of malleable and recyclable polyimine thermosets: The effect of solvent and monomer concentration. RSC Adv. 2017, 7, 48303-48307.

[19] (a) Chmura, A. J.; Davidson, M. G.; Frankis, C. J.; Jones, M. D.; Lunn, M. D. Highly active and stereoselective zirconium and hafnium alkoxide initiators for solvent-free ring-opening polymerization of rac-lactide. Chem. Commun. 2008, 944, 1293-1295; (b) Liu, X.; Zhang, L.; Cheng, Z.; Zhu, X. Straightforward catalyst/solvent-free iodine-mediated living radical polymerization of functional monomers driven by visible light irradiation. Chem. Commun. 2016, 52, 10850-10853; (c) Kumar, A.; Singh, R.; Gopinathan, S. P.; Kumar, A. Solvent free chemical oxidative polymerization as a universal method for the synthesis of ultra high molecular weight conjugated polymers based on 3,4-propylenedioxythiophenes. Chem. Commun. 2012, 48, 4905-4907.

[20] (a) Mülhaupt, R. Green polymer chemistry and bio-based plastics: Dreams and reality. Macromol. Chem. Phys. 2013, 214, 159-174; (b) Lee, K. W.; Chung, J. W.; Kwak, S. Y. Highly Branched Polycaprolactone/Glycidol Copolymeric Green Plasticizer by One-Pot Solvent-Free Polymerization. ACS Sustain. Chem. Eng. 2018, 6, 9006-9017.

[21] (a) Jansen, J. F. G. A.; Dias, A. A.; Dorschu, M.; Coussens, B. Fast monomers: Factors affecting the inherent reactivity of acrylate monomers in photoinitiated acrylate polymerization. Macromolecules 2003, 36, 3861-3873; (b) Dadashi-Silab, S.; Atilla Tasdelen, M.; Yagci, Y. Photoinitiated atom transfer radical polymerization: Current status and future perspectives. J. Polym. Sci. Part A Polym. Chem. 2014, 52, 2878-2888; (c) Xiao, P.; Zhang, J.; Campolo, D.; Dumur, F.; Gigmes, D.; Fouassier, J. P.; Lalevee, J. Copper and iron complexes as visible-light-sensitive photoinitiators of polymerization. J. Polym. Sci. Part A Polym. Chem. 2015, 53, 2673-2684.

[22] (a) Wright, T.; Tomkovic, T.; Hatzikiriakos, S. G.; Wolf, M. O. Photoactivated Healable Vitrimeric Copolymers. Macromolecules 2019, 52, 36-42; (b) Van Damme, J; Van Den Berg, O.; Brancart, J.; Vlaminck, L.; Huyck, C.; Assche, G. Van; Mele, B. Van; Prez, F. Du. Anthracene-Based Thiol-Ene Networks with Thermo-Degradable and Photo-Reversible Properties. Macromolecules 2017, 50, 1930-1938; (c) Tamate, R.; Ueki, T.; Kitazawa, Y.; Kuzunuki, M.; Watanabe, M.; Akimoto, A. M.; Yoshida, R. Photo-Dimerization Induced Dynamic Viscoelastic Changes in ABA Triblock Copolymer-Based Hydrogels for 3D Cell Culture. Chem. Mater. 2016, 28, 6401-6408.

[23] (a) Liu, M.; Ishida, Y.; Ebina, Y.; Sasaki, T.; Aida, T. Photolatently modulable hydrogels using unilamellar titania nanosheets as photocatalytic crosslinkers. Nat. Commun. 2013, 4, 2029; (b) Chen, K.; Deng, X.; Dodekatos, G.; Tiiysiiz, H. Photocatalytic Polymerization of 3,4-Ethylenedioxythiophene over Cesium Lead Iodide Perovskite Quantum Dots. J. Am. Chem. Soc. 2017, 139, 12267-12273.

[24] (a) Dolmans, D. E. J. G. J.; Fukumura, D.; Jain, R. K. Photodynamic therapy for cancer. Nat. Rev. Cancer 2003, 3, 380-387; (b) Pellosi, D. S.; Estevão, B. M.; Semensato, J.; Severino, D.; Baptista, M. S.; Politi, M. J.; Hioka, N.; Caetano, W. Photophysical properties and interactions of xanthene dyes in aqueous micelles. J. Photochem. Photobiol. A 2012, 247, 8-15.

[25] (a) Lebed, A. V.; Biryukov, A. V.; McHedlov-Petrossyan, N. O. A quantum-chemical study of tautomeric equilibria of fluorescein dyes in DMSO. Chem. Heterocycl. Compd. 2014, 50, 336-348; (b) Vodolazkaya, N. A.; Gurina, Y. A.; Salamanova, N. V.; Mchedlov-Petrossyan, N. O. Spectroscopic study of acid-base ionization and tautomerism of fluorescein dyes in direct microemulsions at high bulk ionic strength. J. Mol. Liq. 2009, 145, 1888-196.

[26] Hasegawa, T.; Kondo, Y.; Koizumi, Y.; Sugiyama, T.; Takeda, A.; Ito, S.; Hamada, F. A highly sensitive probe detecting low pH area of HeLa cells based on rhodamine B modified [3-cyclodextrins. Bioorganic Med. Chem. 2009, 17, 6015-6019.

[27] (a) Marks, L. R.; Reddinger, R. M.; Hakansson, A. P. Biofilm formation enhances fomite survival of *Streptococcus pneumoniae* and *Streptococcus pyogenes*. Infect. Immun. 2014, 82, 1141-1146; (b) Bryant, J. M.; Grogono, D. M.; Rodriguez-Rincon, D.; Everall, I.; Brown, K. P.; Moreno, P.; Verma, D.; Hill, E.; Drijkoningen, J.; Gilligan, P.; Esther, C. R.; Noone, P. G.; Giddings, O.; Bell, S. C.; Thomson, R.; Wainwright, C. E.; Coulter, C.; Pandey, S.; Wood, M. E.; Stockwell, R. E.; Ramsay, K. A.; Sherrard, L. J.; Kidd, T. J.; Jabbour, N.; Johnson, G. R.; Knibbs, L. D.; Morawska, L.; Sly, P. D.; Jones, A.; Bilton, D.; Laurenson, I.; Ruddy, M.; Bourke, S.; Bowler, I. C. J. W.; Chapman, S. J.; Clayton, A.; Cullen, M.; Dempsey, O.; Denton, M.; Desai, M.; Drew, R. J.; Edenborough, F.; Evans, J.; Folb, J.; Daniels, T.; Humphrey, H.; Isalska, B.; Jensen-Fangel, S.; Jönsson, B.; Jones, A. M.; Katzenstein, T. L.; Lillebaek, T.; MacGregor, G.; Mayell, S.; Millar, M.; Modha, D.; Nash, E. F.; O'Brien, C.; O'Brien, D.;

Ohri, C.; Pao, C. S.; Peckham, D.; Perrin, F.; Perry, A.; Pressler, T.; Prtak, L.; Qvist, T.; Robb, A.; Rodgers, H.; Schaffer, K.; Shafi, N.; Van Ingen, J.; Walshaw, M.; Watson, D.; West, N.; Whitehouse, J.; Haworth, C. S.; Harris, S. R.; Ordway, D.; Parkhill, J.; Andres Floto, R. Emergence and spread of a humantransmissible multi-drug-resistant nontuberculous mycobacterium. Science 2016, 354, 751-757.

[28] (a) Weber, D. J.; Rutala, W. A.; Miller, M. B.; Huslage, K.; Sickbert-Bennett, E. Role of hospital surfaces in the transmission of emerging health care-associated pathogens: Norovirus, *Clostridium difficile*, and *Acinetobacter* species. Am. J. Infect. Control 2010, 38, 25-33; (b) Klevens, R. M.; Edwards, J. R.; Richards, C. L.; Horan, T. C.; Gaynes, R. P.; Pollock, D. A.; Cardo, D. M. Estimating health care-associated infections and deaths in U.S. Hospitals, 2002. Public Health Rep. 2007, 122, 160-166.

[29] (a) Xu, C.; Akakuru, O. U.; Ma, X.; Zheng, J.; Zheng, J.; Wu, A. Nanoparticle-Based Wound Dressing: Recent Progress in the Detection and Therapy of Bacterial Infections. Bioconjug. Chem. 2020, 31, 1708-1723; (b) Ghilini, F.; Pissinis, D. E.; Miñán, A.; Schilardi, P. L.; Diaz, C. How Functionalized Surfaces Can Inhibit Bacterial Adhesion and Viability. ACS Biomater. Sci. Eng. 2019, 5, 4920-4936; (c) Jain, A.; Duvvuri, L. S.; Farah, S.; Beyth, N.; Domb, A. J.; Khan, W. Antimicrobial Polymers. Adv. Healthc. Mater. 2014, 3, 1969-1985.

[30] Klevens, R. M.; Edwards, J. R.; Richards, C. L.; Horan, T. C.; Gaynes, R. P.; Pollock, D. A.; Cardo, D. M. Estimating health care-associated infections and deaths in U.S. Hospitals, 2002. Public Health Rep. 2007, 122, 160-166.

[31] (a) Froidevaux, V.; Negrell, C.; Caillol, S.; Pascault, J. P.; Boutevin, B. Biobased Amines: From Synthesis to Polymers; Present and Future. Chem. Rev. 2016, 116, 14181-14224; (b) Sahariah, P.; Másson, M. Antimicrobial Chitosan and Chitosan Derivatives: A Review of the Structure-Activity Relationship. Biomacromolecules 2017, 18, 3846-3868; (c) Radzishevsky, I. S.; Rotem, S.; Bourdetsky, D.; Navon-Venezia, S.; Carmeli, Y.; Mor, A. Improved antimicrobial peptides based on acyl-lysine oligomers. Nat. Biotechnol. 2007, 25, 657-659; (d) Asri, L. A. T. W.; Crismaru, M.; Roest, S.; Chen, Y.; Ivashenko, O.; Rudolf, P.; Tiller, J. C.; Van Der Mei, H. C.; Loontjens, T. J. A.; Busscher, H. J. A Shape-adaptive, Antibacterial-coating of immobilized Quaternary-ammonium compounds tethered on hyperbranched polyurea and its mechanism of action. Adv. Funct. Mater. 2014, 24, 346-355; (e) Iarikov, D. D.; Kargar, M.; Sahari, A.; Russel, L.; Gause, K. T.; Behkam, B.; Ducker, W. A. Antimicrobial surfaces using covalently bound polyallylamine. Biomacromolecules 2014, 15, 169-176.

[32] (a) Yue, J.; Zhao, P.; Gerasimov, J. Y.; Van De Lagemaat, M.; Grotenhuis, A.; Rustema-Abbing, M.; Van Der Mei, H. C.; Busscher, H. J.; Herrmann, A.; Ren, Y. 3D-Printable Antimicrobial Composite Resins. Adv. Funct. Mater. 2015, 25, 6756-6767; (b) Jin, X.; Wang, J.; Bai, J. Synthesis and antimicrobial activity of the Schiff base from chitosan and citral. Carbohydr. Res. 2009, 123, 825-829; (c) Dong, A.; Wang, Y. J.; Gao, Y.; Gao, T.; Gao, G. Chemical Insights into Antibacterial N-Halamines. Chem. Rev. 2017, 117, 4806-4862; (d) Locock, K. E. S.; Michl, T. D.; Valentin, J. D. P.; Vasilev, K.; Hayball, J. D.; Qu, Y.; Traven, A.; Griesser, H. J.; Meagher, L.; Haeussler, M. Guanylated polymethacrylates: A class of potent antimicrobial polymers with low hemolytic activity. Biomacromolecules 2013, 14, 4021-4031.

[33] Chen, J.; Wang, W.; Hu, P.; Wang, D.; Lin, F.; Xue, J.; Chen, Z.; Iqbal, Z.; Huang, M. Dual antimicrobial actions on modified fabric leads to inactivation of drug-resistant bacteria. Dye. Pigment. 2017, 140, 236-243.

[34] (a) Morais, D. S.; Guedes, R. M.; Lopes, M. A. Antimicrobial approaches for textiles: From research to market. Materials (Basel). 2016, 9, 498; (b) Xu, C.; Akakuru, O. U.; Ma, X.; Zheng, J.; Zheng, J.; Wu, A. Nanoparticle-Based Wound Dressing: Recent Progress in the Detection and Therapy of Bacterial Infections. Bioconjug. Chem. 2020, 31, 1708-1723; (c) Jain, A.; Duvvuri, L. S.; Farah, S.; Beyth, N.; Domb, A. J.; Khan, W. Antimicrobial Polymers. Adv. Healthc. Mater. 2014, 3, 1969-1985.

[35] (a) Vandini, A.; Temmerman, R.; Frabetti, A.; Caselli, E.; Antonioli, P.; Balboni, P. G.; Platano, D.; Branchini, A.; Mazzacane, S. Hard surface biocontrol in hospitals using microbial-based cleaning products. PLoS One 2014, 9; (b) Weber, D. J.; Rutala, W. A.; Miller, M. B.; Huslage, K.; Sickbert-Bennett, E. Role of hospital surfaces in the transmission of emerging health care-associated pathogens: Norovirus, *Clostridium difficile*, and *Acinetobacter* species. Am. J. Infect. Control 2010, 38, 25-33.

[36] (a) Asri, L. A. T. W.; Crismaru, M.; Roest, S.; Chen, Y.; Ivashenko, O.; Rudolf, P.; Tiller, J. C.; Van Der Mei, H. C.; Loontjens, T. J. A.; Busscher, H. J. A Shape-adaptive, Antibacterial-coating of immobilized Quaternary-ammonium compounds tethered on hyperbranched polyurea and its mechanism of action. Adv. Funct. Mater. 2014, 24, 346-355; (b) Matsuda, K.; Irie, M. Journal of Photochemistry and Photobiology C: Photochemistry Reviews. 2004, pp 169-182; (c) Süer, N. C.; Demir, C.; Ünübol, N. A.; Yalçin, Ö.; Kocagöz, T.; Eren, T. Antimicrobial activities of phosphonium containing polynorbornenes. RSC Adv. 2016, 6, 86151-86157; (d) Ghilini, F.; Pissinis, D. E.; Miñán, A.; Schilardi, P. L.; Diaz, C. How Functionalized Surfaces Can Inhibit Bacterial Adhesion and Viability. ACS Biomater. Sci. Eng. 2019, 5, 4920-4936; (e) Tarn, D.; Ashley, C. E.; Xue, M.; Carnes, E. C.; Zink, J. I.; Brinker, C. J. Mesoporous silica nanoparticle nanocarriers: Biofunctionality and biocompatibility. Acc. Chem. Res. 2013, 46, 792-801.

[37] Wang, J.; Li, J.; Guo, G.; Wang, Q.; Tang, J.; Zhao, Y.; Qin, H.; Wahafu, T.; Shen, H.; Liu, X.; Zhang, X. Silver-nanoparticles-modified biomaterial surface resistant to *staphylococcus*: New insight into the antimicrobial action of silver. Sci. Rep. 2016, 6, 32699.

[38] Guyomard, A.; Dé, E.; Jouenne, T.; Malandain, J. J.; Muller, G.; Glinel, K. Incorporation of a hydrophobic antibacterial peptide into amphiphilic polyelectrolyte multilayers: A bioinspired approach to prepare biocidal thin coatings. Adv. Funct. Mater. 2008, 18, 758-765.

[39] Baptista, M. S.; Cadet, J.; Di Mascio, P.; Ghogare, A. A.; Greer, A.; Hamblin, M. R.; Lorente, C.; Nunez, S. C.; Ribeiro, M. S.; Thomas, A. H.; Vignoni, M.; Yoshimura, T. M. Type I and Type II Photosensitized Oxidation Reactions: Guidelines and Mechanistic Pathways. Photochem. Photobiol. 2017, 93, 912-919.

[40] (a) Chen, W.; Chen, J.; Li, L.; Wang, X.; Wei, Q.; Ghiladi, R. A.; Wang, Q. Wool/Acrylic Blended Fabrics as Next-Generation Photodynamic Antimicrobial Materials. ACS Appl. Mater. Interfaces 2019, 11, 29557-29568; (b) Henke, P.; Kirakci, K.; Kubát, P.; Fraiberk, M.; Forstová, J.; Mosinger, J. Antibacterial, Antiviral, and Oxygen-Sensing Nanoparticles Prepared from Electrospun Materials. ACS Appl. Mater. Interfaces 2016, 8; (c) Donnelly, R. F.; McCarron, P. A.; Tunney, M. M. Antifungal photodynamic therapy. Microbiol. Res. 2008, 163, 1-12; (d) Peddinti, B. S. T.; Scholle, F.; Ghiladi, R. A.; Spontak, R. J. Photodynamic Polymers as Comprehensive Anti-Infective Materials: Staying Ahead of a Growing Global Threat. ACS Appl. Mater. Interfaces 2018, 10, 25955-25959

[41] Chen, X.; Lai, H.; Xiao, C; Tian, H.; Chen, X.; Tao, Y.; Wang, X. New bio-renewable polyester with rich side amino groups from L-lysine via controlled ring-opening polymerization. Polym. Chem. 2014, 5, 6495-6502.

[42] Yilgör, E.; Yilgör, I. Silicone containing copolymers: synthesis, properties and applications. Progress in Polymer Science, 2014, 39 1165-1195.

[43] Chakraborty, R.; Soucek, M. D. Synthesis of amine and epoxide telechelic siloxanes. Macromolecular Chemistry and Physics, 2008, 209, 604-614.

[44] (a) Massif, C.; Dautrey, S.; Haefele, A.; Ziessel, R.; Renard, P. Y.; Romieu, A. New insights into the water-solubilisation of fluorophores by post-synthetic "click" and Sonogashira reactions. Org. Biomol. Chem. 2012, 10, 4330-4336; (b) Bojinov, V. B.; Panova, I. P.; Grabchev, I. K. Novel polymerizable light emitting dyes—combination of a hindered amine with a 9-phenylxanthene fluorophore. Synthesis and photophysical investigations. Dye. Pigment. 2007, 74, 187-194; (c) Popov, K.; Oshchepkov, M.; Kamagurov, S.; Tkachenko, S.; Dikareva, J.; Rudakova, G. Synthesis and properties of novel fluorescent-tagged polyacrylate-based scale inhibitors. J. Appl. Polym. Sci. 2017, 134, 1-11; (d) Carvell, M.; Robb, I. D.; Small, P. W. The influence of labelling mechanisms on the fluorescence behaviour of polymers bearing fluorescein labels. Polymer 1998, 39, 393-398; (e) Adamczyk, M.; Grote, J. Efficient synthesis of rhodamine conjugates through the 2'-position. Bioorganic Med. Chem. Lett. 2000, 10, 1539-1541.

[45] (a) Bansal, A. K.; Holzer, W.; Penzkofer, A.; Tsuboi, T. Absorption and emission spectroscopic characterization of platinum-octaethyl-porphyrin (PtOEP). Chem. Phys. 2006, 330, 118-129; (b) Amao, Y. Probes and Polymers for Optical Sensing of Oxygen. Microchim. Acta 2003, 143, 1-12.

[46] Stukenbroeker, T.; Wang, W.; Winne, J. M.; Du Prez, F. E.; Nicolay, R.; Leibler, L. Polydimethylsiloxane quenchable vitrimers. Polym. Chem. 2017, 8, 6590-6593.

[47] Tan, H.; Liu, X. C.; Su, J. H.; Wang, Y. X.; Gu, X. M.; Yang, D. J.; Waclawik, E. R.; Zhu, H. Y.; Zheng, Z. F. One-pot selective synthesis of azoxy compounds and imines via the photoredox reaction of nitroaromatic compounds and amines in water. Sci. Rep. 2019, 9, 1280.

[48] Ondrus, D. J.; Boerio, F. J. Effect of substrates on the structure of polymer interphases. I. Oxidation of aminosilane primers. J. Colloid Interface Sci. 1988, 124, 349-357.

[49] Pandey, P.; Katsoulidis, A. P.; Eryazici, I.; Wu, Y.; Kanatzidis, M. G.; Nguyen, S. T. Imine-linked microporous polymer organic frameworks. Chem. Mater. 2010, 22, 4974-4979.

[50] (a) Fujisawa, S.; Kadoma, Y.; Yokoe, I. Radical-scavenging activity of butylated hydroxytoluene (BHT) and its metabolites. Chem. Phys. Lipids 2004, 130, 189-195; (b) Ouannes, C.; Wilson, T. Quenching of Singlet Oxygen by Tertiary Aliphatic Amines. Effect of DABCO. J. Am. Chem. Soc. 1968, 90, 6527-6528.

[51] Baptista, M. S.; Cadet, J.; Di Mascio, P.; Ghogare, A. A.; Greer, A.; Hamblin, M. R.; Lorente, C.; Nunez, S. C.; Ribeiro, M. S.; Thomas, A. H.; Vignoni, M.; Yoshimura, T. M. Type I and Type II Photosensitized Oxidation Reactions: Guidelines and Mechanistic Pathways. Photochem. Photobiol. 2017, 93, 912-919.

[52] (a) Revilla, A. S.; Pestana, C. R.; Pardo-Andreu, G. L.; Santos, A. C.; Uyemura, S. A.; Gonzales, M. E.; Curti, C. Potential toxicity of toluene and xylene evoked by mitochondrial uncoupling. Toxicol. Vitr. 2007, 21, 782-788; (b) Kandyala, R.; Raghavendra, S. P.; Rajasekharan, S. Xylene: An overview of its health hazards and preventive measures. J. Oral Maxillofac. Pathol. 2010, 14, 1-5.

[53] Wachter, E.; Dees, C.; Harkins, J.; Scott, T.; Petersen, M.; Rush, R. E.; Cada, A. Topical rose bengal: Pre-clinical evaluation of pharmacokinetics and safety. Lasers Surg. Med. 2003, 32, 101-110.

[54] (a) Camino, C.; Lomakin, S. M.; Lazzari, M. Polydimethylsiloxane thermal degradation part 1. Kinetic aspects. Polymer 2001, 42, 2395-2402; (b) Xue, L.; Zhang, Y.; Zuo, Y.; Diao, S.; Zhang, J.; Feng, S. Preparation and characterization of novel UV-curing silicone rubber via thiol-ene reaction. Mater. Lett. 2013, 106, 425-427.

[55] Camino, G.; Lomakin, S. M.; Lageard, M. Thermal polydimethylsiloxane degradation. Part 2. The degradation mechanisms. Polymer 2002, 43, 2011-2015.

[56] (a) Berkowski, K. L.; Plunkett, K. N.; Yu, Q.; Moore, J. S. Introduction to photolithography: Preparation of microscale polymer silhouettes. J. Chem. Educ. 2005, 82, 1365-1369; (b) Thompson, B. L.; Ouyang, Y.; Duarte, G. R. M.; Carrilho, E.; Krauss, S. T.; Landers, J. P. Inexpensive, rapid prototyping of microfluidic devices using overhead transparencies and a laser print, cut and laminate fabrication method. Nat. Protoc. 2015, 10, 875-886.

[57] Karis, D. G.; Ono, R. J.; Zhang, M.; Vora, A.; Storti, D.; Ganter, M. A.; Nelson, A. Cross-linkable multi-stimuli responsive hydrogel inks for direct-write 3D printing. Polym. Chem. 2017, 8, 4199.

[58] Taniguchi, M.; Lindsey, J. S. Database of Absorption and Fluorescence Spectra of >300 Common Compounds for use in PhotochemCAD. Photochem. Photobiol. 2018, 94, 290-327.

[59] Ogilby, P. R.; Foote, C. S. Chemistry of Singlet Oxygen. 42. Effect of Solvent, Solvent Isotopic Substitution, and Temperature on the Lifetime of Singlet Molecular Oxygen (1δg). J. Am. Chem. Soc. 1983, 105, 3423-3430.

[60] Fawcett, A. S.; Brook, M. A. Thermoplastic silicone elastomers through self-association of pendant coumarin groups. Macromolecules 2014, 47, 1656-1663.

[61] Malanga, M.; Darcsi, A.; Balint, M.; Benkovics, G.; Sohajda, T.; Beni, S. New synthetic strategies for xanthene-dye-Appended cyclodextrins. Beilstein J. Org. Chem. 2016, 12, 537-548.

[62] (a) Sammon, C.; Li, C.; Armes, S. P.; Lewis, A. L. ATR-FTIR studies of a thermo-responsive ABA triblock copolymer gelator in aqueous solution. Polymer 2006, 47, 6123-6130; (b) Ondrus, D. J.; Boerio, F. J. Effect of substrates on the structure of polymer interphases. I. Oxidation of aminosilane primers. J. Colloid Interface Sci. 1988, 124, 349-357.

[63] Pandey, P.; Katsoulidis, A. P.; Eryazici, I.; Wu, Y.; Kanatzidis, M. G.; Nguyen, S. T. Imine-linked microporous polymer organic frameworks. Chem. Mater. 2010, 22, 4974-4979.

[64] (a) Kandyala, R.; Raghavendra, S. P.; Rajasekharan, S. Xylene: An overview of its health hazards and preventive measures. J. Oral Maxillofac. Pathol. 2010, 14, 1-5; (b) Nair, B. Final report on the safety assessment of stearoxy dimethicone, dimethicone, methicone, amino bispropyl dimethicone, aminopropyl dimethicone, amodimethicone, amodimethicone hydroxystearate, behenoxy dimethicone, C24-28 alkyl methicone, C30-45 alkyl methico. Int. J. Toxicol. 2003, 22, 11-35.

[65] (a) Argüeso, P.; Tisdale, A.; Spurr-Michaud, S.; Sumiyoshi, M.; Gipson, I. K. Mucin characteristics of human corneal-limbal epithelial cells that exclude the rose bengal anionic dye. Investig. Ophthalmol. Vis. Sci. 2006, 47, 113-119; (b) Theodossiou, T.; Hothersall, J. S.; Woods, E. A.; Okkenhaug, K.; Jacobson, J.; MacRobert, A. J. Firefly luciferin-activated rose bengal: In vitro photodynamic therapy by intracellular chemiluminescence in transgenic NIH 3T3 cells. Cancer Res. 2003, 63; (c) Wachter, E.; Dees, C.; Harkins, J.; Scott, T.; Petersen, M.; Rush, R. E.; Cada, A. Topical rose bengal: Pre-clinical evaluation of pharmacokinetics and safety. Lasers Surg. Med. 2003, 32, 101-110.

[66] (a) Asri, L. A. T. W.; Crismaru, M.; Roest, S.; Chen, Y.; Ivashenko, O.; Rudolf, P.; Tiller, J. C.; Van Der Mei, H. C.; Loontjens, T. J. A.; Busscher, H. J. A Shape-adaptive, Antibacterial-coating of immobilized Quaternary-ammonium compounds tethered on hyperbranched polyurea and its mechanism of action. Adv. Funct. Mater. 2014, 24, 346-355; (b) Timofeeva, L.; Kleshcheva, N. Antimicrobial polymers: Mechanism of action, factors of activity, and applications. Appl. Microbiol. Biotechnol. 2011, 89, 475-492.

[67] (a) Zhao, L.; May, J. P.; Blanc, A.; Dietrich, D. J.; Loonchanta, A.; Matinkhoo, K.; Pryyma, A.; Perrin, D. M. Synthesis of a Cytotoxic Amanitin for Biorthogonal Conjugation. ChemBioChem 2015; (b) Matinkhoo, K.; Pryyma, A.; Todorovic, M.; Patrick, B. 0.; Perrin, D. M. Synthesis of the Death-Cap Mushroom Toxin α-Amanitin. J. Am. Chem. Soc. 2018, 140, 6513-6517.

[68] (a) Iarikov, D. D.; Kargar, M.; Sahari, A.; Russel, L.; Gause, K. T.; Behkam, B.; Ducker, W. A. Antimicrobial surfaces using covalently bound polyallylamine. Biomacromolecules 2014, 15, 169-176; (b) G., M.; D., R. Antiseptics and disinfectants: activity, action, and resistance. Clin. Microbiol. Rev. 1999, 12, 147-179.

[69] Verkleij, A. J.; Zwaal, R. F. A.; Roelofsen, B.; Comfurius, P.; Kastelijn, D.; van Deenen, L. L. M. The asymmetric distribution of phospholipids in the human red cell membrane. A combined study using phospholipases and freeze-etch electron microscopy. BBA-Biomembr. 1973, 323, 178-193.

[70] Timofeeva, L.; Kleshcheva, N. Antimicrobial polymers: Mechanism of action, factors of activity, and applications. Appl. Microbiol. Biotechnol. 2011, 89, 475-492.

[71] (a) Madkour, A. E.; Dabkowski, J. M.; Nusslein, K.; Tew, G. N. Fast disinfecting antimicrobial surfaces. Langmuir 2009, 25, 1060-1067; (b) Kebir, N.; Kriegel, I.; Esteve, M.; Semetey, V. Preparation of bactericidal cationic PDMS surfaces using a facile and efficient approach. Appl. Surf. Sci. 2016, 360, 866-874.

[72] (a) Weber, D. J.; Anderson, D.; Rutala, W. A. The role of the surface environment in healthcare associated infections. Curr. Opin. Infect. Dis. 2013, 26, 338-344; (b) Weber, D. J.; Rutala, W. A.; Miller, M. B.; Huslage, K.; Sickbed-Bennett, E. Role of hospital surfaces in the transmission of emerging health care-associated pathogens: Norovirus, *Clostridium difficile*, and *Acinetobacter* species. Am. J. Infect. Control 2010, 38, 25-33; (c) Vandini, A.; Temmerman, R.; Frabetti, A.; Caselli, E.; Antonioli, P.; Balboni, P. G.; Platano, D.; Branchini, A.; Mazzacane, S. Hard surface biocontrol in hospitals using microbial-based cleaning products. PLoS One 2014, 9; (d) Fijan, S.; Turk, S. S. Hospital textiles, are they a possible vehicle for healthcare-associated infections? Int. J. Environ. Res. Public Health 2012, 9, 3330-3343; (e) Weber, D. J.; Rutala, W. A. Self-disinfecting surfaces: Review of current methodologies and future prospects. Am. J. Infect. Control 2013, 41, 531-535; (f) Edmond, M. B.; Diekema, D. J.; Perencevich, E. N. Ebola virus disease and the need for new personal protective equipment. J. Am. Med. Assoc. 2014, 312, 2495-2496.

The invention claimed is:

1. A method for preparing a cross-linked polymeric material, the method comprising:

irradiating a polymer comprising a plurality of aliphatic primary amine moieties or precursors thereto in the presence of oxygen and a sensitizer to form imine cross-links via the oxidative coupling of at least a portion of the aliphatic primary amine moieties and obtain the cross-linked polymeric material, wherein prior to irradiation, the method comprises depositing the polymer and the sensitizer on a surface; and wherein the polymer comprises a polysiloxane comprising the aliphatic primary amine moieties, a polyamide comprising the aliphatic primary amine moieties, a polyester comprising the aliphatic primary amine moieties or a polymethacrylate comprising the aliphatic primary amine moieties.

2. The method of claim 1, wherein the polymer comprises a polysiloxane comprising the aliphatic primary amine moieties.

3. The method of claim 1, wherein the polymer is of the general Formula (I):

(I)

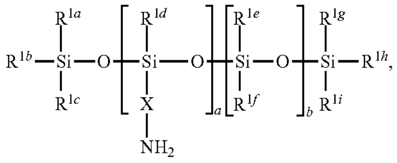

wherein $R^{1a}$, $R^{1b}$, $R^{1c}$, $R^{1d}$, $R^{1e}$, $R^{1f}$, $R^{1g}$, $R^{1h}$ and $R^{1i}$ are each independently $C_{1-10}$alkyl, $C_{3-10}$ cycloalkyl, $C_{1-6}$alkyleneC$_{3-10}$cycloalkyl, aryl or $C_{1-6}$alkylene-aryl;

each X is independently $C_{1-10}$alkylene or $C_{3-10}$cycloalkylene;

a is an integer of at least 2; and b is an integer of at least 1.

4. The method of claim 3, wherein $R^{1a}$, $R^{1b}$, $R^{1c}$, $R^{1d}$, $R^{1e}$, $R^{1f}$, $R^{1g}$, $R^{1h}$ and $R^{1i}$ are all methyl and each X is $-(CH_2)_3-$.

5. The method of claim 1, wherein the sensitizer is selected from an acridine, a porphyrin, a metalloporphyrin, a xanthene, a methylene blue, a metal oxide and combinations thereof.

6. The method of claim 1, wherein the surface comprises a textile.

7. The method of claim 1, wherein the sensitizer is coupled to at least a portion of the polymer chains of the polymer.

8. The method of claim 7, wherein the sensitizer coupled to the at least a portion of the polymer chains absorbs light in a first region, wherein the irradiation comprises irradiation of a solution comprising the sensitizer coupled to the at least a portion of the polymer chains, the solution further comprises a second sensitizer that absorbs light in a second region, and the irradiation comprises irradiation of the solution at a wavelength in the second region.

9. A method for preparing a cross-linked polymeric material, the method comprising:

irradiating a polymer comprising:

a polymer chain comprising a plurality of aliphatic primary amine moieties or precursors thereto as side-chains; and a sensitizer coupled to the polymer chain via a moiety obtained from reaction of an aliphatic primary amine moiety with an amine-reactive group on the sensitizer, in the presence of oxygen to form imine cross-links via the oxidative coupling of at least a portion of the aliphatic primary amine moieties and obtain the cross-linked polymeric material, wherein prior to irradiation, the method comprises depositing the polymer on a surface; and wherein the polymer chain comprises a polysiloxane, a polyamide, a polyester or a polymethacrylate.

10. The method of claim 9, wherein the surface comprises a textile.

11. The method of claim 9, wherein the irradiation comprises solvent-free conditions.

12. The method of claim 9, wherein the irradiation comprises irradiating a solution comprising the polymer.

13. The method of claim 12, wherein the sensitizer coupled to the polymer chain absorbs light in a first region, the solution further comprises a second sensitizer that absorbs light in a second region, and the irradiation comprises irradiation of the solution at a wavelength in the second region.

14. A cross-linked polymeric material prepared according to a method as defined in claim 9, the cross-linked polymeric material comprising:

polymer chains cross-linked by imine moieties obtained via the oxidative coupling of the aliphatic primary amine moieties; and the sensitizer coupled to at least a portion of the polymer chains via a moiety obtained from reaction of an aliphatic primary amine moiety with an amine-reactive group on the sensitizer.

15. The cross-linked polymeric material of claim 14, wherein the cross-linked polymeric material is of the general Formula (IV):

(IV)

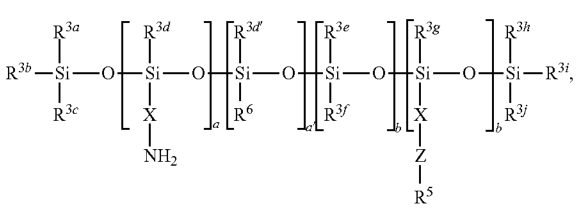

wherein $R^{3a}$, $R^{3c}$, $R^{3d}$, $3^{d'}$ $R^{3e}$, $R^{3f}$, $R^{3g}$, $R^{3h}$ and $R^{3j}$ are each independently $C_{1-10}$alkyl, $C_{3-10}$ cycloalkyl, $C_{1-6}$alkyleneC$_{3-10}$cycloalkyl, aryl or $C_{1-6}$alkylene-aryl;

$R^{3b}$ and $R^{3i}$ are each independently $C_{1-10}$alkyl, $C_{3-10}$cycloalkyl, $C_{1-6}$alkyleneC$_{3-10}$cycloalkyl, aryl, $C_{1-6}$alkylene-aryl, —X—$NH_2$ or $R^6$;

$R^6$ is a portion of an imine cross-link formed from the oxidative coupling of two —X—$NH_2$ moieties;

each X is independently $C_{1-10}$alkylene or $C_{3-10}$cycloalkylene;

each Z is independently the moiety obtained from reaction of the aliphatic primary amine moiety with the amine-reactive group on the sensitizer;

$R^5$ is the remainder of the sensitizer;

a is an integer of at least 1;

a' is an integer of at least 1;

b is an integer of at least 1; and c is an integer of at least 1.

16. The cross-linked polymeric material of claim 15, wherein $R^{3a}$, $R^{3b}$, $R^{3c}$, $R^{3d}$, $R^{3d'}$ $R^{3e}$, $R^{3f}$, $R^{3g}$, $R^{3h}$, $R^{3i}$ and $R^{3j}$ are all methyl; each X is —$(CH_2)_3$—; and each Z is an amide.

17. The cross-linked polymeric material of claim 14, wherein the surface comprises a textile.

18. The method of claim 9, wherein the polymer is of the general Formula (III):

(III)

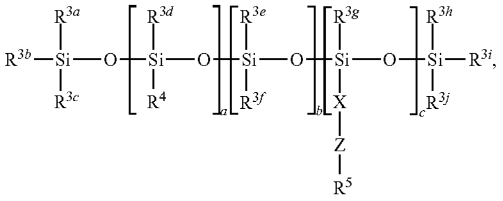

wherein $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are each independently $C_{1-10}$alkyl, $C_{3-10}$ cycloalkyl, $C_{1-6}$alkyleneC$_{3-10}$cycloalkyl, aryl or $C_{1-6}$alkylene-aryl;

$R^4$ is —X—$NH_2$ or the precursor thereto;

each X is independently $C_{1-10}$alkylene or $C_{3-10}$cycloalkylene;

each Z is independently the moiety obtained from reaction of the aliphatic primary amine moiety with the amine-reactive group on the sensitizer;

$R^5$ is the remainder of the sensitizer;

a is an integer of at least 2;

b is an integer of at least 1; and c is an integer of at least 1.

19. The method of claim 18, wherein $R^{3a}$, $R^{3b}$, $R^{3c}$, $R^{3d}$, $R^{3e}$, $R^{3f}$, $R^{3g}$, $R^{3h}$, $R^{3i}$ and $R^{3j}$ are all methyl; each X is —$(CH_2)_3$—; and each Z is an amide.

* * * * *